US012356418B2

(12) United States Patent
Jang et al.

(10) Patent No.: US 12,356,418 B2
(45) Date of Patent: Jul. 8, 2025

(54) METHOD AND APPARATUS FOR DETERMINING PRIORITY REGARDING DOWNLINK CONTROL INFORMATION RECEPTION IN WIRELESS COMMUNICATION SYSTEM

(71) Applicant: Samsung Electronics Co., Ltd., Suwon-si (KR)

(72) Inventors: Youngrok Jang, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 17/692,874

(22) Filed: Mar. 11, 2022

(65) Prior Publication Data

US 2022/0295457 A1 Sep. 15, 2022

(30) Foreign Application Priority Data

Mar. 12, 2021 (KR) .................. 10-2021-0032883
Aug. 13, 2021 (KR) .................. 10-2021-0107671

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .............. H04W 72/23; H04W 72/0446; H04L 5/0053; H04L 5/0007; H04L 5/0094; H04L 5/001

See application file for complete search history.

(56) References Cited

U.S. PATENT DOCUMENTS

2020/0100248 A1 3/2020 Kim et al.
2020/0100311 A1* 3/2020 Cirik .................... H04B 7/0695
(Continued)

FOREIGN PATENT DOCUMENTS

KR 10-2020-0020272 A 2/2020

OTHER PUBLICATIONS

Takeda et al., Understanding the Heart of the 5G Air Interface: An Overview of Physical Downlink Control Channel for 5G New Radio, pp. 22-29 (Year: 2020).*

(Continued)

*Primary Examiner* — Ashley Shivers

(57) ABSTRACT

The disclosure relates to a 5G or 6G communication system for supporting a higher data transmission rate. the disclosure provides a method performed by at terminal in a wireless communication system, the method comprises receiving, from a base station, a RRC message including configuration information on a plurality of search spaces (SSs), identifying a first CORESET corresponding to a first SS with lowest index among the plurality of SSs, identifying one or more SSs by excluding one or more first SSs associated with the first CORESET from the plurality of SSs, identifying at least one SS linked with one of the one or more first SSs among the one or more SSs, identifying a second CORESET corresponding to a second SS with lowest index among the at least one SS, and monitoring PDCCHs in overlapping PDCCH monitoring occasions in the first CORESET and the second CORESET.

16 Claims, 28 Drawing Sheets

(56) References Cited

U.S. PATENT DOCUMENTS

| | | | |
|---|---|---|---|
| 2020/0169991 A1 | 5/2020 | Lin et al. | |
| 2020/0336928 A1 | 10/2020 | Seo et al. | |
| 2020/0389874 A1 | 12/2020 | Lin et al. | |
| 2021/0314927 A1 | 10/2021 | Noh et al. | |
| 2021/0409094 A1* | 12/2021 | Yuan | H04W 72/23 |
| 2022/0225291 A1* | 7/2022 | Khoshnevisan | H04L 1/08 |
| 2023/0413081 A1* | 12/2023 | Zhang | H04L 5/0035 |
| 2024/0080809 A1* | 3/2024 | Matsumura | H04W 16/28 |

OTHER PUBLICATIONS

Qualcomm Incorporated, "Enhancements on beam management for multi-TRP", 3GPP TSG RAN WG1 Meeting #103-e, Oct. 26-Nov. 13, 2020, R1-2009253, 6 pages.

Intel Corporation, "Correction for multi TRP PDCCH prioritization", 3GPP TSG RAN WG1 #104-e, Jan. 25-Feb. 5, 2021, R1-2100633, 2 pages.

Lenovo, et al., "Enhancements on beam management for multi-TRP", 3GPP TSG RAN WG1#102-e, Oct. 26-Nov. 13, 2020, R1-2008913, 8 pages.

International Search Report dated Jun. 24, 2022 in connection with International Patent Application No. PCT/KR2022/003484, 3 pages.

Written Opinion of the International Searching Authority dated Jun. 24, 2022 in connection with International Patent Application No. PCT/KR2022/003484, 5 pages.

Supplementary European Search Report dated Jul. 4, 2024, in connection with European Application No. 22767568.3, 11 pages.

Qualcomm Incorporated, "Multi-TRP Enhancements," R1-2006781, 3GPP TSG-RAN WG1 Meeting #102-e, e-Meeting, Aug. 17-28, 2020, 11 pages.

\* cited by examiner

METHOD AND APPARATUS FOR DETERMINING PRIORITY REGARDING DOWNLINK CONTROL INFORMATION RECEPTION IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2021-0032883, and 10-2021-0107671, filed on Mar. 12, 2021, and Aug. 13, 2021, in the Korean Intellectual Property Office, the disclosure of which is herein incorporated by reference in its entirety.

BACKGROUND

1. Field

The disclosure relates to operations of a UE and a base station in a wireless communication system. More particularly, the disclosure relates to a method for determining priority regarding downlink control information reception in a wireless communication system, and an apparatus capable of performing the same.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the advance of wireless communication systems as described above, various services can be provided, and accordingly there is a need for schemes to effectively provide these services.

SUMMARY

The disclosure may provide an apparatus and a method capable of effectively providing a service in a mobile communication system.

The technical subjects pursued in the disclosure may not be limited to the above mentioned technical subjects, and other technical subjects which are not mentioned may be clearly understood, through the following descriptions, by those skilled in the art to which the disclosure pertains.

In order to solve the above-mentioned problems, the disclosure may provide a method performed by a terminal in a wireless communication system, the method comprising: receiving, from a base station, a radio resource control (RRC) message including configuration information on a plurality of search spaces (SSs), identifying a first control resource set (CORESET) corresponding to a first SS with lowest index among the plurality of SSs, identifying one or more SSs by excluding one or more first SSs associated with the first CORESET from the plurality of SSs, identifying at least one SS linked with one of the one or more first SSs among the one or more SSs, identifying a second CORESET corresponding to a second SS with lowest index among the at least one SS, and monitoring physical downlink control channels (PDCCHs) in overlapping PDCCH monitoring occasions in the first CORESET and the second CORESET.

for processing a control signal in a wireless communication system, the method including: receiving a first control signal transmitted from a base station; processing the received first control signal; and transmitting a second control signal generated based on the processing to the base station.

According to an embodiment of the disclosure, an apparatus and a method capable of effectively providing a service in a mobile communication system may be provided.

Advantageous effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
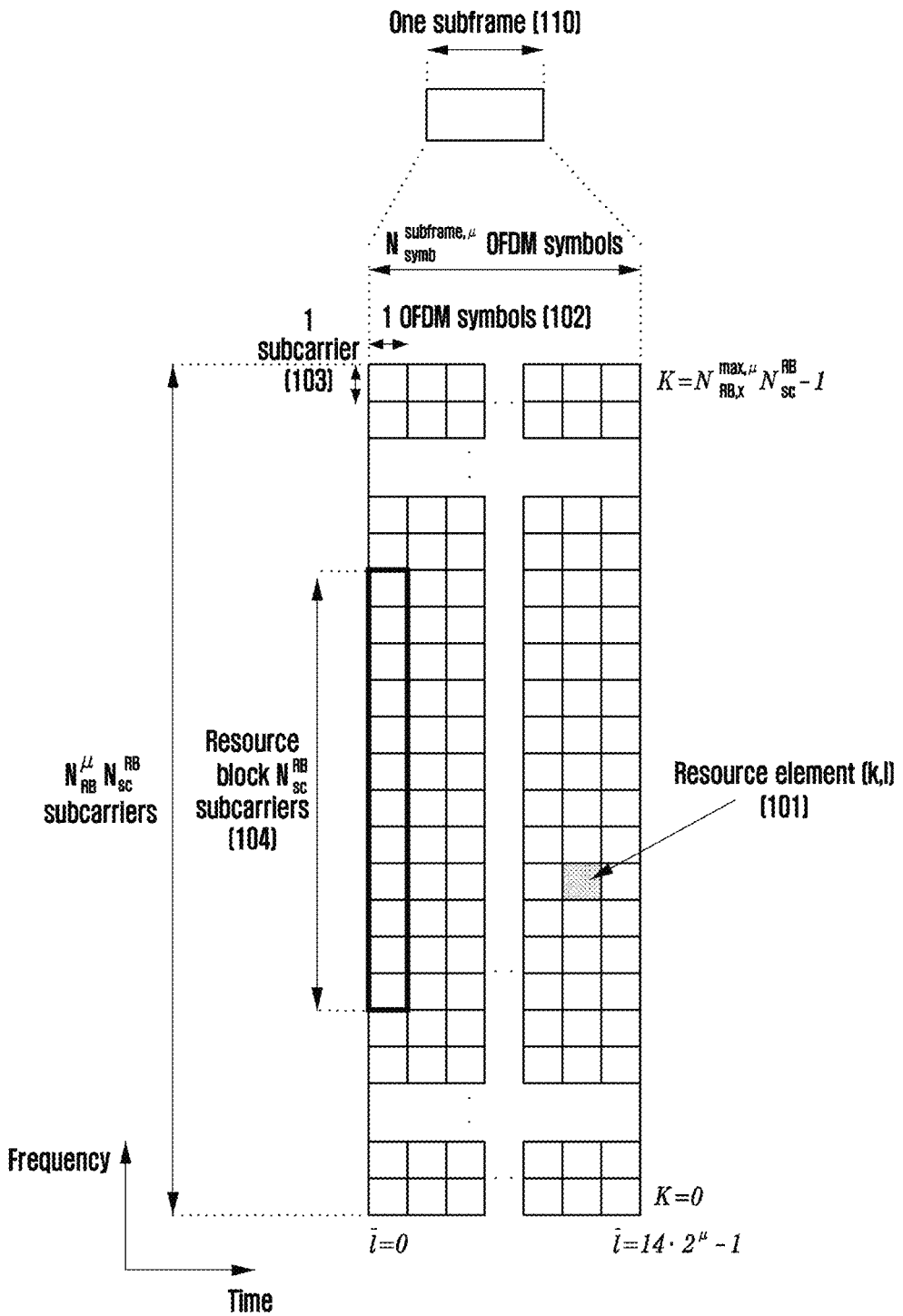
FIG. 1 is a diagram illustrating a basic structure of a time-frequency domain in a wireless communication system according to an embodiment of the disclosure.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

A wireless communication system has evolved from providing an initial voice-oriented service to a broadband wireless communication system that provides high-speed and high-quality packet data services, such as high speed packet access (HSPA) in 3GPP, long-term evolution (LTE) or evolved universal terrestrial radio access (E-UTRA), LTE-advanced (LTE-A), LTE-pro, high rate packet data (HRPD) in 3GPP2, ultra-mobile broadband (UMB), and communication standards such as IEEE 802.16e.

In the LTE system, which is a representative example of a broadband wireless communication system, in downlink (DL), orthogonal frequency division multiplexing (OFDM) scheme is adopted, and in uplink (UL), single carrier frequency division multiple access (SC-FDMA) scheme is adopted. Uplink refers to a radio link through which a user equipment (UE) or mobile station (MS) transmits data or control signals to a base station (BS) (eNode B or base station), and downlink refers to a radio link through which a base station transmits data or control signals to the UE. The above-described multiple access method allows the data or control information of each user to be distinguished by allocating and operating the time-frequency resources to which the data or control information on each user are to be transmitted do not overlap each other, that is, to establish orthogonality.

The 5G communication system, which is a communication system after LTE, may support services that simultaneously satisfy various requirements so that various requirements from users and service providers may be freely reflected. Services considered for the 5G communication system include enhanced mobile broadband (eMBB), massive machine type communication, (mMTC), and ultra-reliable low latency communication (URLLC).

eMBB aims to provide more improved data transfer rates than those supported by existing LTE, LTE-A or LTE-Pro. For example, in the 5G communication system, the eMBB should be able to provide a peak data rate of 20 Gbps in the downlink and a peak data rate of 10 Gbps in the uplink from the viewpoint of one base station. In addition, while providing a peak data rate, the 5G communication system may provide the increased user perceived data rate of the UE. In order to satisfy such a requirement, it may be required to improve various transmission/reception technologies, including a more advanced multi-input and multi-output (MIMO) transmission technology. In addition, while LTE transmits signals using up to 20 MHz transmission bandwidth in the 2 GHz band, the 5G communication system may satisfy the data rate required by the 5G communication system by using a frequency bandwidth wider than 20 MHz in the frequency band of 3 to 6 GHz or 6 GHz or higher.

At the same time, mMTC is being considered to support application services such as the Internet of Things (IoT) in the 5G communication system. In order to efficiently provide the Internet of Things, mMTC is required to support a large-scale UE access in a cell, improve coverage of the UE, improve battery time, reduce the cost of the UE, etc. Because the Internet of Things is attached to various sensors and various devices to provide communication functions, it may be able to support a large number of UEs (e.g., 1,000,000 UEs/km2) within a cell. In addition, because a UE supporting mMTC is highly likely to be located in a shaded area such as the basement of a building that a cell may not cover due to the nature of the service, it may be required to have wider coverage compared to other services provided by the 5G communication system. A UE supporting mMTC may be composed of a low-cost UE, and because it is difficult to frequently exchange the battery of the UE, a very long battery lifetime such as 10 to 15 years may be required.

Lastly, the URLLC is a cellular-based wireless communication service used for a specific purpose (mission-critical). For example, services used for remote control of a robot or machinery, industrial automation, an unmanned aerial vehicle, remote health care, an emergency alert, etc. are considered. Therefore, the communication provided by URLLC may provide very low latency and very high reliability. For example, a service supporting URLLC may satisfy the air interface latency of less than 0.5 milliseconds and, at the same time, may satisfy the requirement of a packet error rate of 10-5 or less. Therefore, for a service supporting URLLC, the 5G system may provide a transmit time interval (TTI) that is smaller than that of other services, and, at the same time, a design requirement for allocating a wide resource in a frequency band may be required to secure the reliability of the communication link.

The three services of 5G, i.e., eMBB, URLLC, and mMTC, may be multiplexed and transmitted in one system. In this case, different transmission/reception techniques and transmission/reception parameters may be used between services to satisfy different requirements of each service. Of course, 5G is not limited to the three services described above.

[NR Time-Frequency Resource]

Hereinafter, a frame structure of the 5G system will be described in more detail with reference to the drawings.

FIG. 1 is a diagram illustrating a basic structure of a time-frequency domain which is a radio resource domain in which data or a control channel is transmitted in a 5G system.

The horizontal and vertical axes of FIG. 1 represent the time domain and the frequency domain, respectively. The basic unit of resource in the time domain and frequency domain is a resource element (RE) 101, which may be defined as one orthogonal frequency division multiplexing (OFDM) symbol 102 in the time axis and may be defined as one subcarrier 103 in the frequency axis. One resource block (RB) 104 in the frequency domain may consist of $N_{SC}^{RB}$ consecutive REs (e.g., 12).

Figure 2:
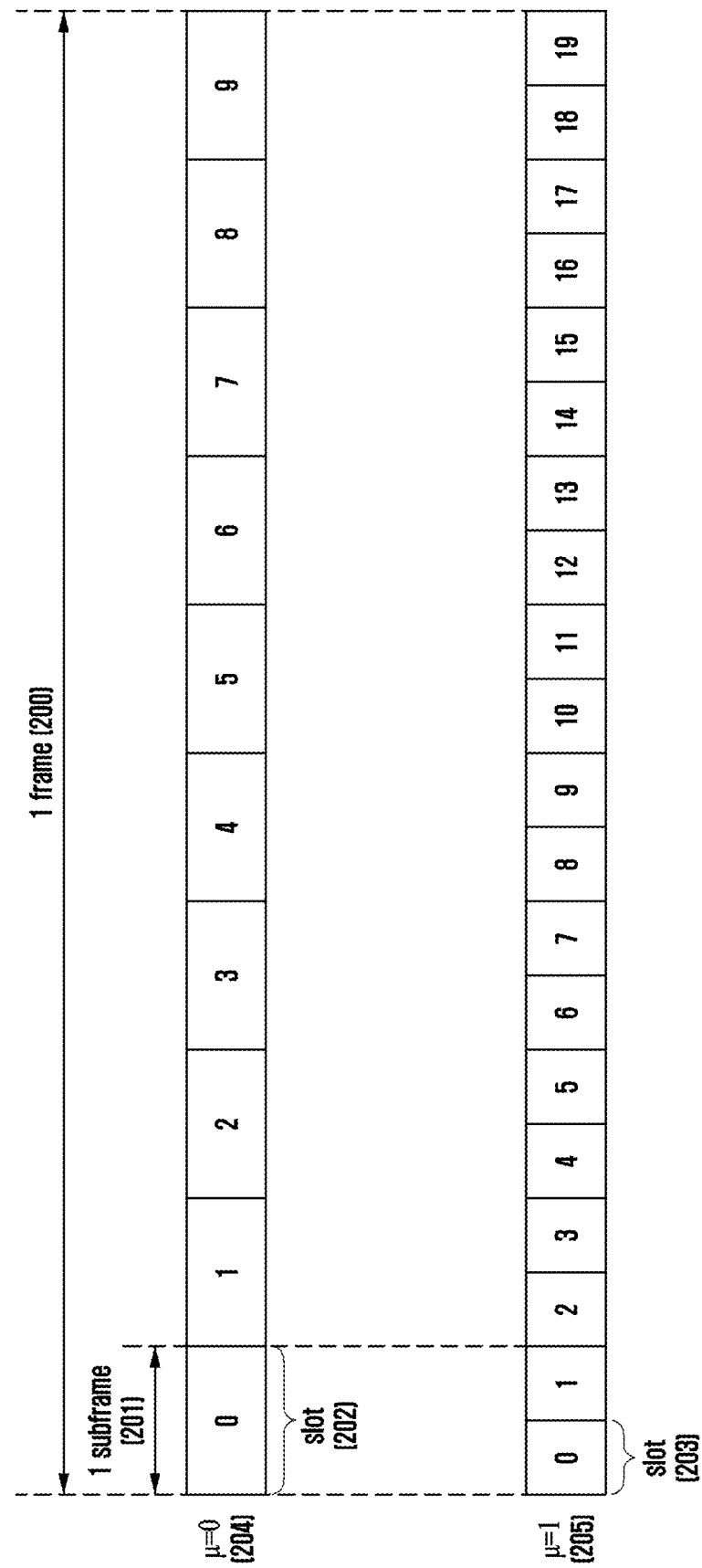
FIG. 2 is a diagram illustrating a frame, a subframe, and a slot structure in a wireless communication system according to an embodiment of the disclosure.

FIG. 2 is a diagram illustrating a frame, a subframe, and a slot structure of a wireless communication system according to an embodiment of the disclosure.

In FIG. 2, an example of a frame 200, a subframe 201, and a slot 202 is illustrated. One frame 200 may be defined as 10 ms. One subframe 201 may be defined as 1 ms, and accordingly, one frame 200 may consist of a total of 10 subframes 201. One slot 202 and 203 may be defined as 14 OFDM symbols (that is, the number of symbols per slot ($N_{symb}^{slot}$)=14). One subframe 201 may consist of one or more slots 202 and 203, and the number of slots 202 and 203 per one subframe 201 may vary according to a set value μ 204 and 205 for the subcarrier spacing. In an example of FIG. 2, the case where μ=0 204 and μ=1 205 is illustrated as the subcarrier spacing set value. When μ=0 204, one subframe 201 may consist of one slot 202, and when μ=1 205, one subframe 201 may consist of two slots 203. That is, depending on the set value μ for the subcarrier spacing, the number of slots per one subframe ($N_{slot}^{subframe,\mu}$) may vary, and accordingly, the number of slots per one frame ($N_{slot}^{frame,\mu}$) may vary. The $N_{slot}^{subframe,\mu}$ and $N_{slot}^{frame,\mu}$ depending on each subcarrier spacing set value μ may be defined as Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Band Width Part (BWP)]

Next, a bandwidth part (BWP) configuration in the 5G communication system will be described in detail with reference to the drawings.

Figure 3:
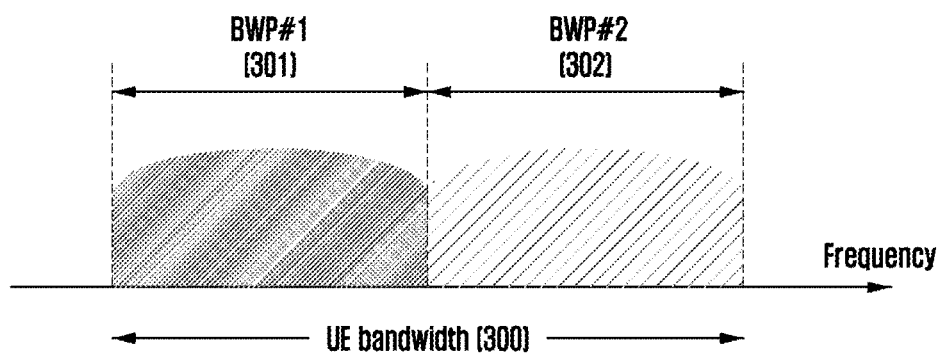
FIG. 3 is a diagram illustrating an example of configuring a bandwidth part in a wireless communication system according to an embodiment of the disclosure.

FIG. 3 illustrates an example of a configuration of a bandwidth part (BWP) in a wireless communication system according to an embodiment of the disclosure.

FIG. 3 illustrates an example in which the UE bandwidth 300 is configured to two bandwidth parts, i.e., bandwidth part #1 (BWP #1) 301 and bandwidth part #2 (BWP #2) 302. The base station may configure one or more bandwidth parts to the UE, and may configure information as illustrated in [Table 2] below for each bandwidth part.

TABLE 2

| BWP ::= | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

Not limited to the above-described example, and various parameters related to bandwidth part may be configured to the UE in addition to the configuration information above. The above information may be transmitted from the base station to the UE through upper layer signaling, for example, radio resource control (RRC) signaling. At least one bandwidth part among one or more configured bandwidth parts may be activated. Whether the configured bandwidth part is activated may be semi-statically transmitted from the base station to the UE through RRC signaling, or may be dynamically transmitted through downlink control information (DCI).

According to some embodiments, the UE before radio resource control (RRC) connection may receive an initial BWP for initial access configured from the base station through a master information block (MIB). More specifically, in order to receive the system information (remaining system information; RMSI or system information block 1; may correspond to SIB1) required for initial access through the MIB in the initial access step, the UE may receive a configuration information on control area (control resource set, CORESET) through which a PDCCH may be transmitted and a configuration information on a search space. The control area and the search space configured by the MIB may be regarded as identity (ID) 0, respectively. The base station may notify the UE of configuration information such as frequency allocation information, time allocation information, and numerology for the control area #0 through the MIB. In addition, the base station may notify the UE of configuration information on the monitoring period and occasion for the control area #0, that is, configuration information on the search space #0 through the MIB. The UE may regard the frequency domain configured as the control area #0 obtained through the MIB as an initial bandwidth part for initial access. In this case, the identity (ID) of the initial bandwidth part may be regarded as 0.

The configuration for the bandwidth part supported by the above 5G may be used for various purposes.

According to some embodiments, when the bandwidth supported by the UE is smaller than the system bandwidth, the bandwidth supported by the UE may be supported through the configuration for the bandwidth part. For example, the base station configures the frequency location of the bandwidth part (configuration information 2) to the UE, so that the UE may transmit and receive data at a specific frequency location within the system bandwidth.

In addition, according to some embodiments, for the purpose of supporting different numerologies, the base station may configure a plurality of bandwidth parts to the UE. For example, in order to support both data transmission and reception using a subcarrier spacing of 15 kHz and a subcarrier spacing of 30 kHz to an arbitrary UE, two bandwidth parts may be configured to use a subcarrier spacing of 15 kHz and 30 kHz, respectively. Different bandwidth parts may be frequency division multiplexed, and when data is transmitted/received at a specific subcarrier space, the bandwidth part configured for the corresponding subcarrier space may be activated.

In addition, according to some embodiments, for the purpose of reducing power consumption of the UE, the base station may configure bandwidth parts having different sizes of bandwidth to the UE. For example, when the UE supports a very large bandwidth, for example, a bandwidth of 100 MHz and always transmits and receives data using the corresponding bandwidth, very large power consumption may occur. In particular, it may be very inefficient in terms of power consumption for the UE to monitor the downlink control channel for an unnecessarily large bandwidth of 100 MHz in a situation in which there is no traffic. For the purpose of reducing power consumption of the UE, the base station may configure a bandwidth part of a relatively narrow bandwidth to the UE, for example, a bandwidth part of 20 MHz. In the absence of traffic, the UE may monitor in a bandwidth part of 20 MHz, and when data are generated, the UE may transmit/receive data through the bandwidth part of 100 MHz according to the instruction of the base station.

In the method of configuring the bandwidth part described above, the UEs before the RRC connection may receive the configuration information on the initial bandwidth part through the master information block (MIB) in the initial access step. More specifically, the UE may receive, from the MIB of the physical broadcast channel (PBCH), a control area (control resource set, CORESET) configured for a downlink control channel through which downlink control information (DCI) scheduling system information block (SIB) may be transmitted. The bandwidth of the control area configured by the MIB may be regarded as an initial bandwidth part, and through the configured initial bandwidth part, the UE may receive a physical downlink shared channel (PDSCH) through which the SIB is transmitted. In addition to the purpose of receiving the SIB, the initial bandwidth part may be utilized for other system information (OSI), paging, and random access.

[Band Width Part (BWP) Change]

When one or more bandwidth parts are configured to the UE, the base station may instruct the UE to change (or switch, transit) the bandwidth part by using a bandwidth part indicator field in DCI. For example, when the currently activated bandwidth part of the UE in FIG. 3 is bandwidth part #1 301, the base station may indicate to the UE the bandwidth part #2 302 as the bandwidth part indicator in the DCI, and the UE may perform a bandwidth part change to the bandwidth part #2 302 indicated by the bandwidth part indicator in the received DCI.

As described above, because the DCI-based bandwidth part change may be indicated by the DCI scheduling the PDSCH or PUSCH, the UE may be able to receive or transmit the PDSCH or PUSCH scheduled by the corresponding DCI at the changed bandwidth part without difficulty when the UE receives a bandwidth part change request. To this end, the standard stipulates requirements for the delay time (TBWP) required when the bandwidth part is changed, and may be defined, for example, as illustrated in Table 3 below.

TABLE 3

| | | BWP switch delay $T_{BWP}$ (slots) | |
|---|---|---|---|
| μ | NR Slot length (ms) | Type 1Note 1 | Type 2Note 1 |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirement for the bandwidth part change delay time may support type 1 or type 2 according to the capability of the UE. The UE may report the supportable bandwidth part delay time type to the base station.

When the UE receives the DCI including the bandwidth part change indicator in slot n according to the requirement for the bandwidth part change delay time described above, the UE may complete the change to the new bandwidth part indicated by the bandwidth part change indicator at a time point not later than slot n+TBWP, and transmit and receive the data channel scheduled by the DCI in the changed new bandwidth part. When the base station intends to schedule the data channel with a new bandwidth part, the time domain resource allocation for the data channel may be determined in consideration of the bandwidth part change delay time (TBWP) of the UE. That is, when the base station schedules a data channel with a new bandwidth part, in a method of determining time domain resource allocation for the data channel, the base station may schedule the corresponding data channel after the bandwidth part change delay time. Accordingly, the UE may not expect that the DCI indicating the bandwidth part change indicates a slot offset (K0 or K2) value smaller than the bandwidth part change delay time (TBWP).

If the UE receives DCI (e.g., DCI format 1_1 or 0_1) indicating a bandwidth part change, the UE may not perform any transmission or reception during the time interval from the third symbol of the slot in which the PDCCH including the corresponding DCI is received to the start point of the slot indicated by the slot offset (K0 or K2) value indicated by the time domain resource allocation indicator field in the corresponding DCI. For example, if the UE receives a DCI indicating a bandwidth part change in slot n, and the slot offset value indicated by the DCI is K, the UE may not perform any transmission or reception from the third symbol of slot n to the previous symbol of slot n+K (i.e., the last symbol of slot n+K−1).

[SS/PBCH Block]

Next, a synchronization signal (SS)/PBCH block in a 5G will be described.

The SS/PBCH block may refer to a physical layer channel block composed of a primary SS (PSS), a secondary SS (SSS), and a PBCH. Specifically, it is as follows.

PSS: a signal that serves as a reference of downlink time/frequency synchronization and provides some information on cell ID.

SSS: serves as a reference of downlink time/frequency synchronization, and provides remaining cell ID information not provided by PSS. Additionally, the SSS may serve as a reference signal for demodulation of the PBCH.

PBCH: provides essential system information necessary for transmitting and receiving data channel and control channel of the UE. The essential system information may include search space-related control information indicating radio resource mapping information of a control channel, scheduling control information on a separate data channel for transmitting system information, and the like.

SS/PBCH block: the SS/PBCH block consists of a combination of PSS, SSS, and PBCH. One or a plurality of SS/PBCH blocks may be transmitted within 5 ms, and each transmitted SS/PBCH block may be distinguished by an index.

The UE may detect the PSS and SSS in the initial access stage and may decode the PBCH. The UE may obtain the MIB from the PBCH, and may receive the control resource set (CORESET) #0 (which may correspond to a control resource set having a control resource set index of 0) configured therefrom. The UE may perform monitoring on the control resource set #0, assuming that the selected SS/PBCH block and a demodulation reference signal (DMRS) transmitted from the control resource set #0 are quasi co location (QCL). The UE may receive system information as downlink control information transmitted from the control resource set #0. The UE may obtain a random access channel (RACH) related configuration information required for initial access from the received system information. The UE may transmit a physical RACH (PRACH) to the base station in consideration of the selected SS/PBCH index, and the base station receiving the PRACH may obtain information on the SS/PBCH block index selected by the UE. The base station may recognize which block the UE has selected from each of the SS/PBCH blocks and monitors the control resource set #0 related thereto.

[PDCCH: Related to DCI]

Next, downlink control information (DCI) in the 5G system will be described in detail.

In the 5G system, scheduling information on uplink data (or physical uplink shared channel, PUSCH) or downlink data (or physical downlink shared channel, PDSCH) may transmitted from a base station to a UE through DCI. The UE may monitor a DCI format for fallback and a DCI format for non-fallback for PUSCH or PDSCH. The DCI format for fallback may consist of a fixed field predefined between the base station and the UE, and the DCI format for non-fallback may include a configurable field.

The DCI may be transmitted through a physical downlink control channel (PDCCH) after channel coding and modulation process. A cyclic redundancy check (CRC) is attached to the DCI message payload, and the CRC may be scrambled with a radio network temporary identifier (RNTI) corresponding to the identity of the UE. Different RNTIs may be used according to the purpose of the DCI message, for example, UE-specific data transmission, a power control command, or a random access response. That is, the RNTI is not explicitly transmitted, but is included in the CRC calculation process and transmitted. Upon receiving the DCI message transmitted over the PDCCH, the UE identifies the CRC using the assigned RNTI, and if the CRC identification result is correct, the UE may recognize that the message has been transmitted to the UE.

For example, DCI scheduling a PDSCH for system information (SI) may be scrambled with SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying a transmit power control (TPC) may be scrambled with TPC-RNTI. DCI for scheduling UE-specific PDSCH or PUSCH may be scrambled with cell RNTI (C-RNTI).

DCI format 0_0 may be used as a fallback DCI for scheduling PUSCH, and in this case, CRC may be scrambled with C-RNTI. DCI format 0_0 in which CRC is scrambled with C-RNTI may include, for example, information as illustrated in Table 4 below.

TABLE 4

Identifier for DCI formats - 1 bit
Frequency domain resource assignment - $\lceil \log_2(N_{RB}^{UL, BWP}(N_{RB}^{UL, BWP} + 1)/2) \rceil$ bits
Time domain resource assignment - X bits
Frequency hopping flag - 1 bit
Modulation and coding scheme - 5 bits
New data indicator - 1 bit
Redundancy version - 2 bits
HARQ process number - 4 bits
TPC command for scheduled PUSCH (transmit power control command for scheduled PUSCH) - [2] bits
UL/SUL indicator (uplink/supplementary UL indicator) - 0 or 1 bit DCI format 0_1 may be used as a non-fallback DCI for scheduling PUSCH, and in this case, CRC may be scrambled with C-RNTI. DCI format 0_1 in which CRC is scrambled with C-RNTI may include, for example, information as illustrated in Table 5 below.

TABLE 5

Carrier indicator - 0 or 3 bits
UL/SUL indicator - 0 or 1
Identifier for DCI formats - [1] bits
Bandwidth part indicator - 0, 1 or 2 bits TABLE 5-continued Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
Time domain resource assignment - 0, 1, 2, 3, or 4 bits
VRB-to-PRB mapping (virtual resource block-to-physical resource block mapping) - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
$1^{st}$ downlink assignment index - 1 or 2 bits:
    1 bit for semi-static HARQ-ACK codebook;
    2 bits for dynamic HARQ-ACK codebook with single HARQ-ACK codebook.
$2^{nd}$ downlink assignment index - 0 or 2 bits:
    2 bits for dynamic HARQ-ACK codebook with two HARQ-ACK sub-codebooks;
    0 bit otherwise.
TPC command for scheduled - 2 bits SRS resource indicator $- \left\lceil \log_2 \left( \sum_{k=1}^{L_{max}} \binom{N_{SRS}}{k} \right) \right\rceil$ or $\lceil \log_2(N_{SRS}) \rceil$ bits $\left\lceil \log_2 \left( \sum_{k=1}^{L_{max}} \binom{N_{SRS}}{k} \right) \right\rceil$ bits for non–codebook based PUSCH transmission;
$\lceil \log_2(N_{SRS}) \rceil$ bits for codebook based PUSCH transmission.
Precoding information and number of layers - up to 6 bits
Antenna ports - up to 6 bits
SRS request - 2 bits
CSI request (channel state information request) - 0, 1, 2, 3, 4, 5, or 6 bits
CBG transmission information (code block group transmission information) - 0, 2, 4, 6, or 8 bits
PTRS-DMRS association (phase tracking reference signal-demodulation reference signal association) - 0 or 2 bits.
    beta_offset indicator - 0 or 2 bits
    DMRS sequence initialization (demodulation reference signal sequence initialization) - 0 or 1 bit DCI format 1_0 may be used as a fallback DCI for scheduling PDSCH, and in this case, CRC may be scrambled with C-RNTI. DCI format 1_0 in which CRC is scrambled with C-RNTI may include, for example, information as illustrated in Table 6 below.

TABLE 6

Identifier for DCI formats - [1] bit
Frequency domain resource assignment - $\lceil \log_2(N_{RB}^{DL,\ BWP}(N_{RB}^{DL,\ BWP} + 1)/2) \rceil$ bits
Time domain resource assignment - X bits
VRB-to-PRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator (physical uplink control channel resource indicator)- 3 bits
PDSCH-to-HARQ_feedback timing indicator - [3] bits DCI format 1_1 may be used as a non-fallback DCI for scheduling PDSCH, and in this case, CRC may be scrambled with C-RNTI. DCI format 1_1 in which CRC is scrambled with C-RNTI may include, for example, information as illustrated in Table 7 below.

TABLE 7

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{UL,\ BWP}/P \rceil$ bits
    For resource allocation type 1, $\lceil \log_2(N_{RB}^{UL,\ BWP}(N_{RB}^{UL,\ BWP} + 1)/2) \rceil$ bits
Time domain resource assignment - 0, 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator (physical resource block bundling size indicator) - 0 or 1 bit
Rate matching indicator - 0, 1, or 2 bits
ZP CSI-RS trigger (zero-power channel state information reference signal trigger) - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information (code block group flushing out information) - 0 or 1 bit
DMRS sequence initialization - 1 bit.

[PDCCH: CORESET, REG, CCE, Search Space]

Hereinafter, a downlink control channel in a 5G communication system will be described in more detail with reference to the drawings.

Figure 4:
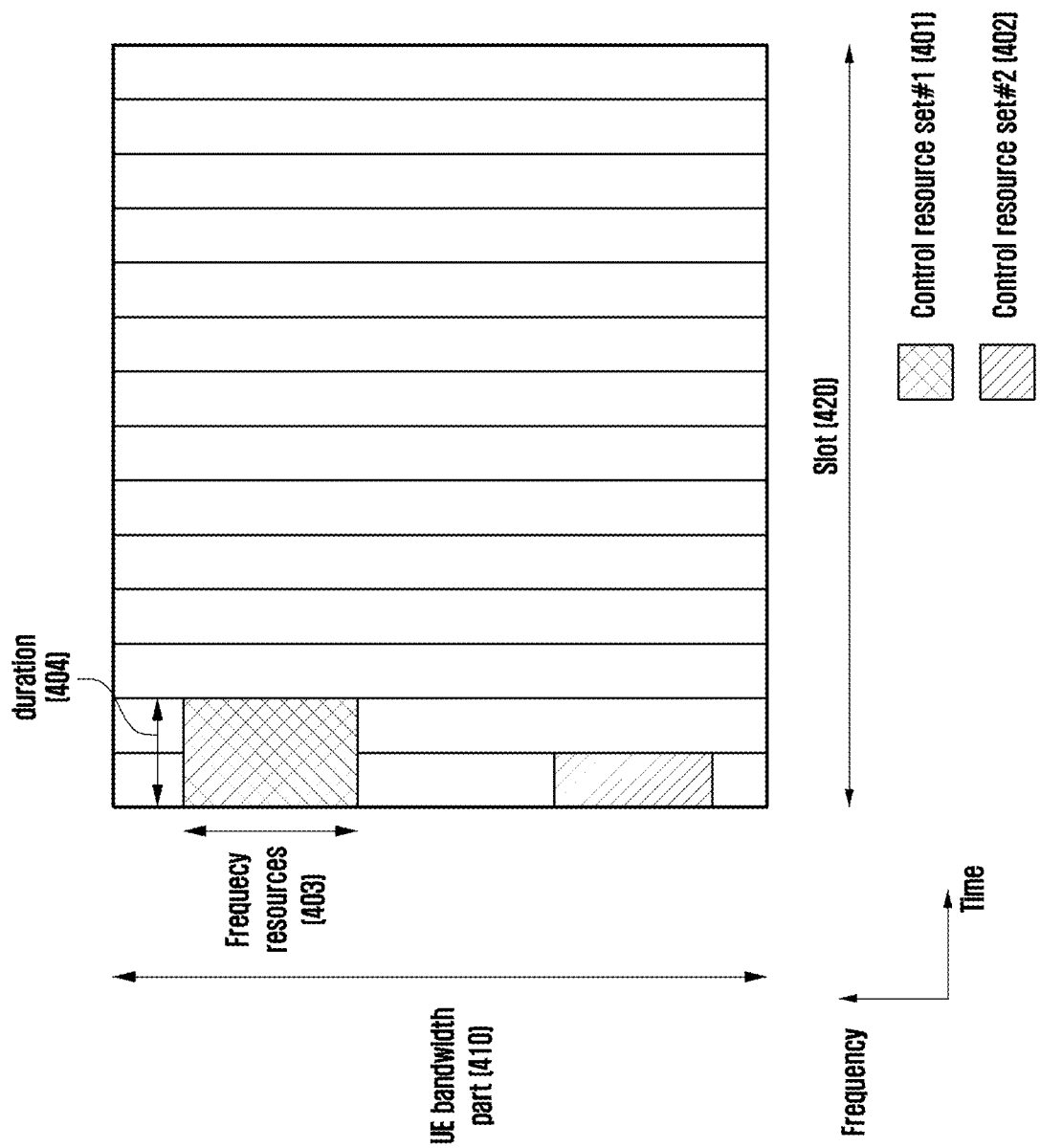
FIG. 4 is a diagram illustrating an example of configuring a control area of a downlink control channel in a wireless communication system according to an embodiment of the disclosure.

FIG. 4 is a diagram illustrating an example of a control resource set (CORESET) in which a downlink control channel is transmitted in a 5G wireless communication system. FIG. 4 illustrates an example that a UE bandwidth part 410 is configured on the frequency axis and two control sets, resource set #1 401 and control resource set #2 402, are configured in one slot 420 on the time axis. The control resource sets 401 and 402 may be configured to a specific frequency resource 403 within the entire UE bandwidth part 410 on the frequency domain. The control resource sets 401 and 402 may be configured to one or a plurality of OFDM symbols on the time axis, and this may be defined as a control resource set duration 404. Referring to the example illustrated in FIG. 4, control resource set #1 401 is configured to a control resource set duration of 2 symbols, and control resource set #2 402 is configured to a control resource set duration of 1 symbol.

The control resource set in the above-described 5G may be configured by the base station to the UE through upper layer signaling (e.g., system information, master information block (MIB), and radio resource control (RRC) signaling). Configuring the control resource set to the UE refers to providing information such as a control resource set identifier (identity), a frequency position of the control resource set, and a symbol length of the control resource set, etc. For example, the information such as Table 8 below may be included.

TABLE 8

```
ControlResourceSet ::=                          SEQUENCE {
  -- Corresponds to L1 parameter 'CORESET-ID'
  controlResourceSetId            ControlResourceSetId,
  (control resource set Identity))
  frequencyDomainResources        BIT STRING (SIZE (45)),
  (frequency domain resource allocation information)
  duration                        INTEGER (1..maxCoReSetDuration),
  (time domain resource allocation information)
  cce-REG-MappingType                           CHOICE {
  interleaved                                   SEQUENCE {
    reg-BundleSize                ENUMERATED {n2, n3, n6},
    precoderGranularity           ENUMERATED    {sameAsREG-bundle,
allContiguousRBs},
    interleaverSize               ENUMERATED {n2, n3, n6}
    shiftIndex
    INTEGER(0..maxNrofPhysicalResourceBlocks-1)
    OPTIONAL
      (Interleaver Shift))
},
  nonInterleaved                                NULL
  },
  tci-StatesPDCCH                 SEQUENCE(SIZE  (1..maxNrofTCI-
StatesPDCCH)) OF TCI-StateId                    OPTIONAL,
    (QCL configuration information)
  tci-PresentInDCI                ENUMERATED
{enabled}
                                  OPTIONAL,     -- Need S
}
```

In Table 8, the tci-StatesPDCCH (simply named as transmission configuration indication (TCI) state) configuration information may include information on one or more synchronization signals (SS)/physical broadcast channel (PBCH) block indexes in a Quasi co-located (QCL) relationship with DMRS transmitted in a corresponding control resource set or CSI-RS (channel state information reference signal) indexes.

Figure 5A:
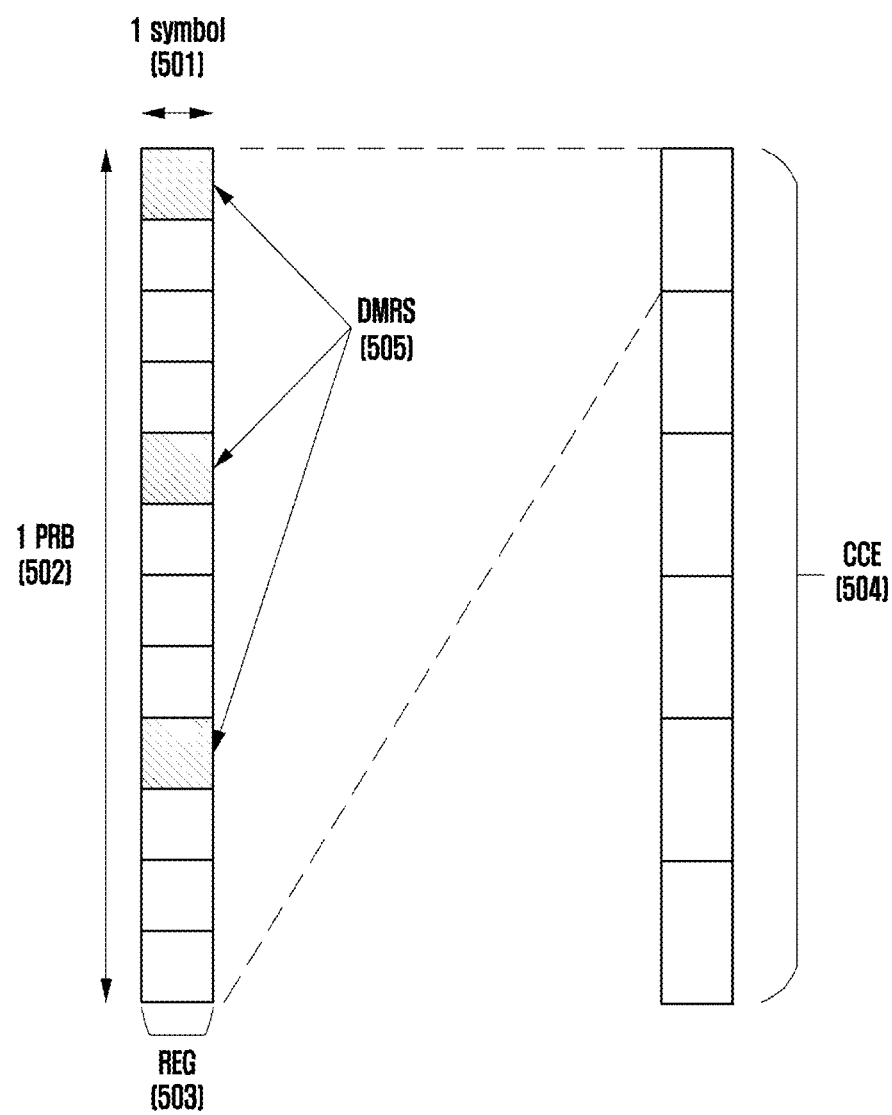
FIG. 5A is a diagram illustrating a structure of a downlink control channel in a wireless communication system according to an embodiment of the disclosure.

FIG. 5A is a diagram illustrating an example of a basic unit of time and frequency resources constituting a downlink control channel that may be used in a 5G. According to FIG. 5A, the basic unit of time and frequency resources constituting the control channel may be referred to as a resource element group (REG) 503, and the REG 503 may be defined as 1 OFDM symbol 501 on the time axis and 1 physical resource block (PRB) 502 on the frequency axis, that is, 12 subcarriers. The base station may configure a downlink control channel allocation unit by concatenating the REG 503.

As illustrated in FIG. 5A, when the basic unit to which a downlink control channel is allocated in a 5G is referred to as a control channel element (CCE) 504, one CCE 504 may be composed of a plurality of REGs 503. Describing the REG 503 illustrating in FIG. 5A as an example, REG 503 may be composed of 12 REs, and if 1 CCE 504 is composed of 6 REGs 503, 1 CCE 504 may be composed of 72 REs. When the downlink control resource set is configured, the corresponding area may be composed of a plurality of CCEs 504, and a specific downlink control channel is mapped to one or more CCEs 504 according to the aggregation level (AL) in the control area and transmitted. The CCEs 504 in the control resource set are divided by numbers, and in this case, numbers of the CCEs 504 may be assigned according to a logical mapping method.

The basic unit of the downlink control channel, i.e., REG 503 illustrated in FIG. 5A, may include both REs to which DCI is mapped and areas to which a demodulation reference signal (DMRS) 505 which is a reference signal (RS) for decoding the REs, is mapped. As illustrated in FIG. 5A, 3 DMRSs 505 may be transmitted within one REG 503. The number of CCEs required to transmit the PDCCH may be 1, 2, 4, 8, or 16 depending on the aggregation level (AL), and different numbers of CCEs may be used to implement link adaptation of the downlink control channel. For example, when AL=L, one downlink control channel may be transmitted through L CCEs. The UE needs to detect a signal without figuring out information on the downlink control channel, for blind decoding, a search space indicating a set of CCEs is defined. Because the search space is a set of downlink control channel candidates consisting of CCEs that the UE may attempt to decode on a given aggregation level, and there are several aggregation levels that make one bundle with 1, 2, 4, 8 or 16 CCEs, the UE may have a plurality of search spaces. The search space set may be defined as a set of search spaces in all configured aggregation levels.

The search space may be classified into a common search space and a UE-specific search space. A certain group of UEs or all UEs may investigate the common search space of the PDCCH to receive cell-common control information such as dynamic scheduling for system information or a paging message. For example, the UEs may receive the PDSCH scheduling allocation information on transmission of the SIB including the operator information of the cell by investigating the common search space of the PDCCH. In the case of the common search space, because a certain group of UEs or all UEs may receive the PDCCH, the common search space may be defined as a set of promised CCEs. The scheduling assignment information on the UE-specific PDSCH or PUSCH may be received by investigating the UE-specific search space of the PDCCH. The UE-specific search space may be UE-specifically defined as a function of the UE's identity and various system parameters.

In the 5G, the parameter for the search space for the PDCCH may be configured from the base station to the UE through upper layer signaling (e.g., SIB, MIB, and RRC signaling). For example, the base station may configure the number of PDCCH candidates in each aggregation level L, a monitoring period for the search space, a monitoring occasion in symbol units in a slot for a search space, a search space type (common search space or UE-specific search space), a combination of a DCI format and RNTI to be monitored in the corresponding search space, a control resource set index for monitoring the search space, and the like to the UE. For example, the following information may be included as illustrated in Table 9 below.

TABLE 9

```
SearchSpace ::=                                SEQUENCE {
    -- Identity of the search space. SearchSpaceId = 0 identifies the SearchSpace configured
via PBCH (MIB) or ServingCellConfigCommon.
    searchSpaceId                              SearchSpaceId,
    controlResourceSetId                       ControlResourceSetId,
    monitoringSlotPeriodicityAndOffset         CHOICE {
    (monitoring slot level periodicity)
        sl1                                    NULL,
        sl2                                    INTEGER (0..1),
        sl4                                    INTEGER (0..3),
        sl5                                    INTEGER (0..4),
        sl8                                    INTEGER (0..7),
        sl10                                   INTEGER (0..9),
        sl16                                   INTEGER (0..15),
        sl20                                   INTEGER (0..19)
    }
    OPTIONAL,
    duration(monitoring length)   INTEGER (2..2559)
    monitoringSymbolsWithinSlot                BIT STRING (SIZE (14))
                                               OPTIONAL,
    (monitoring symbols within slot)
    nrofCandidates                             SEQUENCE {
    (number of PDCCH candidates by aggregation level)
        aggregationLevel1        ENUMERATED {n0, n1, n2, n3, n4, n5, n6, n8},
        aggregationLevel2        ENUMERATED {n0, n1, n2, n3, n4, n5, n6, n8},
        aggregationLevel4        ENUMERATED {n0, n1, n2, n3, n4, n5, n6, n8},
        aggregationLevel8        ENUMERATED {n0, n1, n2, n3, n4, n5, n6, n8},
        aggregationLevel16       ENUMERATED {n0, n1, n2, n3, n4, n5, n6, n8}
    },
    searchSpaceType                            CHOICE {
    -- Configures this search space as common search space (CSS) and DCI formats to
monitor.
        common                                 SEQUENCE {
        (common search space)
        }
        ue-Specific                            SEQUENCE {
        (UE-specific search space)
        -- Indicates whether the UE monitors in this USS for DCI formats 0-0 and 1-0 or for
formats 0-1 and 1-1.
            formats              ENUMERATED {formats0-0-And-1-0, formats0-
1-And-1-1},
            ...
        }
```

According to the configuration information, the base station may configure one or a plurality of search space sets to the UE. According to some embodiments, the base station may configure the search space set #1 and the search space set #2 to the UE, in search space set 1, the UE may be configured to monitor DCI format A scrambled with X-RNTI in a common search space, and in search space set 2, the UE may be configured to monitor DCI format B scrambled with Y-RNTI in the UE-specific search space.

According to the configuration information, one or a plurality of search space sets may exist in the common search space or the UE-specific search space. For example, the search space set #1 and the search space set #2 may be configured as the common search space, and the search space set #3 and the search space set #4 may be configured as the UE-specific search space.

In the common search space, a combination of the following DCI format and RNTI may be monitored. Of course, it is not limited to the following examples:
 DCI format 0_0/1_0 with CRC scrambled by C-RNTI, CS-RNTI, SP-CSI-RNTI, RA-RNTI, TC-RNTI, P-RNTI, SI-RNTI;
 DCI format 2_0 with CRC scrambled by SFI-RNTI;
 DCI format 2_1 with CRC scrambled by INT-RNTI;
 DCI format 2_2 with CRC scrambled by TPC-PUSCH-RNTI, TPC-PUCCH-RNTI; and
 DCI format 2_3 with CRC scrambled by TPC-SRS-RNTI.

In the UE-specific search space, a combination of the following DCI format and RNTI may be monitored. Of course, it is not limited to the following examples:
 DCI format 0_0/1_0 with CRC scrambled by C-RNTI, CS-RNTI, TC-RNTI; and
 DCI format 1_0/1_1 with CRC scrambled by C-RNTI, CS-RNTI, TC-RNTI.

The specified RNTIs may follow the definitions and uses below:
 C-RNTI (Cell RNTI): UE-specific PDSCH scheduling purpose;
 TC-RNTI (Temporary Cell RNTI): UE-specific PDSCH scheduling purpose;
 CS-RNTI (Configured Scheduling RNTI): Semi-statically configured UE-specific PDSCH scheduling purpose;
 RA-RNTI (Random Access RNTI): PDSCH scheduling purpose in the random access phase;
 P-RNTI (Paging RNTI): PDSCH scheduling purpose for which paging is transmitted;
 SI-RNTI (System Information RNTI): PDSCH scheduling purpose in which system information is transmitted;

INT-RNTI (Interruption RNTI): Used to indicate whether PDSCH is puncturing;
TPC-PUSCH-RNTI (Transmit Power Control for PUSCH RNTI): Used to indicate power control command for PUSCH;
TPC-PUCCH-RNTI (Transmit Power Control for PUCCH RNTI): Used to indicate power control command for PUCCH; and
TPC-SRS-RNTI (Transmit Power Control for SRS RNTI): Used to indicate power control command for SRS.

The above specified DCI formats may follow the definition such as the Table 10 below.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G, the search space of the aggregation level L in the control resource set p and the search space set s may be expressed as the following Equation 1.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 1]}$$

L: aggregation level
$n_{CI}$: carrier index
$N_{CCE,p}$: the total number of CCEs present in the control area p
$n_{s,f}^{\mu}$: slot index
$M_{p,s,max}^{(L)}$: the number of PDCCH candidates of aggregation level L
$m_{snCI} = 0, \ldots, M_{p,s,max}^{(L)} - 1$: PDCCH candidate index of aggregation level L
$i = 0, \ldots, L-1$ $$Y_{p,n_{s,f}^{\mu}} = \left( A_p \cdot Y_{p,n_{s,f}^{\mu}-1} \right) \bmod D,$$

$Y_{p,-1} = n_{RNTI} \ne 0$, $A_0 = 39827$, $A_1 = 39829$, $A_2 = 39839$, $D = 65537$
$n_{RNTI}$: UE identity
The $Y_{p,n_{s,f}^{\mu}}$ value may correspond to 0 in the case of a common search space.
The $Y_{p,n_{s,f}^{\mu}}$ value that changes depending on the UE's identity (C-RNTI or ID configured for the UE by the base station) and the time index in the UE-specific search space.

In 5G, as a plurality of search space sets may be configured with different parameters (e.g., parameters in Table 9), the set of search space sets monitored by the UE at every time point may vary. For example, if search space set #1 is configured with X-slot period and search space set #2 is configured with Y-slot period and X and Y are different, the UE may monitor both the search space set #1 and the search space set #2 in a specific slot, and may monitor one of the search space set #1 and the search space set #2 in another specific slot.

[PDCCH: Span]

The UE may perform UE capability reporting for each subcarrier spacing in the case of having a plurality of PDCCH monitoring occasions within a slot, and in this case, the concept of span may be used. The span refers to continuous symbols for the UE to monitor the PDCCH in the slot, and each PDCCH monitoring occasion is within one span. The span may be expressed as (X, Y), where X refers to the minimum number of symbols that may be separated between the first symbols of two consecutive spans, and Y refers to the number of consecutive symbols capable of monitoring the PDCCH within one span. In this case, the UE may monitor the PDCCH in the interval within the Y symbol from the first symbol of the span in the span.

Figure 5B:
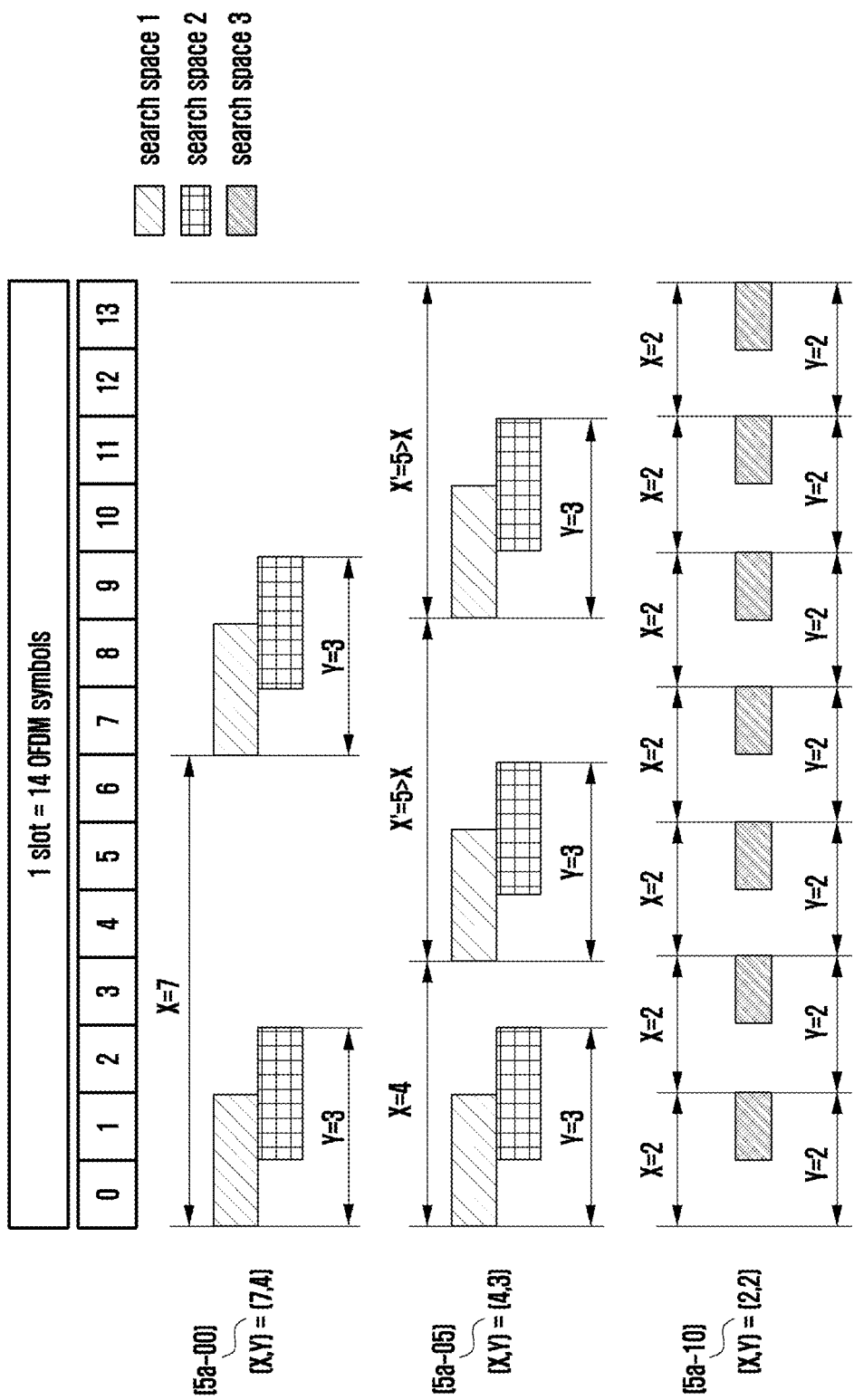
FIG. 5B is a diagram illustrating a case in which a UE may have a plurality of PDCCH monitoring occasions within a slot through a Span in a wireless communication system according to an embodiment of the disclosure.

FIG. 5B is a diagram illustrating a case in which a UE may have a plurality of PDCCH monitoring occasions within a slot through a span in a wireless communication system. The span may be (X, Y)=(7, 3), (4, 3), and (2, 2), and the three cases are illustrated as 5a-00, 5a-05, and 5a-10 in FIG. 5B, respectively. As an example, 5a-00 represents a case in which two spans that may be expressed as (7, 3) exist in the slot. The interval between the first symbols of two spans is expressed as X=7, and PDCCH monitoring occasions may exist within a total of Y=3 symbols from the first symbol of each span, and it is indicated that search spaces 1 and 2 exist within Y=3 symbols, respectively. As another example, in 5a-05, the case where there are a total of three spans, which may be expressed as (4, 3), in the slot is expressed, and the interval between the second and third spans was illustrated to be separated by X'=5 symbols greater than X=4.

[PDCCH: UE Capability Report]

The slot location in which the above-described common search space and UE-specific search space are located is indicated by the monitoringSymbolsWitninSlot parameter of Table 9, and the symbol position in the slot is indicated by a bitmap through the monitoringSymbolsWithinSlot parameter of Table 9. On the other hand, the symbol position in the slot in which the UE may monitor the search space may be reported to the base station through the following UE capabilities.

In one example of UE capability 1 (hereinafter expressed as FG 3-1), as illustrated in Table 11 below, when one monitoring occasion (MO) for the type 1 and type 3 common search space or UE-specific search space exists in the slot, this UE capability refers to the capability to monitor the corresponding MO when the location of the MO is located within the first 3 symbols in the slot. This UE capability is a mandatory capability that all UEs supporting NR may support, and whether this capability is supported is not explicitly reported to the base station.

TABLE 11

| Index | Feature group | Components | Field name in TS 38.331 [2] |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1-CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

In one example of UE capability 2 (hereinafter expressed as FG 3-2), as illustrated in Table 12 below, when one monitoring occasion (MO) for the common search space or UE-specific search space exists in the slot, this UE capability refers to the capability to monitor the corresponding MO regardless of the start symbol location of the corresponding MO. This UE capability may be selectively supported by the UE (optional), and whether this capability is supported may be explicitly reported to the base station.

TABLE 12

| Index | Feature group | Components | Field name in TS 38.331 [2] |
|---|---|---|---|
| 3-2 | PDCCH monitoring on any span of up to 3 consecutive | For a given UE, all search space configurations are within the same span of 3 | pdcchMonitoringSingleOccasion |

TABLE 12-continued

| Index | Feature group | Components | Field name in TS 38.331 [2] |
|---|---|---|---|
| | OFDM symbols of a slot | consecutive OFDM symbols in the slot | |

In one example of UE capability 3 (hereinafter expressed as FG 3-5, 3-5a, and 3-5b), as illustrated in Table 13 below, when a plurality of monitoring occasions (MO) for the common search space or UE-specific search space exists in the slot, this UE capability indicates a pattern of MO that the UE may monitor. The above-described pattern consists of an interval X between start symbols between different MOs, and a maximum symbol length Y for one MO. The combination of (X, Y) supported by the UE may be one or more of {(2, 2), (4, 3), (7, 3)}. This UE capability may be selectively supported by the UE (optional), and whether this capability is supported and the above-mentioned (X, Y) combination may be explicitly reported to the base station.

TABLE 13

| Index | Feature group | Components | Field name in TS 38.331 [2] |
|---|---|---|---|
| 3-5 | For type 1 CSS with dedicated RRC configuration, type 3 CSS, | For type 1 CSS with dedicated RRC configuration, type 3 CSS, and UE-SS, monitoring occasion can be any OFDM symbol(s) of a slot for Case 2 | pdcch-MonitoringAnyOccasions {3-5. withoutDCI-Gap 3-5a. withDCI-Gap} |

TABLE 13-continued

| Index | Feature group | Components | Field name in TS 38.331 [2] |
|---|---|---|---|
| | and UE-SS, monitoring occasion can be any OFDM symbol(s) of a slot for Case 2 | | |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). | |

TABLE 13-continued

| Feature | | Field name in |
|---|---|---|
| Index | group Components | TS 38.331 [2] |
| | The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report to the base station whether the above-described UE capability 2 and/or UE capability 3 is supported and related parameters. The base station may perform time axis resource allocation for the common search space and the UE-specific search space based on the reported UE capabilities. When allocating the resource, the base station may prevent the UE from positioning the MO at a location where monitoring is not possible.

[DRX]

Figure 6:
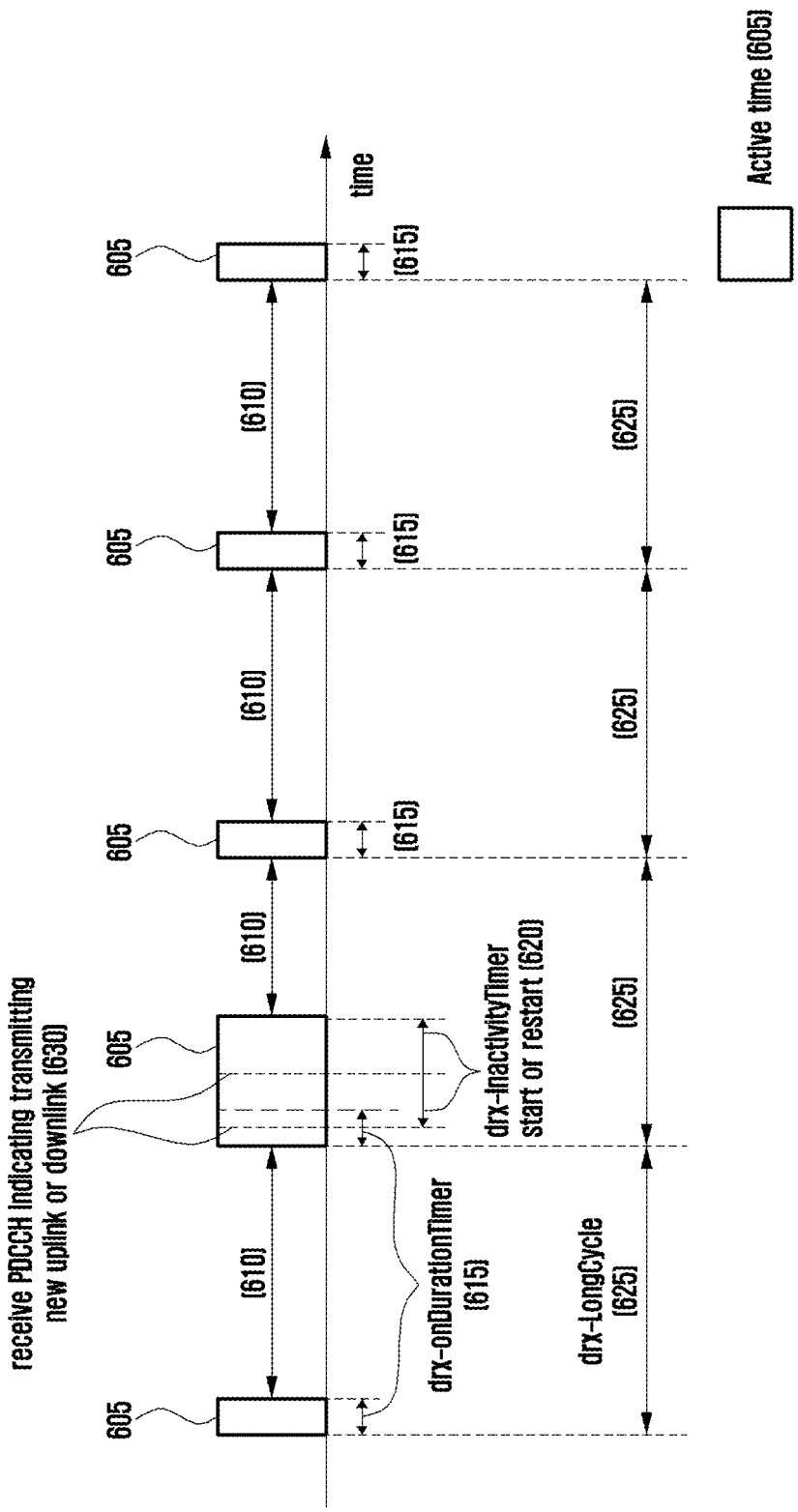
FIG. 6 is a diagram illustrating an example of a DRX operation in a wireless communication system according to an embodiment of the disclosure.

FIG. 6 is a diagram illustrating discontinuous reception (DRX).

The discontinuous reception (DRX) is an operation in which a UE using a service discontinuously receives data in an RRC connected state in which a radio link is established between a base station and the UE. When the DRX is applied, the UE may turn on the receiver at a specific point in time to monitor the control channel, and if there is no data received for a certain period of time, turn off the receiver to reduce power consumption of the UE. The DRX operation may be controlled by the MAC layer based on various parameters and timers.

Referring to FIG. 6, active time 605 is a time during which the UE wakes up every DRX cycle and monitors the PDCCH. The active time 605 may be defined as follows:
  drx-onDurationTimer, drx-Inactivity Timer, drx-RetransmissionTimerDL, drx-RetransmissionTimerUL, or ra-ContentionResolutionTimer is running;
  a Scheduling Request is sent on PUCCH and is pending; or
  a PDCCH indicating a new transmission addressed to the C-RNTI of the MAC entity has not been received after successful reception of a Random Access Response for the Random Access Preamble not selected by the MAC entity among the contention-based Random Access Preamble.

drx-onDurationTimer, drx-InactivityTimer, drx-RetransmissionTimerDL, drx-RetransmissionTimerUL, ra-ContentionResolutionTimer, etc. are timers whose values are set by the base station, and have a function of configuring the UE to monitor the PDCCH when a predetermined condition is satisfied.

drx-onDurationTimer 615 is a parameter for setting the minimum time during which the UE is awake in the DRX cycle. drx-InactivityTimer 620 is a parameter for setting an additional awake time for the UE when receiving a PDCCH 630 indicating a new uplink transmission or downlink transmission. drx-RetransmissionTimerDL is a parameter for setting the maximum time that the UE is awake in order to receive downlink retransmission in the downlink HARQ procedure. drx-RetransmissionTimerUL is a parameter for setting the maximum time that the UE is awake in order to receive uplink retransmission grant in the uplink HARQ procedure. drx-onDurationTimer, drx-Inactivity Timer, drx-RetransmissionTimerDL, and drx-RetransmissionTimerUL may be set to, for example, time, the number of subframes, the number of slots, and the like. ra-ContentionResolutionTimer is a parameter for monitoring PDCCH in a random access procedure.

Inactive time 610 is a time set not to monitor the PDCCH or a time set not to receive the PDCCH during DRX operation, and the remaining time excluding the active time 605 from the total time for performing the DRX operation may be the inactive time 610. If the UE does not monitor the PDCCH during the active time 605, the UE may enter a sleep or inactive state to reduce power consumption.

The DRX cycle refers to a period in which the UE wakes up and monitors the PDCCH. That is, after the UE monitors the PDCCH, the UE refers to a time interval or an on-duration occurrence period until monitoring the next PDCCH. There are two types of DRX cycle, short DRX cycle and long DRX cycle. The short DRX cycle may be optionally applied.

The Long DRX cycle 625 is the longest of the two DRX cycles set in the UE. While operating as the Long DRX, the UE starts the drx-onDurationTimer 615 again at a time point at which the start point (e.g., start symbol) of the drx-onDurationTimer 615 has elapsed by the long DRX cycle 625. When operating as the long DRX cycle 625, the UE may start the drx-onDurationTimer 615 in the slot after the drx-SlotOffset in a subframe satisfying Equation 2 below. Here, the drx-SlotOffset refers to a delay before starting the drx-onDurationTimer 615. The drx-SlotOffset may be set to, for example, time, the number of slots, and the like.

$$[(SFN \times 10) + subframe\ number] modulo(drx\text{-Long-Cycle}) = drx\text{-StartOffset}. \quad [\text{Equation 2}]$$

In this case, drx-LongCycleStartOffset may be used to define a subframe in which the Long DRX cycle 625 and drx-StartOffset may start the Long DRX cycle 625. drx-LongCycleStartOffset may be set to, for example, time, the number of subframes, the number of slots, and the like.

[PDCCH: BD/CCE Limit]

When a plurality of search space sets are configured for the UE, the following conditions may be considered in a method of determining a search space set to be monitored by the UE.

If the UE receives a value of monitoringCapabilityConfig-r16 which is an upper layer signaling, set to r15monitoringcapability, the UE defines the maximum value for the number of PDCCH candidates to be monitored and the number of CCEs constituting the entire search space (here, the entire search space refers to the entire CCE set corresponding to the union area of a plurality of search space sets) per slot. If the UE receives a value of monitoringCapabilityConfig-r16 set to r16monitoringcapability, the UE defines the maximum value for the number of PDCCH candidates to be monitored and the number of CCEs constituting the entire search space (here, the entire search space refers to the entire CCE set corresponding to the union area of a plurality of search space sets) per span.

[Condition 1: Limit the Maximum Number of PDCCH Candidates]

As described above, according to the setting value of upper layer signaling, Mµ, which is the maximum number of PDCCH candidate groups that the UE may monitor, may follow Table 14 when defined on a slot basis in a cell set with a subcarrier spacing of 15·2 μkHz, and follow Table 15 when defined on a span basis.

TABLE 14

| $\mu$ | Maximum number of PDCCH candidates per slot and per serving cell ($M^\mu$) |
|---|---|
| 0 | 44 |
| 1 | 36 |
| 2 | 22 |
| 3 | 20 |

TABLE 15

Maximum number $M^\mu$ of monitored PDCCH candidates per span for combination (X, Y) and per serving cell

| $\mu$ | (2, 2) | (4, 3) | (7, 4) |
|---|---|---|---|
| 0 | 14 | 28 | 44 |
| 1 | 12 | 24 | 36 |

[Condition 2: Limit the Maximum Number of CCE]

As described above, according to the setting value of upper layer signaling, $C\mu$, which is the maximum number of CCEs constituting the entire search space (here, the entire search space refers to the entire CCE set corresponding to the union area of a plurality of search space sets), may follow Table 16 when defined on a slot basis in a cell set with a subcarrier spacing of 15·2 μkHz, and follow Table 17 when defined on a span basis.

TABLE 16

| $\mu$ | Maximum number of non-overlapped CCEs per slot and per serving cell ($C^\mu$) |
|---|---|
| 0 | 56 |
| 1 | 56 |
| 2 | 48 |
| 3 | 32 |

TABLE 17

Maximum number $C^\mu$ of non-overlapped CCEs per span for combination (X, Y) and per serving cell

| $\mu$ | (2, 2) | (4, 3) | (7, 4) |
|---|---|---|---|
| 0 | 18 | 36 | 56 |
| 1 | 18 | 36 | 56 |

For convenience of explanation, a situation that satisfies both conditions 1 and 2 at a specific time point is defined as "condition A." Accordingly, not satisfying condition A may refer to not satisfying at least one of conditions 1 and 2 above.

[PDCCH: Overbooking]

According to the configuration of the search space sets of the base station, the condition A may not be satisfied at a specific time point. If condition A is not satisfied at a specific time point, the UE may select and monitor only some of the search space sets configured to satisfy condition A at the corresponding time point, and the base station may transmit the PDCCH to the selected search space set.

The method below may be followed as a method of selecting some search spaces from among the entire set of search spaces.

When condition A for PDCCH is not satisfied at a specific time point (slot), the UE (or the base station) may preferentially select a search space set in which a search space type is configured as a common search space from among search space sets existing at a corresponding time, over a search space set configured as a UE-specific search space.

When all search space sets configured as the common search space are selected (that is, if condition A is satisfied even after selecting all search spaces set as common search spaces), the UE (or the base station) may select search space sets configured as the UE-specific search space. In this case, when there are a plurality of search space sets configured as the UE-specific search space, a search space set having a low search space set index may have a higher priority. The UE (or the base station) may select the UE-specific search space sets within a range in which condition A is satisfied in consideration of priority.

[QCL, TCI State]

In a wireless communication system, one or more different antenna ports (or it may be replaced by one or more channels, signals, and combinations thereof, but in future descriptions of the disclosure, it may be referred to as different antenna ports for convenience) may be associated with each other by a quasi co-location (QCL) configuration as illustrated in Table 18 below. The TCI state is for notifying a QCL relationship between a PDCCH (or PDCCH DMRS) and another RS or channel, wherein a certain reference antenna port A (reference RS #A) and another target antenna port B (target RS #B) are QCLed to each other refers to that the UE is allowed to apply some or all of the large-scale channel parameters estimated from the antenna port A to the channel measurement from the antenna port B. The QCL may need to associate different parameters according to situations such 1) time tracking affected by average delay and delay spread, 2) frequency tracking affected by Doppler shift and Doppler spread, 3) radio resource management (RRM) affected by average gain, 4) beam management (BM) affected by spatial parameters, etc. Accordingly, NR supports four types of QCL relationships as illustrated in Table 18 below.

TABLE 18

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters such as angle of arrival (AoA), power angular spectrum (PAS) of AoA, angle of departure (AoD), PAS of AoD, transmit/receive channel correlation, transmit/receive beamforming, spatial channel correlation, etc.

The QCL relationship may be established to the UE through RRC parameter TCI-State and QCL-Info as illustrated in Table 19 below. Referring to Table 19, the base station may configure one or more TCI states to the UE and informs the UE of up to two QCL relationships (qcl-Type1 and qcl-Type2) with respect to the RS referring to the ID of the TCI state, that is, the target RS. In this case, each of the QCL information (QCL-Info) included in each TCI state includes a serving cell index and a BWP index of the reference RS indicated by the corresponding QCL information, a type and ID of the reference RS, and a QCL type as illustrated in Table 18.

TABLE 19

```
TCI-State ::=           SEQUENCE {
  tci-StateId           TCI-StateId,
  (ID of corresponding TCI state)
  qcl-Type1             QCL-Info,
  (QCL information of the first reference RS of the RS (target RS) referring to the TCI
state ID)
  qcl-Type2             QCL-Info           OPTIONAL, -- Need
R
  (QCL information of the second reference RS of the RS (target RS) referring to the TCI
state ID)
  ...
}
QCL-Info ::=            SEQUENCE {
  cell                  ServCellIndex      OPTIONAL, -- Need R
  (Serving cell index of the reference RS indicated by the corresponding QCL
information)
  bwp-Id                BWP-Id             OPTIONAL, -- Cond CSI-RS-
Indicated
  (BWP index of reference RS indicated by the corresponding QCL information)
  referenceSignal       CHOICE {
    csi-rs              NZP-CSI-RS-ResourceId,
    ssb                 SSB-Index
  (One of CSI-RS ID or SSB ID indicated by the corresponding QCL information)
  },
  qcl-Type              ENUMERATED {typeA, typeB, typeC,
typeD},
  ...
}
```

Figure 7:
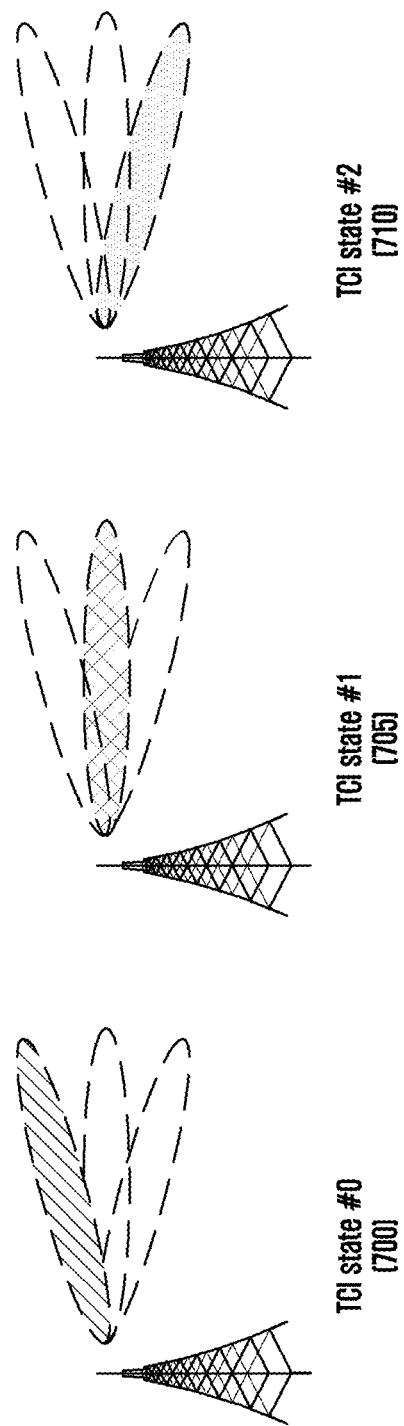
FIG. 7 is a diagram illustrating an example of base station beam allocation according to TCI state configuration in a wireless communication system according to an embodiment of the disclosure.

FIG. 7 is a diagram illustrating an example of base station beam allocation according to TCI state configuration. Referring to FIG. 7, the base station may transmit information on N different beams to the UE through N different TCI states. For example, if N=3, as illustrated in FIG. 7, the base station may notify that the qcl-Type2 parameter included in the three TCI states 700, 705, and 710 is related to the CSI-RS or SSB corresponding to different beams, and the antenna ports referencing the different TCI states 700, 705, or 710 are associated with different spatial Rx parameters, that is, different beams by setting the QCL type D.

Tables 20 to 24 below illustrate valid TCI state configuration according to the target antenna port type.

Table 20 illustrates valid TCI state configuration when the target antenna port is CSI-RS for tracking (TRS). The TRS refers to an NZP CSI-RS in which a repetition parameter is not set but trs-Info is set to true among CSI-RSs. In the case of setting 3 in Table 20, it may be used for aperiodic TRS.

TABLE 20

Valid TCI state configuration when the target antenna port is CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeA | SSB | QCL-TypeD |
| 2 | SSB | QCL-TypeA | CSI-RS (BM) | QCL-TypeD |
| 3 | TRS (periodic) | QCL-TypeA | TRS (same as DL RS 1) | QCL-TypeD |

Table 21 illustrates valid TCI state configuration when the target antenna port is CSI-RS for CSI. The CSI-RS for CSI refers to an NZP CSI-RS in which a parameter representing repetition (e.g., repetition parameter) is not set and trs-Info is also not set to true among CSI-RSs.

TABLE 21

Valid TCI state configuration when the target antenna port is CSI-RS for CSI

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 22 illustrates valid TCI state configuration when the target antenna port is CSI-RS for beam management (BM, same meaning as CSI-RS for L1 RSRP reporting). The CSI-RS for BM refers to an NZP CSI-RS in which a repetition parameter is set to be on or off, and trs-Info is not set to true among CSI-RSs.

TABLE 22

Valid TCI state configuration when the target antenna port is CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 23 illustrates valid TCI state configuration when the target antenna port is PDCCH DMRS.

TABLE 23

Valid TCI state configuration when the target antenna port is PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 24 illustrates valid TCI state configuration when the target antenna port is PDSCH DMRS.

TABLE 24

Valid TCI state configuration when the target antenna port is PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

The typical QCL configuration method according to Tables 20 to 24 is to set and operate the target antenna port and the reference antenna port for each step as "SSB"→"TRS"→"CSI-RS for CSI, or CSI-RS for BM, or PDCCH DMRS, or PDSCH DMRS." Through this, it is possible to help the reception operation of the UE by linking the statistical characteristics that may be measured from the SSB and the TRS to each antenna port.

[PDCCH: Related to TCI State]

Specifically, TCI state combinations applicable to the PDCCH DMRS antenna port are illustrated in Table 25 below. In Table 25, the fourth row is a combination assumed by the UE before RRC setting, and it is impossible to set after RRC.

TABLE 25

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL TypeD |

Figure 8:
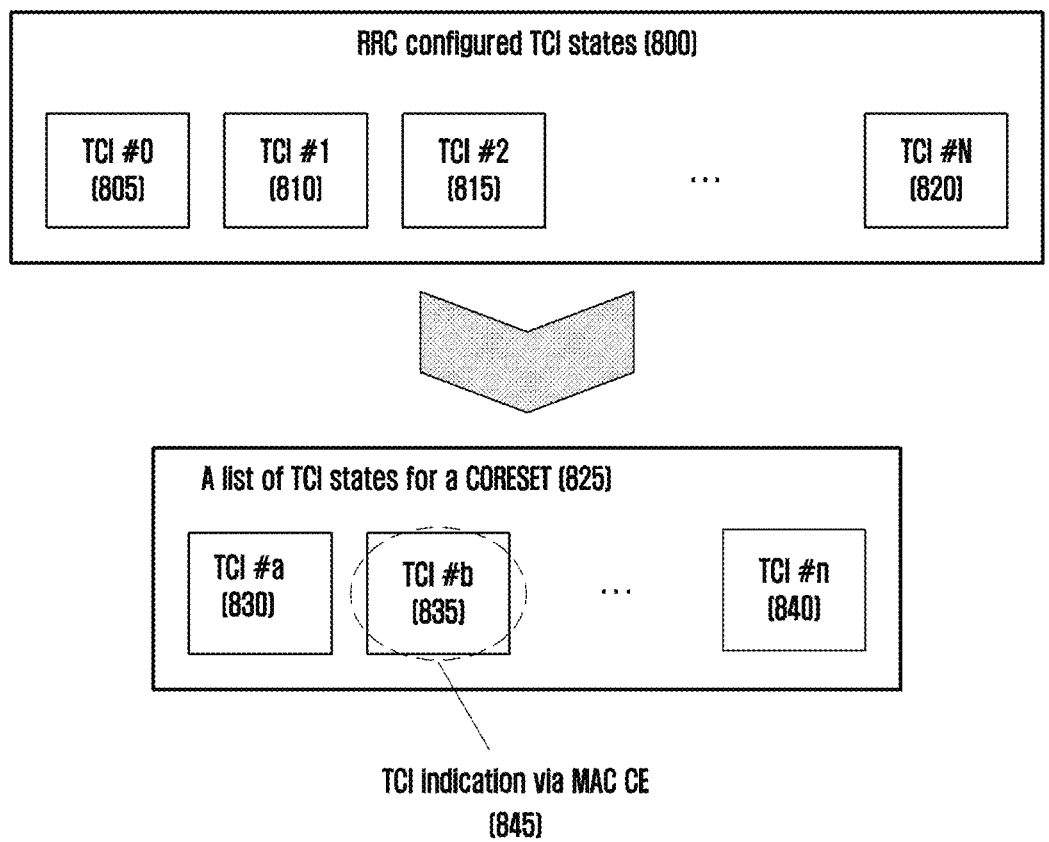
FIG. 8 is a diagram illustrating an example of a TCI state allocation method for a PDCCH in a wireless communication system according to an embodiment of the disclosure.

NR supports a hierarchical signaling method as illustrated in FIG. 8 for dynamic allocation of a PDCCH beam. Referring to FIG. 8, the base station may configure N TCI states 805, 810, . . . , 820 to the UE through RRC signaling 800, and some of them may be configured as the TCI state for a CORESET 825. Thereafter, the base station may indicate one of the TCI states 830, 835, and 840 for the CORESET to the UE through MAC CE signaling 845. Thereafter, the UE may receive the PDCCH based on beam information included in the TCI state indicated by the MAC CE signaling.

Figure 9:
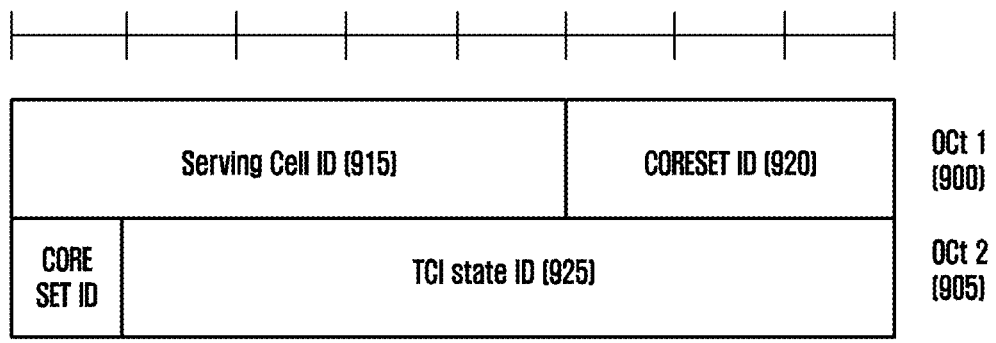
FIG. 9 is a diagram illustrating a TCI indication MAC CE signaling structure for PDCCH DMRS in a wireless communication system according to an embodiment of the disclosure.

FIG. 9 is a diagram illustrating a TCI indication MAC CE signaling structure for the PDCCH DMRS.

Referring to FIG. 9, the TCI indication MAC CE signaling for the PDCCH DMRS may consist of 2 bytes (16 bits), and include a 5-bit serving cell ID 915, a 4-bit CORESET ID 920, and a 7-bit TCI state ID 925.

Figure 10:
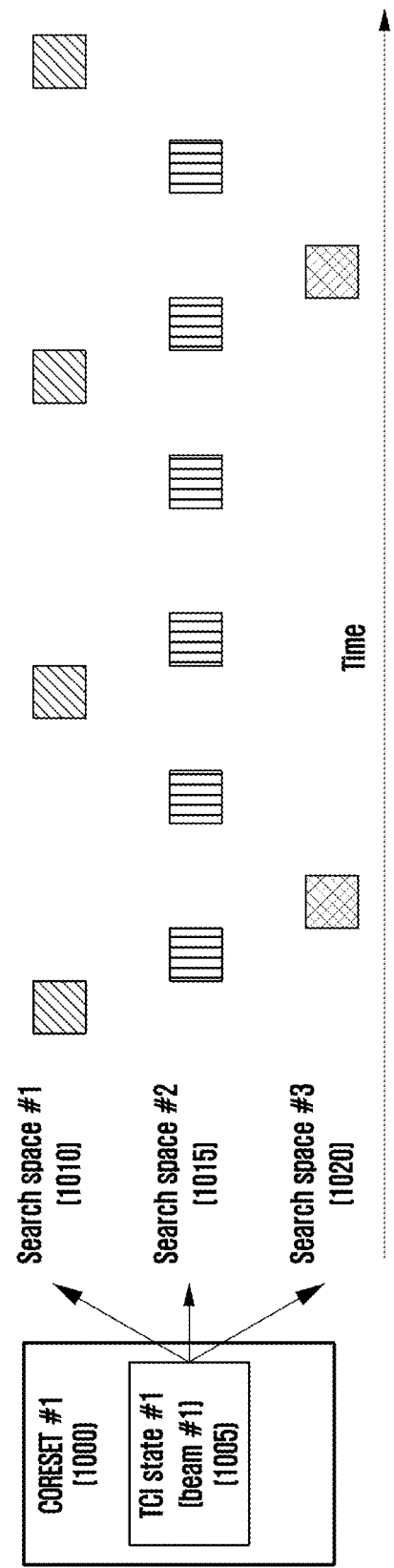
FIG. 10 is a diagram illustrating an example of beam configuration of a control resource set and a search space in a wireless communication system according to an embodiment of the disclosure.

FIG. 10 is a diagram illustrating an example of beam configuration of a control resource set (CORESET) and a search space according to the above description.

Referring to FIG. 10, the base station may indicate one of the TCI state lists included in the CORESET 1000 configuration through MAC CE signaling 1005. Thereafter, until another TCI state is indicated to the corresponding CORESET through another MAC CE signaling, the UE considers that the same QCL information (beam #1) 1005 is applied to one or more search spaces 1010, 1015, and 1020 connected to the CORESET. The above-described PDCCH beam allocation method has a disadvantage in that it is difficult to indicate a beam change faster than the MAC CE signaling delay, and the same beam is collectively applied to all CORESETs regardless of search space characteristics, making it difficult to operate a flexible PDCCH beam. Hereinafter, embodiments of the disclosure provide a more flexible PDCCH beam configuration and operation method. Hereinafter, in describing an embodiment of the present disclosure, several distinguished examples are provided for convenience of description, but these are not mutually exclusive and may be applied by appropriately combining with each other according to circumstances.

The base station may configure one or more TCI states for a specific control area to the UE, and may activate one of the configured TCI states through a MAC CE activation command. For example, {TCI state #0, TCI state #1, and TCI state #2} is configured in the control area #1, and the base station may transmit, to the UE, a command for activating to assume TCI state #0 as a TCI state for the control area #1 through the MAC CE. Based on the activation command for the TCI state received by the MAC CE, the UE may correctly receive the DMRS of the corresponding control area based on QCL information in the activated TCI state.

For a control area (control area #0) in which the index is set to 0, if the UE has not received a MAC CE activation command for the TCI state of the control area #0, the UE may assume that the DMRS transmitted in the control area #0 is QCLed with the SS/PBCH block identified during the initial access process or the non-contention based random access process not triggered by the PDCCH command.

For a control area (control area #X) in which the index is set to a value other than 0, if the UE has not received configured TCI state for the control area #X, or has received one or more configured TCI states but has not received a MAC CE activation command that activates one of the configured TCI states, the UE may assume that the DMRS transmitted in the control area #X is QCLed with the SS/PBCH block identified during the initial access process.

[PDCCH: Related to QCL Prioritization Rule]

Hereinafter, a QCL priority determination operation for a PDCCH will be described in detail.

The UE may operate as a carrier aggregation in a single cell or band, and when a plurality of control resource sets existing in the activated bandwidth part within a single or multiple subcarriers overlap in time while having the same or different QCL-TypeD characteristics in a specific PDCCH monitoring period, the UE may select a specific control resource set according to the QCL priority determination operation and monitor control resource sets having the same QCL-TypeD characteristic as the corresponding control resource set. That is, when a plurality of control resource sets overlap in time, only one QCL-TypeD characteristic may be received. In this case, the criteria for determining the QCL priority may be as follows:

Criterion 1. A control resource set connected to a common search space with the lowest index within a subcarrier corresponding to the lowest index among subcarriers including a common search space; and Criterion 2. A control resource set connected to a UE-specific search space with the lowest index within a subcarrier corresponding to the lowest index among subcarriers including a UE-specific search space.

As described above, each of the criteria applies the following criteria when the corresponding criteria are not satisfied. For example, when control resource sets overlap in time in a specific PDCCH monitoring period, if all control resource sets are not connected to a common search space but connected to a UE-specific search space, that is, if criterion 1 is not satisfied, the UE may omit application of criterion 1 and apply criterion 2.

When the UE selects the control resource set based on the above-described criteria, two additional matters may be considered for QCL information configured in the control resource set as follows. First, if the first control resource set has a first CSI-RS as a reference signal having a relationship of QCL-TypeD, the first CSI-RS having a relationship of QCL-TypeD is a first SSB, and another second control resource set has a relationship of QCL-TypeD is a first SSB, the UE may consider that the first and second control resource sets have different QCL-TypeD characteristics. Second, if the first control resource set has a first CSI-RS configured on the first subcarrier as a reference signal having a relationship of QCL-TypeD, the first CSI-RS having a relationship of QCL-TypeD is a first SSB, the second control resource set has a second CSI-RS configured in the second subcarrier as a reference signal having a QCL-TypeD relationship, and a reference signal in which the second CSI-RS has a relationship of QCL-TypeD is the same first SSB, the UE may consider that both the control resource sets have the same QCL-TypeD characteristics.

Figure 12:
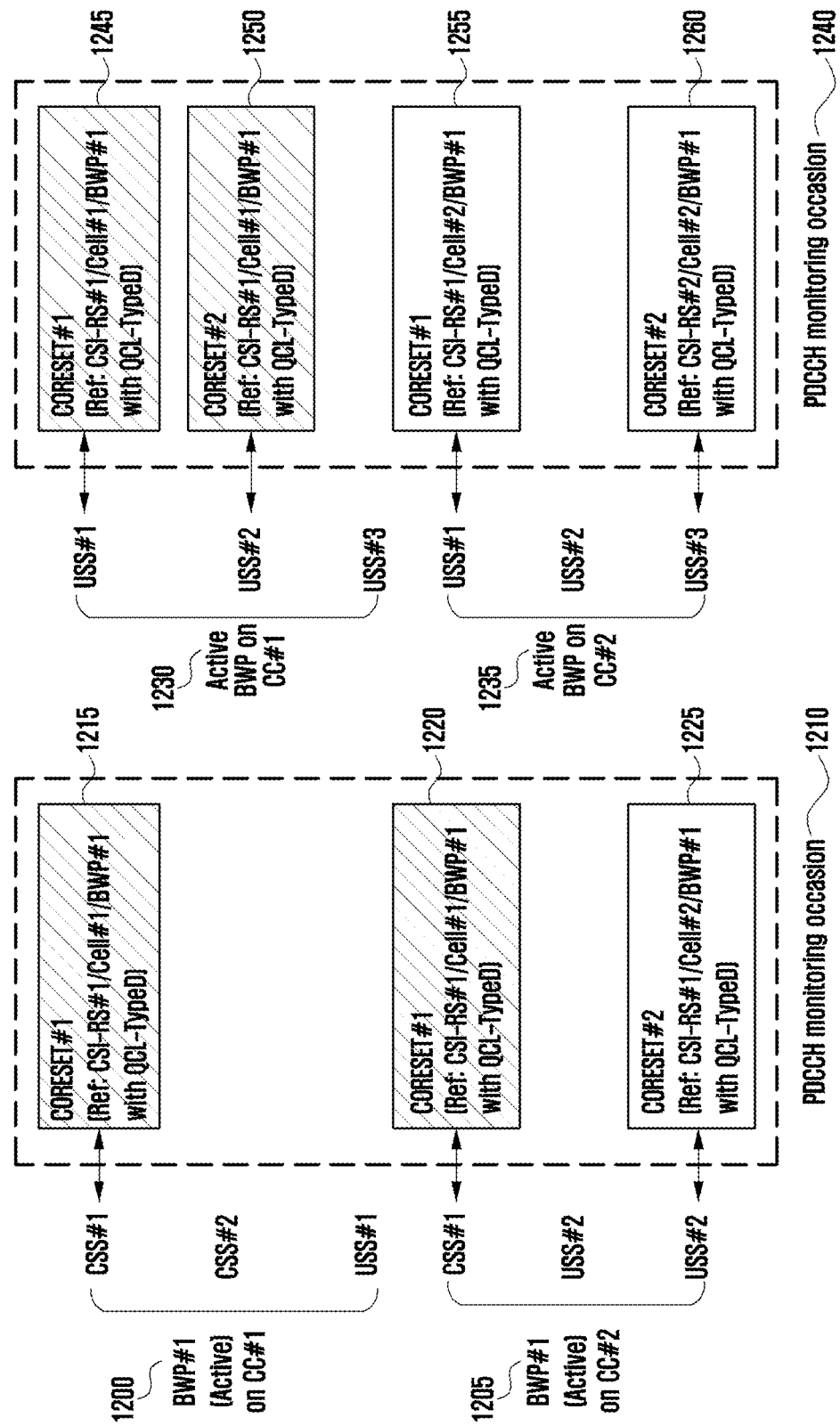
FIG. 12 is a diagram illustrating a method for a UE to select a receivable control resource set in consideration of priority when receiving a downlink control channel in a wireless communication system according to an embodiment of the disclosure.

FIG. 12 is a diagram illustrating a method for a UE to select a receivable control resource set in consideration of priority when receiving a downlink control channel in a wireless communication system according to an embodiment of the disclosure. As an example, the UE may be configured to receive a plurality of control resource sets overlapping in time in a specific PDCCH monitoring period 1210, and the plurality of control resource sets may be connected to a common search space or a UE-specific search space for a plurality of cells. Within the corresponding PDCCH monitoring period, in the first bandwidth part 1200 of the first cell, the first control resource set 1215 connected to the first common search space may exist, and in the first bandwidth part 1205 of the second cell, the first control resource set 1220 connected to the first common search space and the second control resource set 1225 connected to the second UE-specific search space may exist. The control resource set 1215 and 1220 may have a QCL-TypeD relationship with the first CSI-RS resource configured within the first bandwidth part of the first cell, and the control resource set 1225 may have a QCL-TypeD relationship with the first CSI-RS resource configured within the first bandwidth part of the second cell.

Therefore, if criterion 1 is applied to the corresponding PDCCH monitoring period 1210, all other control resource sets having a reference signal of QCL-TypeD such as the first control resource set 1215, may be received. Accordingly, the UE may receive the control resource sets 1215 and 1220 in the corresponding PDCCH monitoring period 1210. As another example, the UE may be configured to receive a plurality of control resource sets overlapping in time in a specific PDCCH monitoring period 1240, and the plurality of control resource sets may be connected to a common search space or a UE-specific search space for a plurality of cells. Within the corresponding PDCCH monitoring period, in the first bandwidth part 1230 of the first cell, the first control resource set 1245 connected to the first UE-specific search space and the second control resource set 1250 connected to the second UE-specific search space may exist, and in the first bandwidth part 1235 of the second cell, the first control resource set 1255 connected to the first UE-specific search space and the second control resource set 1260 connected to the third UE-specific search space may exist.

The control resource set 1245 and 1250 may have a QCL-TypeD relationship with the first CSI-RS resource configured within the first bandwidth part of the first cell, and the control resource set 1255 may have a QCL-TypeD relationship with the first CSI-RS resource configured within the first bandwidth part of the second cell, and the control resource set 1260 may have a QCL-TypeD relationship with the second CSI-RS resource configured within the first bandwidth part of the second cell. However, if criterion 1 is applied to the corresponding PDCCH monitoring period 1240, there is no common search space, so criterion 2, which is the next criterion, may be applied. If criterion 2 is applied to the corresponding PDCCH monitoring period 1240, all other control resource sets having a reference signal of QCL-TypeD such as the control resource set 1245, may be received. Accordingly, the UE may receive the control resource sets 1245 and 1250 in the corresponding PDCCH monitoring period 1240.

[Rate Matching/Puncturing Related]

Hereinafter, a rate matching operation and a puncturing operation will be described in detail.

When the time and frequency resource A to transmit the arbitrary symbol sequence A overlaps the arbitrary time and frequency resource B, a rate matching or a puncturing operation may be considered as the transmission/reception operation of the channel A in consideration of the resource C in the region where the resource A and the resource B overlap. The specific operation may follow the following contents.

[Rate Matching Operation]

The base station may map and transmit the channel A only for the remaining resource regions except for the resource C corresponding to the region overlapping the resource B among all the resources A to which the symbol sequence A is to be transmitted to the UE. For example, when the symbol sequence A is composed of {symbol #1, symbol #2, symbol #3, and symbol 4}, resource A is {resource #1, resource #2, resource #3, and resource #4}, and resource B is {resource #3 and resource #5}, the base station may sequentially map the symbol sequence A to {resource #1, resource #2, and resource #4}, which is the remaining resource except for {resource #3} corresponding to resource C, from among resource A, and may transmit the symbol sequence A. As a result, the base station may map and transmit the symbol sequence {symbol #1, symbol #2, and symbol #3} to {resource #1, resource #2, and resource #4}, respectively.

The UE may determine the resource A and the resource B from the scheduling information on the symbol sequence A from the base station, and through this, the UE may determine the resource C, which is an area where the resource A and the resource B overlap. The UE may receive the symbol sequence A, assuming that the symbol sequence A is mapped and transmitted in the remaining region except for the resource C among all the resources A. For example, when the symbol sequence A is composed of {symbol #1, symbol #2, symbol #3, and symbol 4}, resource A is {resource #1, resource #2, resource #3, and resource #4}, and resource B is {resource #3 and resource #5}, the UE may receive, assuming that the symbol sequence A is sequentially mapped to {resource #1, resource #2, resource #4}, which are the remaining resources except for {resource #3} corresponding to resource C among resource A. As a result, the UE may assume that the symbol sequence {symbol #1, symbol #2, symbol #3} is mapped to {resource #1, resource #2, resource #4} and transmitted, and may perform a subsequent series of reception operations.

[Puncturing Operation]

When there is a resource C corresponding to an area overlapping with the resource B among all the resources A for transmitting the symbol sequence A to the UE, the base station may map the symbol sequence A to the entire resource A, but may not perform transmission in the resource region corresponding to the resource C, and may perform transmission only in the remaining resource regions except for the resource C among the resources A. For example, when the symbol sequence A is composed of {symbol #1, symbol #2, symbol #3, and symbol 4}, resource A is {resource #1, resource #2, resource #3, and resource #4}, and resource B is {resource #3 and resource #5}, the base station may map the symbol sequence A {symbol #1, symbol #2, symbol #3, symbol #4} to resource A {resource #1, resource #2, resource #3, resource #4}, respectively, may transmit only the symbol sequence {symbol #1, symbol #2, symbol #4} corresponding to {resource #1, resource #2, resource #4}, which is the remaining resources except for {resource #3} corresponding to resource C, among resource A, and may not transmit {symbol #3} mapped to {resource #3} corresponding to resource C. As a result, the base station may map and transmit the symbol sequence {symbol #1, symbol #2, and symbol #4} to {resource #1, resource #2, and resource #4}, respectively.

The UE may determine the resource A and the resource B from the scheduling information on the symbol sequence A from the base station, and through this, may determine the resource C, which is an area where the resource A and the resource B overlap. The UE may receive the symbol sequence A, assuming that the symbol sequence A is mapped and transmitted in the remaining region except for the resource C among all the resources A. For example, when the symbol sequence A is composed of {symbol #1, symbol #2, symbol #3, and symbol 4}, resource A is {resource #1, resource #2, resource #3, and resource #4}, and resource B is {resource #3 and resource #5}, the UE may assume that the symbol sequence A {Symbol #1, Symbol #2, Symbol #3, and Symbol #4} is each mapped to the resource A{resource #1, resource #2, resource #3, and resource #4}, but the {symbol #3} mapped to the {resource #3} corresponding to the resource C is not transmitted, and may receive assuming that the symbol sequence {symbol #1, symbol #2, and symbol #4} corresponding to {resource #1, resource #2, resource #4}, which is the remaining resource except for {resource #3} corresponding to resource C, is mapped and transmitted from among resource A. As a result, the UE may assume that the symbol sequence {symbol #1, symbol #2, symbol #4} is mapped to {resource #1, resource #2, resource #4} and transmitted, and may perform a subsequent series of reception operations.

Hereinafter, a method of configuring a rate matching resource for the purpose of rate matching in a 5G communication system will be described. Rate matching refers to that the size of the signal is adjusted in consideration of the amount of resources capable of transmitting the signal. For example, the rate matching of the data channel may refer to that the size of data is adjusted accordingly without mapping and transmitting the data channel for a specific time and frequency resource region.

Figure 11:
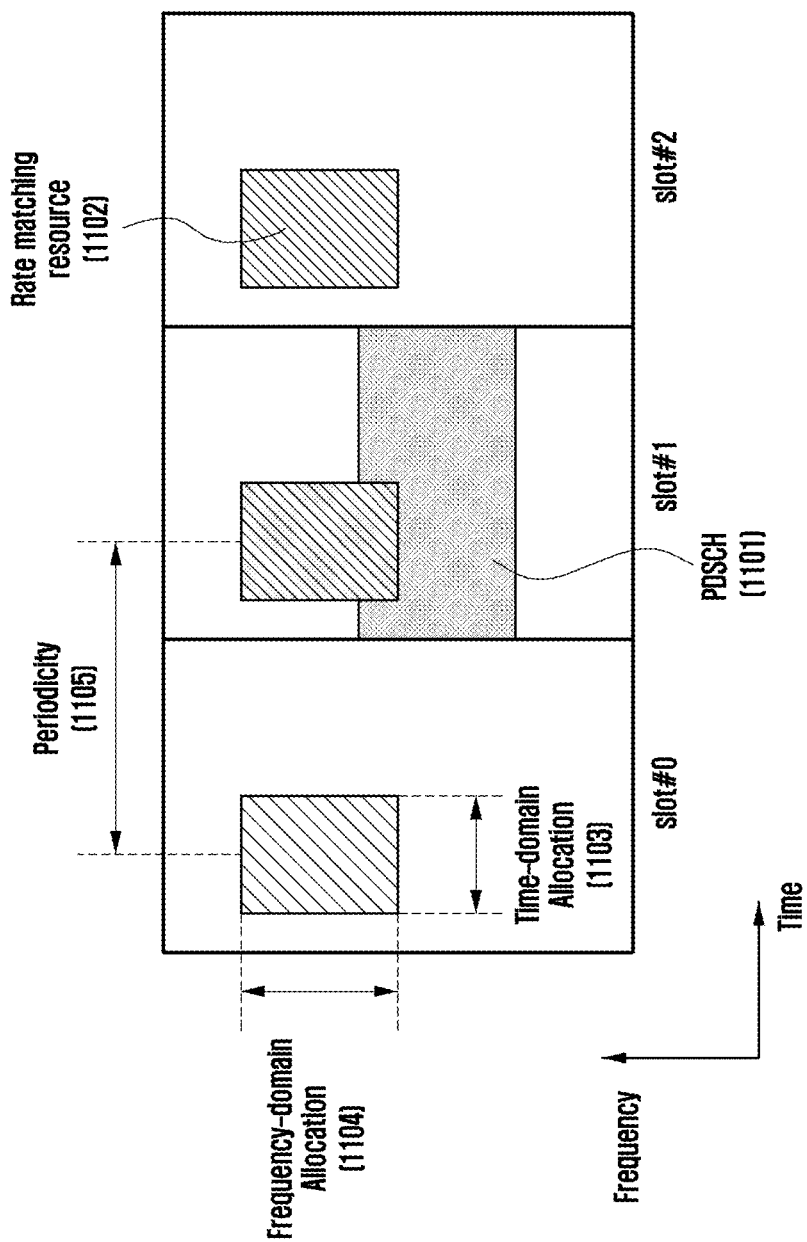
FIG. 11 is a diagram illustrating a method for a base station and a UE to transmit and receive data in consideration of a downlink data channel and a rate matching resource in a wireless communication system according to an embodiment of the disclosure.

FIG. 11 is a diagram illustrating a method for a base station and a UE to transmit and receive data in consideration of a downlink data channel and a rate matching resource.

FIG. 11 illustrates a downlink data channel (PDSCH) 1101 and a rate matching resource 1102. The base station may configure one or more rate matching resources 1102 through upper layer signaling (e.g., RRC signaling) to the UE. The rate matching resource 1102 configuration information may include time-domain resource allocation information 1103, frequency-domain resource allocation information 1104, and period information 1105. In the following, a bitmap corresponding to the frequency-domain resource allocation information 1104 is called a "first bitmap," a bitmap corresponding to the time-domain resource allocation information 1103 is called a "second bitmap," and a bitmap corresponding to the period information 1105 is called "third bitmap." When all or part of the time and frequency resources of the scheduled data channel 1101 overlap with the set rate matching resource 1102, the base station may rate-match and transmit the data channel 1101 in the rate matching resource 1102 part, and the UE may perform reception and decoding after assuming that the data channel 1101 is rate matched in the rate matching resource 1102 part.

The base station may dynamically notify the UE through DCI whether or not to rate-match the data channel in the configured rate matching resource part through additional configuration (corresponds to the "rate matching indicator" in the DCI format described above). Specifically, the base station may select some of the configured rate matching resources and group them into a rate matching resource group, and may indicate the UE whether to rate match the data channel for each rate matching resource group by DCI using a bitmap method. For example, when four rate matching resources, RMR #1, RMR #2, RMR #3, and RMR #4 are configured, the base station may configure RMG #1={RMR #1, RMR #2} and RMG #2={RMR #3, RMR #4} as a rate matching group, and may indicate to the UE whether the rate is matched in RMG #1 and RMG #2, respectively, with a bitmap using 2 bits in the DCI field. For example, when rate matching is to be performed, "1" may be indicated, and when rate matching is not to be performed, "0" may be indicated.

5G supports the granularity of "RB symbol level" and "RE level" as a method of configuring the above-described rate matching resource to the UE. More specifically, the following configuration method may be followed.

[RB Symbol Level]

The UE may receive up to four RateMatchPatterns for each bandwidth part configured through upper layer signaling, and one RateMatchPattern may include the following content:

As a reserved resource in the bandwidth part, a resource in which a time and frequency resource region of the corresponding reserved resource is configured as a combination of an RB-level bitmap and a symbol-level bitmap on the frequency axis may be included. The reserved resource may span one or two slots. A time domain pattern (periodicityAndPattern) in which the time and frequency domains composed of each RB level and symbol level bitmap pair are repeated may be additionally configured; and A time and frequency domain resource region configured as a control resource set in the bandwidth part and a resource region corresponding to a time domain pattern configured as a search space configuration in which the resource region is repeated may be included.

[RE Level]

The UE may receive the following contents configured through upper layer signaling:

As configuration information (lte-CRS-ToMatchAround) for the RE corresponding to the LTE CRS (Cell-specific Reference Signal or Common Reference Signal) pattern, the number of ports of LTE CRS (nrofCRS-Ports) and LTE-CRS-vshift(s) value (v-shift), center subcarrier location information (carrierFreqDL) of LTE carrier from the reference frequency point (e.g., reference point A), bandwidth size (carrierBandwidthDL) information of LTE carrier, subframe configuration information (mbsfn-SubframConfigList) corresponding to MBSFN (Multicast-broadcast single-frequency network), etc. may be included. The UE may determine the location of the CRS in the NR slot corresponding to the LTE subframe based on the above-described information; and Configuration information on a resource set corresponding to one or more ZP (Zero Power) CSI-RSs in the bandwidth part may be included.

[Related to LTE CRS Rate Match]

Next, the rate match procedure for the above-described LTE CRS will be described in detail. For the coexistence of LTE and NR, NR provides a function of configurating a cell specific reference signal (CRS) pattern of LTE to an NR UE. More specifically, the CRS pattern may be provided by RRC signaling including at least one parameter in ServingCellConfig information element (IE) or ServingCellConfigCommon IE. Examples of the parameter may include lte-CRS-ToMatchAround, lte-CRS-PatternList1-r16, lte-CRS-PatternList2-r16, crs-RateMatch-PerCORESETPoolIndex-r16, and the like.

Rel-15 NR provides a function in which one CRS pattern may be configured per serving cell through the lte-CRS-ToMatchAround parameter. In Rel-16 NR, the above function has been extended to enable configuration of a plurality of CRS patterns per serving cell. More specifically, one CRS pattern per one LTE carrier may be configured in a single-TRP (transmission and reception point) configured UE, in the Multi-TRP configured UE, two CRS patterns may be configured per one LTE carrier. For example, in the Single-TRP configured UE, up to three CRS patterns per serving cell may be configured through the lte-CRS-PatternList1-r16 parameter. For another example, a CRS may be configured for each TRP in the multi-TRP configured UE. That is, the CRS pattern for TRP1 may be configured through the lte-CRS-PatternList1-r16 parameter, and the CRS pattern for TRP2 may be configured through the lte-CRS-PatternList2-r16 parameter. On the other hand, when two TRPs are configured as described above, whether to apply both the CRS patterns of TRP1 and TRP2 to a specific PDSCH or whether to apply only the CRS pattern of one TRP is determined through the crs-RateMatch-PerCORESET-PoolIndex-r16 parameter, and if the crs-RateMatch-Per-CORESETPoolIndex-r16 parameter is configured to enabled, only one TRP CRS pattern is applied, and in other cases, both TRP CRS patterns are applied.

Table 26 illustrates the ServingCellConfig IE including the CRS pattern, and Table 27 illustrates the RateMatchPatternLTE-CRS IE including at least one parameter for the CRS pattern.

TABLE 26

```
ServingCellConfig ::=                        SEQUENCE {
    tdd-UL-DL-ConfigurationDedicated             TDD-UL-DL-ConfigDedicated
OPTIONAL,              -- Cond TDD
    initialDownlinkBWP                           BWP-DownlinkDedicated
OPTIONAL,              -- Need M
    downlinkBWP-ToReleaseList                    SEQUENCE (SIZE (1..maxNrofBWPs)) OF
BWP-Id                                       OPTIONAL, -- Need N
    downlinkBWP-ToAddModList                     SEQUENCE (SIZE (1..maxNrofBWPs))
OF BWP-Downlink                              OPTIONAL, -- Need N
    firstActiveDownlinkBWP-Id                    BWP-Id
OPTIONAL,              -- Cond SyncAndCellAdd
    bwp-InactivityTimer                          ENUMERATED {ms2, ms3, ms4, ms5, ms6,
ms8, ms10, ms20, ms30,
                                                 ms40,ms50, ms60,
ms80,ms100, ms200,ms300, ms500,
                                                 ms750, ms1280, ms1920,
ms2560, spare10, spare9, spare8,
                                                 spare7, spare6, spare5, spare4,
spare3, spare2, spare1 }    OPTIONAL, --Need R
    defaultDownlinkBWP-Id                        BWP-Id
OPTIONAL,              -- Need S
    uplinkConfig                                 UplinkConfig
OPTIONAL,              -- Need M
    supplementaryUplink                          UplinkConfig
OPTIONAL,              -- Need M
    pdcch-ServingCellConfig                      SetupRelease { PDCCH-ServingCellConfig }
OPTIONAL,              -- Need M
    pdsch-ServingCellConfig                      SetupRelease { PDSCH-ServingCellConfig }
OPTIONAL,              -- Need M
    csi-MeasConfig                               SetupRelease { CSI-MeasConfig }
OPTIONAL,              -- Need M
    sCellDeactivationTimer                       ENUMERATED {ms20, ms40, ms80, ms160,
ms200, ms240,
                                                 ms320, ms400, ms480,
ms520, ms640, ms720,
                                                 ms840, ms1280,
spare2,spare1}         OPTIONAL, -- Cond ServingCellWithoutPUCCH
    crossCarrierSchedulingConfig                 CrossCarrierSchedulingConfig
OPTIONAL,              -- Need M
    tag-Id                                       TAG-Id,
    dummy                                        ENUMERATED {enabled}
OPTIONAL,              -- Need R
    pathlossReferenceLinking                     ENUMERATED {spCell, sCell}
OPTIONAL,              -- Cond SCellOnly
    servingCellMO                                MeasObjectId
OPTIONAL,              -- Cond MeasObject
    ...,
    [[
    lte-CRS-ToMatchAround                        SetupRelease { RateMatchPatternLTE-CRS }
OPTIONAL,              -- Need M
    rateMatchPatternToAddModList                       SEQUENCE (SIZE
(1..maxNrofRateMatchPatterns)) OF RateMatchPattern   OPTIONAL, -- Need N
    rateMatchPatternToReleaseList                      SEQUENCE (SIZE
(1..maxNrofRateMatchPatterns)) OF RateMatchPatternId OPTIONAL, -- Need N
    downlinkChannelBW-PerSCS-List                SEQUENCE (SIZE (1..maxSCSs)) OF SCS-
SpecificCarrier                              OPTIONAL -- Need S
    ]],
    [[
    supplementaryUplinkRelease                   ENUMERATED {true}
OPTIONAL,              -- Need N
    tdd-UL-DL-ConfigurationDedicated-IAB-MT-r16   TDD-UL-DL-ConfigDedicated-
IAB-MT-r16                                   OPTIONAL, -- Cond TDD_IAB
    dormantBWP-Config-r16                        SetupRelease { DormantBWP-Config-r16 }
OPTIONAL,              -- Need M
    ca-SlotOffset-r16                            CHOICE {
        refSCS15khz                                  INTEGER (-2..2),
        refSCS30KHz                                  INTEGER (-5..5),
```

TABLE 26-continued

| | |
|---|---|
| refSCS60KHz | INTEGER (−10..10), |
| refSCS120KHz | INTEGER (−20..20) |
| } | |
| OPTIONAL,   -- Cond AsyncCA | |
| channelAccessCinfig-r16 | SetupRelease { ChannelAcessConfig-r16 } |
| OPTIONAL,   -- Need M | |
| intraCellGuardBandsDL-List-r16 | SEQUENCE (SIZE (1..MaxSCSs)) OF |
| IntraCellGuardBandsPerSCS-r16 | OPTIONAL, -- Need S |
| intraCellGuardBandsUL-List-r16 | SEQUENCE (SIZE (1..MaxSCSs)) OF |
| IntraCellGuardBandsPerSCS-r16 | OPTIONAL, -- Need S |
| csi-RS-ValidationWith-DCI-r16 | ENUMERATED {enabled} |
| OPTIONAL,   -- Need R | |
| lte-CRS-PatternList1-r16 | SetupRelease { LTE-CRS-PatternList-r16 } |
| OPTIONAL,   -- Need M | |
| lte-CRS-PatternList2-r16 | SetupRelease { LTE-CRS-PatternList-r16 } |
| OPTIONAL,   -- Need M | |
| crs-RateMatch-PerCORESETPoolIndex-r16 | ENUMERATED {enabled} |
| OPTIONAL,   -- Need R | |
| enableTwoDefaultTCI-States-r16 | ENUMERATED {enabled} |
| OPTIONAL,   -- Need R | |
| enableDefaultTCI-StatePerCoresetPoolIndex-r16 | ENUMERATED {enabled} |
| OPTIONAL,   -- Need R | |
| enableBeamSwitchTiming-r16 | ENUMERATED {true} |
| OPTIONAL,   -- Need R | |
| cbg-TxDiffTBsProcessingType1-r16 | ENUMERATED {enabled} |
| OPTIONAL,   -- Need R | |
| cbg-TxDiffTBsProcessingType2-r16 | ENUMERATED {enabled} |
| OPTIONAL   -- Need R | |
| ]] | |
| } | |

TABLE 27

- RateMatchPatternLTE-CRS
The IE RateMatchPatternLTE-CRS is used to configure a pattern to
rate match around LTE CRS. See TS 38.214 [19], clause 5.1.4.2.

RateMatchPatternLTE-CRS information element

```
-- ASN1START
-- TAG-RATEMATCHPATTERNLTE-CRS-START
RateMatchPatternLTE-CRS ::=    SEQUENCE {
   carrierFreqDL               INTEGER (0..16383),
   carrierBandwidthDL          ENUMERATED {n6, n15, n25, n50, n75,
n100, spare2, spare1},
   mbsfn-SubframeConfigList    EUTRA-MBSFN-SubframeConfigList
OPTIONAL, -- Need M
   nrofCRS-Ports               ENUMERATED {n1, n2, n4},
   v-Shift                     ENUMERATED {n0, n1, n2, n3, n4, n5}
}
LTE-CRS-PatternList-r16 ::=    SEQUENCE (SIZE (1..maxLTE-CRS-Patterns-r16))
OF RateMatchPatternLTE-CRS
-- TAG-RATEMATCHPATTERNLTE-CRS-STOP
-- ASN1STOP
```

RateMatchPatternLTE-CRS field descriptions carrierBandwidthDL
BW of the LTE carrier in number of PRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause 5.1.4.2).
v-Shift
Shifting value v-shift in LTE to rate match around LTE CRS (see TS 38.214 [19], clause 5.1.4.2).

[PDSCH: Related to Frequency Resource Allocation]

Figure 14:
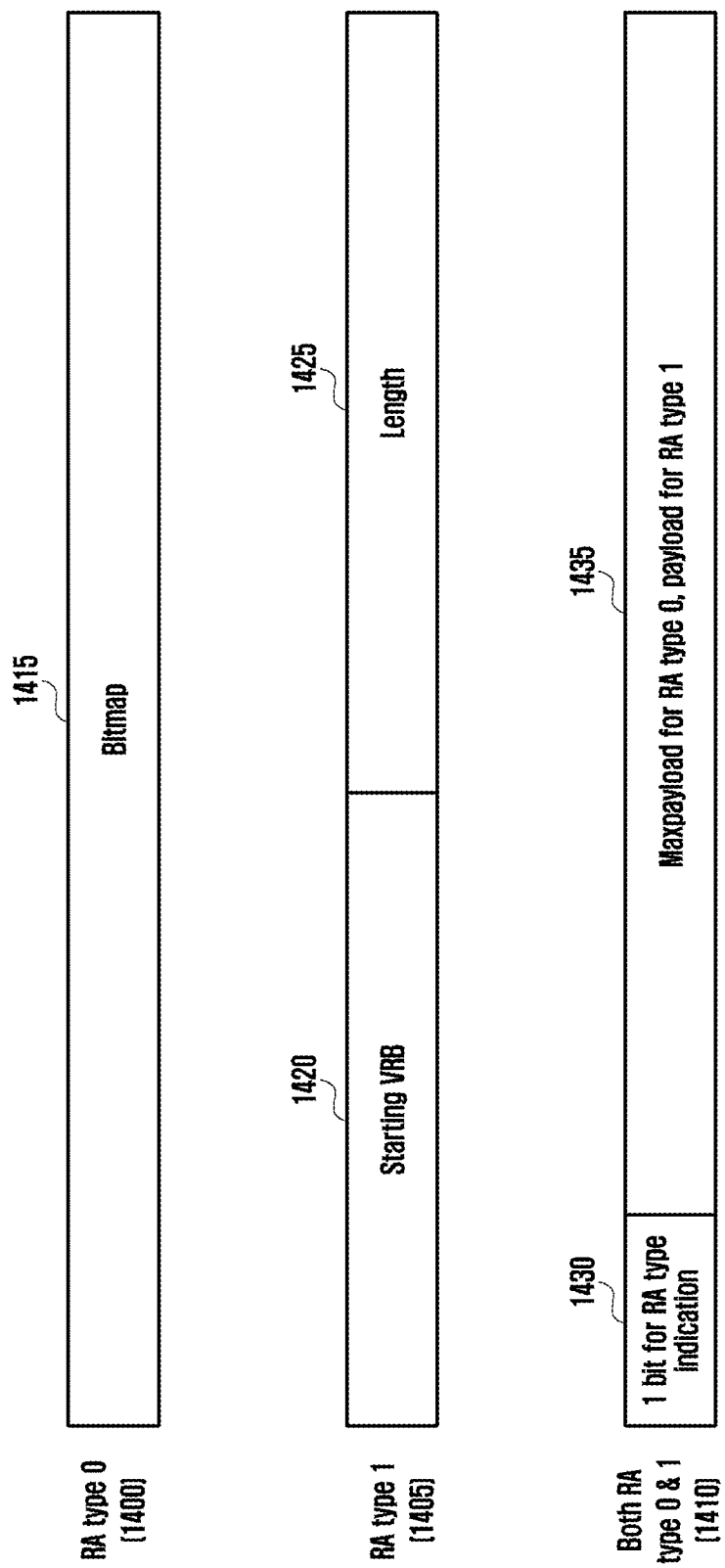
FIG. 14 is a diagram illustrating an example of frequency axis resource allocation of a PDSCH in a wireless communication system according to an embodiment of the disclosure.

FIG. 14 is a diagram illustrating an example of frequency axis resource allocation of a physical downlink shared channel (PDSCH) in a wireless communication system according to an embodiment of the disclosure.

FIG. 14 is a diagram illustrating three frequency axis resource allocation methods of type 0 1400, type 1 1405, and dynamic switch 1410, which may be configured through an upper layer in an NR wireless communication system.

Referring to FIG. 14, if the UE is configured to use only resource type 0 through upper layer signaling 1400, some downlink control information (DCI) for allocating a PDSCH to a corresponding UE have a bitmap composed of NRBG bits. The conditions for this will be described again later. In this case, NRBG refers to the number of resource block groups (RBGs) determined as illustrated in Table 28 below according to the BWP size allocated by the BWP indicator and the upper layer parameter rbg-Size, and the data are transmitted in the RBG represented as 1 by the bitmap.

TABLE 28

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 through upper layer signaling 1405, some DCI for allocating PDSCH to the UE has frequency domain resource allocation information composed of $$\left\lceil \log_2\left(\frac{N_{RB}^{DL,BWP}(N_{RB}^{DL,BWP}+1)}{2}\right)\right\rceil$$

bits. Conditions for this will be described again later. The base station may configure the starting VRB 1420 and the length 1425 of frequency-domain resources continuously allocated therefrom.

If the UE is configured to use both resource type 0 and resource type 1 through upper layer signaling 1410, some DCI for allocating the PDSCH to the UE has frequency domain resource allocation information composed of bits of a larger value 1435 among a payload 1415 for configuring resource type 0 and a payload 1420 and 1425 for configuring resource type 1. Conditions for this will be described again later. In this case, one bit may be added to the front part (MSB) of the frequency domain resource allocation information in DCI, and when the bit is 0, the bit may indicate that resource type 0 is used, and when the bit is 1, the bit may indicate that resource type 1 is used.

[PDSCH/PUSCH: Related to Time Resource Allocation]

Hereinafter, a method of allocating time domain resources for a data channel in a next-generation wireless communication system (5G or NR system) will be described.

The base station may configure the table for time domain resource allocation information on the downlink shared channel (PDSCH) and the uplink shared channel (PUSCH) through upper layer signaling (e.g., RRC signaling) to the UE. For PDSCH, a table consisting of maximum maxNrofDL-Allocations=16 entries may be configured, and for PUSCH, a table consisting of maximum maxNrofUL-Allocations=16 entries may be configured. In one embodiment, PDCCH-to-PDSCH slot timing (corresponds to the time interval in slot units between the time when the PDCCH is received and the time when the PDSCH scheduled by the received PDCCH is transmitted, denoted by K0), PDCCH-to-PUSCH slot timing (corresponds to the time interval in slot units between the time when the PDCCH is received and the time when the PUSCH scheduled by the received PDCCH is transmitted, denoted by K2), information on the position and length of a start symbol in which a PDSCH or PUSCH is scheduled in the slot, mapping type of PDSCH or PUSCH, etc. may be included in the time domain resource allocation information. For example, information such as Table 29 or Table 30 below may be transmitted from the base station to the UE.

TABLE 29

PDSCH-TimeDomainResourceAllocationList information element

PDSCH-TimeDomainResourceAllocationList ::= SEQUENCE (SIZE(1..maxNrofDL-Allocations)) OF
PDSCH-TimeDomainResourceAllocation
  PDSCH-TimeDomainResourceAllocation ::= SEQUENCE {
    k0 INTEGER (0..32) OPTIONAL, --Need S
    (PDCCH-to-PDSCH timing, per slot)
    mappingType ENUMERATED {typeA, typeB},
    (PDSCH mapping type)
    startSymbolAndLength INTEGER (0..127)
    (start symbol and length of PDSCH)
  }

TABLE 30

PUSCH-TimeDomainResourceAllocation information element

PUSCH-TimeDomainResourceAllocationList ::= SEQUENCE (SIZE(1..maxNrofUL-Allocations)) OF
PUSCH-TimeDomainResourceAllocation
  PUSCH-TimeDomainResourceAllocation ::= SEQUENCE {
    k2 INTEGER (0..32) OPTIONAL, --Need S
    (PDCCH-to-PDSCH timing, per slot)
    mappingType ENUMERATED {typeA, typeB},
    (PDSCH mapping type)
    startSymbolAndLength INTEGER (0..127)
    (start symbol and length of PDSCH)
  }

The base station may notify the UE of one of the entries in the table for the time domain resource allocation information through L1 signaling (e.g., DCI) (for example, may be indicated with the "time domain resource allocation" field in DCI). The UE may obtain time domain resource allocation information on the PDSCH or PUSCH based on the DCI received from the base station.

Figure 15:
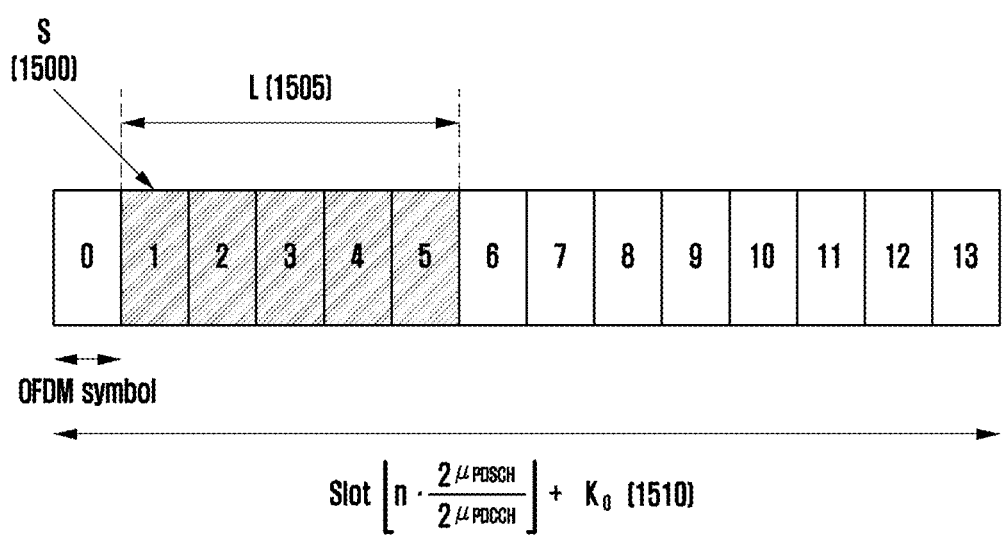
FIG. 15 is a diagram illustrating an example of time axis resource allocation of a PDSCH in a wireless communication system according to an embodiment of the disclosure.

FIG. 15 is a diagram illustrating an example of time axis resource allocation of a PDSCH in a wireless communication system according to an embodiment of the disclosure.

Referring to FIG. 15, the base station may indicate the time axis position of the PDSCH resource according to the subcarrier spacing (SCS)(μDSCH, μPDCCH) of the data channel and the control channel configured using the upper layer, the scheduling offset value (K0), and the OFDM symbol start position 1500 and the length 1505 within one slot that is dynamically indicated through DCI.

Figure 16:
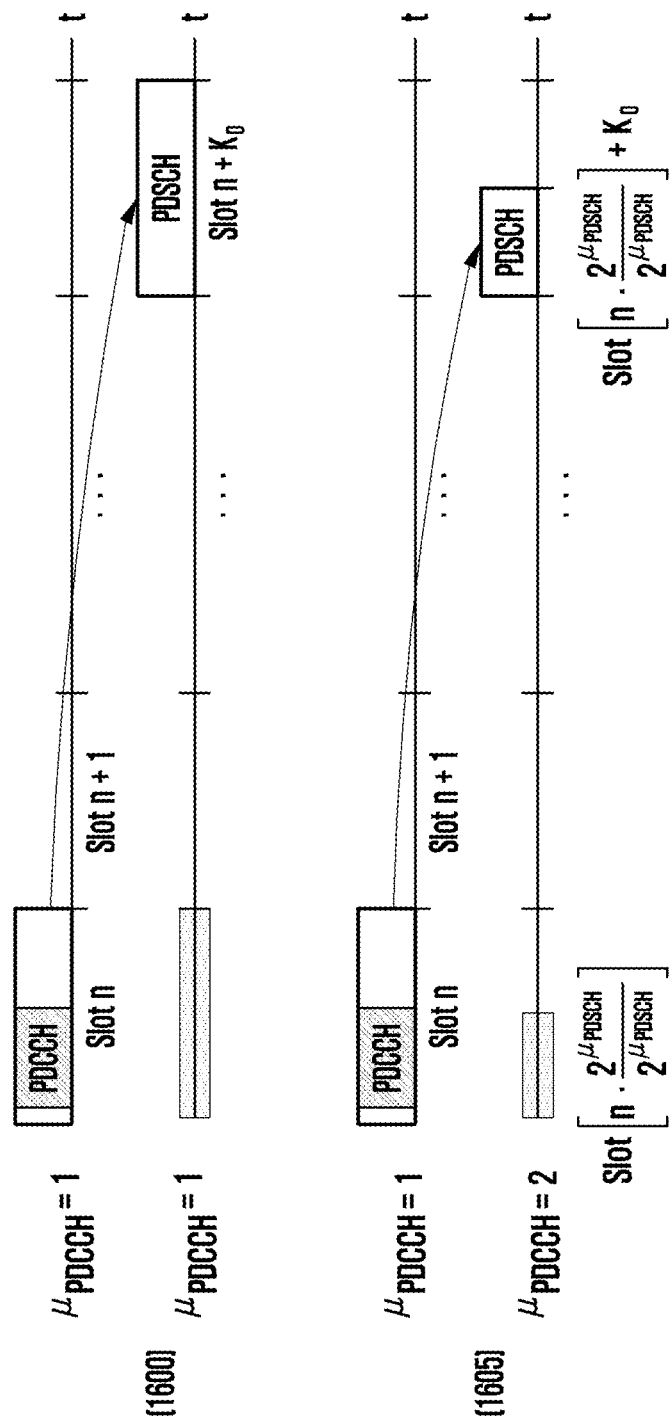
FIG. 16 is a diagram illustrating an example of time axis resource allocation according to subcarrier spacing of a data channel and a control channel in a wireless communication system according to an embodiment of the disclosure.

FIG. 16 is a diagram illustrating an example of time axis resource allocation according to subcarrier spacing of a data channel and a control channel in a wireless communication system according to an embodiment of the disclosure.

Referring to FIG. 16, when the subcarrier spacing of the data channel and the control channel are the same 1600 (μPDSCH=μDCCH), because the slot numbers for the data channel and the control channel are the same, the base station and the UE may generate a scheduling offset in accordance with a predetermined slot offset K0. On the other hand, when the subcarrier spacing of the data channel and the control channel are different 1605 μ(PDSCH≠μPDCCH), because the slot numbers for the data channel and the control channel are different, the base station and the UE may generate a scheduling offset in accordance with a predetermined slot offset K0 based on the subcarrier spacing of the PDCCH.

[PDSCH: Processing Time]

Next, the PDSCH processing procedure time will be described. When the base station schedules the UE to transmit the PDSCH using DCI format 1_0, 1_1, or 1_2, the UE may need a PDSCH processing time to receive the PDSCH by applying the transmission method (modulation/demodulation, coding indication index (MCS), demodulation reference signal related information, time and frequency resource allocation information, etc.) indicated through DCI. NR defined the PDSCH processing time in consideration of this. The PDSCH processing time of the UE may follow Equation 3 below.

$$T_{proc,1} = (N_1 + d_{1,1} + d_2)(2048 + 144)K2^{-\mu}T_C + T_{ext}$$ [Equation 3]

Each variable in Tproc,1 described above with Equation 3 may have the following meanings:

N1: The number of symbols determined according to the UE processing capability 1 or 2 and the numerology µ according to the capability of the UE. N1 may have the value of Table 31 when reported as UE processing capability 1 according to the capability report of the UE, and may have the value of Table 32 when reported as UE processing capability 2 according to the capability report of the UE and configured through upper layer signaling that UE processing capability 2 may be used. Numerology µ may correspond to the minimum value of µDCCH, µDSCH, µUL to maximize the Tproc, 1, and µDCCH, µDSCH, and µUL may refer to the neurology of the PDCCH in which the PDSCH is scheduled, the neurology of the scheduled PDSCH, and the neurology of the uplink channel through which the HARQ-ACK is to be transmitted, respectively.

TABLE 31

PDSCH processing time in case of PDSCH processing capability 1

PDSCH decoding time N₁ [symbols]

| µ | A case that both PDSCH mapping type A and B are dmrs-AdditionalPosition = pos0 in DMRS-DownlinkConfig, which is an upper layer signaling | A case that both PDSCH mapping type A and B are not dmrs-AdditionalPosition = pos0 in DMRS-DownlinkConfig, which is an upper layer signaling, or a case that the upper layer parameter is not configured |
|---|---|---|
| 0 | 8 | $N_{1,0}$ |
| 1 | 10 | 13 |
| 2 | 17 | 20 |
| 3 | 20 | 24 |

TABLE 32

PDSCH processing time in case of PDSCH processing capability 2

| µ | PDSCH decoding time N₁ [symbols]<br>A case that both PDSCH mapping type A and B are dmrs-AdditionalPosition = pos0 in DMRS-DownlinkConfig, which is an upper layer signaling |
|---|---|
| 0 | 3 |
| 1 | 4.5 |
| 2 | 9 for frequency range 1 |

K: 64;

Text: When the UE uses a shared spectrum channel access method, the UE may calculate the Text and apply the Text to the PDSCH processing time. Otherwise, Text is assumed to be 0;

If 11 indicating the PDSCH DMRS position value is 12, N1.0 of Table 31 has a value of 14, otherwise N1.0 has a value of 13;

For PDSCH mapping type A, if the last symbol of the PDSCH is the i-th symbol in the slot in which the PDSCH is transmitted and i<7, d1,1 is 7−i, otherwise d1,1 is 0; and d2: When the PUCCH having a high priority index and the PUCCH or the PUSCH having a low priority index overlap in time, d2 of the PUCCH having a high priority index may be set to a value reported by the UE. Otherwise, d2 is 0.

When PDSCH mapping type B is used for UE processing capability 1, the value of d1,1 is determined according to L, which is the number of symbols of the scheduled PDSCH, and d, which is the number of overlapping symbols between the PDCCH scheduling PDSCH and the scheduled PDSCH:

If L≥7, d1,1=0;

if L≥4 and L≤6, d1,1=7−L;

If L=3, d1,1=min (d, 1); and

If L=2, d1,1=3+d.

When the PDSCH mapping type B is used for the UE processing capability 2, the value of d1,1 may be determined according to L, which is the number of symbols of the scheduled PDSCH, and the number d of overlapping symbols between the PDCCH scheduling the PDSCH and the scheduled PDSCH as follows:

If L≥7, d1,1=0;

if L≥4 and L≤6, d1,1=7−L;

if L=2;

If the scheduled PDCCH exists in the CORESET consisting of three symbols, and the corresponding CORESET and the scheduled PDSCH have the same start symbol, d1,1=3.

Otherwise, d1,1=d; and

In the case of a UE supporting capability 2 in a given serving cell, the PDSCH processing time according to UE processing capability 2 may be applied when the UE sets processingType2Enabled, which is upper layer signaling, to enable for the corresponding cell.

If the position (the corresponding position may be considered K1−, which is defined as the transmission time of HARQ-ACK, PUCCH resource used for HARQ-ACK transmission, and timing advance effect) of the first uplink transmission symbol of the PUCCH including the HARQ-ACK information does not start earlier than the first uplink transmission symbol that appears after a time of Tproc,1 from the last symbol of the PDSCH, the UE may transmit a valid HARQ-ACK message. That is, the UE may transmit the PUCCH including the HARQ-ACK only when the PDSCH processing time is sufficient. Otherwise, the UE may not provide valid HARQ-ACK information corresponding to the scheduled PDSCH to the base station. The Tproc,1 may be used for both normal or extended CPs. In the case of a PDSCH having two PDSCH transmission locations within one slot, d1,1 is calculated based on the first PDSCH transmission location within the corresponding slot.

[PDSCH: Reception Preparation Time for Cross-Carrier Scheduling]

Next, in the case of cross-carrier scheduling in which μPDCCH, which is a neurology in which the scheduled PDCCH is transmitted, and μDSCH, which is a neurology in which a PDSCH scheduled through the corresponding PDCCH is transmitted, are different from each other, N-pdsch, which is the PDSCH reception preparation time of the UE defined for the time interval between the PDCCH and the PDSCH, will be described.

If μDCCH<μPDSCH, the scheduled PDSCH may not be transmitted earlier than the first symbol of a slot appearing after the Npdsch symbol from the last symbol of the PDCCH for which the PDSCH is scheduled. The transmission symbol of the corresponding PDSCH may include a DM-RS.

If μPDCCH>μDSCH, the scheduled PDSCH may be transmitted after the Npdsch symbol from the last symbol of the PDCCH for which the PDSCH is scheduled. The transmission symbol of the corresponding PDSCH may include a DM-RS.

TABLE 33

$N_{pdsch}$ according to scheduled PDCCH subcarrier interval

| $μ_{PDCCH}$ | $N_{pdsch}$ [symbols] |
|---|---|
| 0 | 4 |
| 1 | 5 |
| 2 | 10 |
| 3 | 14 |

[Related to SRS]

Next, an uplink channel inference method using sound reference signal (SRS) transmission of a UE will be described. The base station may configure at least one SRS configuration for each uplink BWP to deliver configuration information on SRS transmission to the UE, and may also configure at least one SRS resource set for each SRS configuration.

As an example, the base station and the UE may exchange upper signaling information as follows in order to deliver information on the SRS resource set:

srs-ResourceSetId: SRS resource set index;

srs-ResourceIdList: a set of SRS resource indexes referenced by the SRS resource set;

resourceType: A time axis transmission configuration of the SRS resource referenced in the SRS resource set, and may be configured to one of "periodic," "semi-persistent," and "aperiodic." If it is configured to "periodic" or "semi-persistent," the associated CSI-RS information may be provided according to the usage of the SRS resource set. If configured to "aperiodic," aperiodic SRS resource trigger list and slot offset information may be provided, and associated CSI-RS information may be provided according to the usage of the SRS resource set;

usage: A configuration for the usage of the SRS resource referenced in the SRS resource set, and may be configured to one of "beamManagement," "codebook," "nonCodebook," and "antennaSwitching"; and alpha, p0, pathlossReferenceRS, srs-PowerControlAdjustmentStates: Provide a parameter setting for adjusting the transmission power of the SRS resource referenced in the SRS resource set.

It may be understood that the UE follows the information configured in the SRS resource set for the SRS resource included in the set of SRS resource indexes referenced in the SRS resource set.

In addition, the base station and the UE may transmit/receive upper layer signaling information in order to deliver individual configuration information on the SRS resource. As an example, the individual configuration information on the SRS resource may include time-frequency axis mapping information within the slot of the SRS resource, which may include information on frequency hopping within or between slots of the SRS resource. In addition, the individual configuration information on the SRS resource may include the time axis transmission configuration of the SRS resource, and may be configured to one of "periodic," "semi-persistent," and "aperiodic." The individual configuration information on the SRS resource may be limited to have the same time axis transmission configuration as the SRS resource set including SRS resource. If the time axis transmission configuration of the SRS resource is configured to "periodic" or "semi-persistent," the individual configuration information on the SRS resource may additionally include an SRS resource transmission period and a slot offset (e.g., periodicityAndOffset).

The base station may activate, deactivate, or trigger SRS transmission to the UE through upper layer signaling including RRC signaling, MAC CE signaling, or L1 signaling (e.g., DCI). For example, the base station may activate or deactivate periodic SRS transmission to the UE through upper layer signaling. The base station may instruct to activate the SRS resource set in which the resourceType is configured to periodic through upper layer signaling, and the UE may transmit the SRS resource referenced in the activated SRS resource set. The time-frequency axis resource mapping in the slot of the transmitted SRS resource follows the resource mapping information set in the SRS resource, and the slot mapping including the transmission period and the slot offset follows the periodicityAndOffset set in the SRS resource. In addition, the spatial domain transmission filter applied to the SRS resource to be transmitted may refer to spatial relation info set in the SRS resource, or may refer to associated CSI-RS information set in the SRS resource set including the SRS resource. The UE may transmit the SRS resource in the uplink BWP activated for the periodic SRS resource activated through upper layer signaling.

For example, the base station may activate or deactivate semi-persistent SRS transmission through upper layer signaling to the UE. The base station may instruct to activate the SRS resource set through MAC CE signaling, and the UE may transmit the SRS resource referenced in the activated SRS resource set. The SRS resource set activated through MAC CE signaling may be limited to the SRS resource set in which the resourceType is set to semi-persistent. The time-frequency axis resource mapping in the slot of the SRS resource to be transmitted follows the resource mapping information set in the SRS resource, and the slot mapping including the transmission period and the slot offset follows the periodicityAndOffset set in the SRS resource. In addition, the spatial domain transmission filter applied to the SRS resource to be transmitted may refer to spatial relation info configured in the SRS resource, or may refer to associated CSI-RS information configured in the SRS resource set including the SRS resource. If spatial relation info is configured in the SRS resource, without following the configuration above, the spatial domain transmission filter may be determined by referring to configuration information on spatial relation info delivered through MAC CE signaling that activates semi-persistent SRS transmission. The UE may transmit the SRS resource within the uplink BWP activated for the semi-persistent SRS resource activated through upper layer signaling.

For example, the base station may trigger aperiodic SRS transmission to the UE through DCI. The base station may indicate one of aperiodic SRS resource triggers (aperiodicSRS-ResourceTrigger) through the SRS request field of DCI. The UE may understand that the SRS resource set including the aperiodic SRS resource trigger indicated through DCI in the aperiodic SRS resource trigger list has been triggered among the SRS resource set configuration information. The UE may transmit the SRS resource referenced in the triggered SRS resource set. The time-frequency axis resource mapping in the slot of the SRS resource to be transmitted follows the resource mapping information configured in the SRS resource.

In addition, the slot mapping of the SRS resource to be transmitted may be determined through the slot offset between the PDCCH including DCI and the SRS resource, which may refer to the value(s) included in the slot offset set configured in the SRS resource set. Specifically, the slot offset between the PDCCH including DCI and the SRS resource may apply a value indicated by the time domain resource assignment field of DCI among the offset value(s) included in the slot offset set configured in the SRS resource set. In addition, the spatial domain transmission filter applied to the SRS resource to be transmitted may refer to spatial relation info configured in the SRS resource, or may refer to the associated CSI-RS information configured in the SRS resource set including the SRS resource. The UE may transmit the SRS resource within the uplink BWP activated for the aperiodic SRS resource triggered through DCI.

When the base station triggers aperiodic SRS transmission through DCI to the UE, in order for the UE to transmit the SRS by applying the configuration information on the SRS resource, a minimum time interval between the PDCCH including the DCI triggering the aperiodic SRS transmission and the SRS to be transmitted may be required. The time interval for SRS transmission of the UE may be defined as the number of symbols between the first symbols to which the SRS resource transmitted first among the SRS resource(s) transmitted from the last symbol of the PDCCH including the DCI triggering aperiodic SRS transmission is mapped. The minimum time interval may be determined by referring to the PUSCH preparation procedure time required for the UE to prepare for PUSCH transmission. In addition, the minimum time interval may have a different value depending on where the SRS resource set including the SRS resource to be transmitted is used.

For example, the minimum time interval may be determined as an N2 symbol defined in consideration of the UE processing capability according to the capability of the UE with reference to the PUSCH preparation procedure time of the UE. In addition, considering the use of the SRS resource set including the SRS resource to be transmitted, if the use of the SRS resource set is configured to "codebook" or "antennaSwitching," the minimum time interval may be set as N2 symbols, and if the destination of the SRS resource set is configured to "nonCodebook" or "beamManagement," the minimum time interval nay be set to N2+14 symbols. The UE may transmit the aperiodic SRS when the time interval for aperiodic SRS transmission is greater than or equal to the minimum time interval, When the time interval for aperiodic SRS transmission is smaller than the minimum time interval, the UE may ignore DCI triggering the aperiodic SRS.

TABLE 34

```
SRS-Resource ::=                     SEQUENCE {
   srs-ResourceId                       SRS-ResourceId,
   nrofSRS-Ports                        ENUMERATED {port1, ports2,
ports4},
   ptrs-PortIndex                       ENUMERATED {n0, n1 }
OPTIONAL,   -- Need R
   transmissionComb                     CHOICE {
      n2                                   SEQUENCE {
         combOffset-n2                        INTEGER (0..1),
         cyclicShift-n2                       INTEGER (0..7)
      },
      n4                                   SEQUENCE {
         combOffset-n4                        INTEGER (0..3),
         cyclicShift-n4                       INTEGER (0..11)
      }
   },
   resourceMapping                      SEQUENCE {
      startPosition                        INTEGER (0..5),
      nrofSymbols                          ENUMERATED {n1, n2,
n4},
      repetitionFactor                     ENUMERATED {n1, n2, n4}
   },
   freqDomainPosition                   INTEGER (0..67),
   freqDomainShift                      INTEGER (0..268),
   freqHopping                          SEQUENCE {
      c-SRS                                INTEGER (0..63),
      b-SRS                                INTEGER (0..3),
      b-hop                                INTEGER (0..3)
   },
   groupOrSequenceHopping               ENUMERATED { neither,
groupHopping, sequenceHopping },
   resourceType                         CHOICE {
      aperiodic                            SEQUENCE {
         ...
      },
      semi-persistent                      SEQUENCE {
         periodicityAndOffset-sp              SRS-
PeriodicityAndOffset,
         ...
      },
      periodic                             SEQUENCE {
         periodicityAndOffset-p               SRS-
PeriodicityAndOffset,
         ...
      }
   },
   sequenceId                           INTEGER (0..1023),
   spatialRelationInfo                  SRS-SpatialRelationInfo
OPTIONAL,   -- Need R
   ...
}
```

The spatialRelationInfo configuration information of Table 34 is to apply beam information of a corresponding reference signal to a beam used for transmitting a corresponding SRS with reference to one reference signal. For example, the configuration of the spatialRelationInfo may include information such as Table 35 below.

TABLE 35

```
SRS-SpatialRelationInfo ::=   SEQUENCE {
   servingCellId                 ServCellIndex
OPTIONAL,   -- Need S
   referenceSignal               CHOICE {
      ssb-Index                     SSB-Index,
      csi-RS-Index                  NZP-CSI-RS-ResourceId,
      srs                           SEQUENCE {
         resourceId                    SRS-ResourceId,
         uplinkBWP                     BWP-Id
      }
   }
}
```

Referring to the spatialRelationInfo configuration, an SS/PBCH block index, CSI-RS index, or SRS index may be configured as an index of a reference signal to be referenced to use beam information of a specific reference signal. The upper signaling referenceSignal is configuration information indicating which reference signal beam information is to be referred to for the corresponding SRS transmission, ssb-Index is the index of the SS/PBCH block, csi-RS-Index is the index of the CSI-RS, and srs is the index of the SRS, respectively. If the value of the upper signaling referenceSignal is set to "ssb-Index," the UE may apply the reception beam used when receiving the SS/PBCH block corresponding to the ssb-Index as the transmission beam of the corresponding SRS transmission. If the value of the upper signaling referenceSignal is set to "csi-RS-Index," the UE may apply the reception beam used when receiving the CSI-RS corresponding to the csi-RS-Index as the transmission beam of the corresponding SRS transmission. If the value of the upper signaling referenceSignal is set to "srs," the UE may apply the transmission beam used when transmitting the SRS corresponding to the srs as the transmission beam of the corresponding SRS transmission.

[PUSCH: Related to Transmission Method]

Next, a scheduling method of PUSCH transmission will be described. The PUSCH transmission may be dynamically scheduled by a UL grant in DCI or may be operated by configured grant Type 1 or Type 2. The dynamic scheduling indication for PUSCH transmission is possible by DCI format 0_0 or 0_1.

The configured grant Type 1 PUSCH transmission may be configured semi-statically through reception of configuredGrantConfig including the rrc-ConfiguredUplinkGrant of Table 36 through upper signaling without receiving UL grant in DCI. The configured grant Type 2 PUSCH transmission may be scheduled semi-continuously by UL grant in DCI after reception of configuredGrantConfig that does not include the rrc-ConfiguredUplinkGrant of Table 36 through upper signaling. When the PUSCH transmission is operated by a configured grant, parameters applied to the PUSCH transmission are applied through configuredGrantConfig that is the upper signaling of Table 36 except for dataScramblingIdentityPUSCH, txConfig, codebookSubset, maxRank, and scaling of UCI-OnPUSCH provided by pusch-Config, which is the upper signaling, of Table 37. If the UE is provided with the transformPrecoder in configuredGrantConfig, which is the upper signaling of Table 36, the UE applies tp-pi2BPSK in pusch-Config of Table 37 to PUSCH transmission operated by the configured grant.

TABLE 36

```
ConfiguredGrantConfig ::=            SEQUENCE {
    frequencyHopping                     ENUMERATED {intraSlot, interSlot}
OPTIONAL,  -- Need S,
    cg-DMRS-Configuration                DMRS-UplinkConfig,
    mcs-Table                            ENUMERATED {qam256,
qam64LowSE}                                         OPTIONAL,  --
Need S
    mcs-TableTransformPrecoder           ENUMERATED {qam256,
qam64LowSE}                                         OPTIONAL,  --
Need S
    uci-OnPUSCH                          SetupRelease { CG-UCI-
OnPUSCH }
Need M                                              OPTIONAL,  --
    resourceAllocation                   ENUMERATED
{ resourceAllocationType0, resourceAllocationType1, dynamicSwitch },
    rbg-Size                             ENUMERATED {config2}
OPTIONAL,  -- Need S
    powerControlLoopToUse                ENUMERATED {n0, n1},
    p0-PUSCH-Alpha                       P0-PUSCH-AlphaSetId,
    transformPrecoder                    ENUMERATED {enabled, disabled}
OPTIONAL,  -- Need S
    nrofHARQ-Processes                   INTEGER(1..16),
    repK                                 ENUMERATED {n1, n2, n4, n8},
    repK-RV                              ENUMERATED {s1-0231, s2-0303,
s3-0000}                                            OPTIONAL,  -- Need R
    periodicity                          ENUMERATED {
                                             sym2, sym7, sym1x14,
sym2x14, sym4x14, sym5x14, sym8x14, sym10x14, sym16x14, sym20x14,
                                             sym32x14, sym40x14,
sym64x14, sym80x14, sym128x14, sym160x14, sym256x14, sym320x14, sym512x14,
                                             sym640x14, sym1024x14,
sym1280x14, sym2560x14, sym5120x14,
                                             sym6, sym1x12, sym2x12,
sym4x12, sym5x12, sym8x12, sym10x12, sym16x12, sym20x12, sym32x12,
                                             sym40x12, sym64x12,
sym80x12, sym128x12, sym160x12, sym256x12, sym320x12, sym512x12,
sym640x12,
                                             sym1280x12, sym2560x12
    },
    configuredGrantTimer                 INTEGER (1..64)
OPTIONAL,  -- Need R
    rrc-ConfiguredUplinkGrant            SEQUENCE {
        timeDomainOffset                     INTEGER (0..5119),
        timeDomainAllocation                 INTEGER (0..15),
        frequencyDomainAllocation            BIT STRING (SIZE(18)),
        antennaPort                          INTEGER (0..31),
        dmrs-SeqInitialization               INTEGER (0..1)
OPTIONAL,  -- Need R
        precodingAndNumberOfLayers           INTEGER (0..63),
        srs-ResourceIndicator                INTEGER (0..15)
```

TABLE 36-continued

```
OPTIONAL,   -- Need R
    mcsAndTBS                              INTEGER (0..31),
    frequencyHoppingOffset                 INTEGER (1..
maxNrofPhysicalResourceBlocks-1)
                                           OPTIONAL,   -- Need R
    pathlossReferenceIndex                 INTEGER
(0..maxNrofPUSCH-PathlossReferenceRSs-1),
    ...
}
OPTIONAL,   -- Need R
...
}
```

Next, a PUSCH transmission method will be described. The DMRS antenna port for PUSCH transmission is the same as the antenna port for SRS transmission. The PUSCH transmission may follow a codebook-based transmission method and a non-codebook-based transmission method, respectively, depending on whether the value of txConfig in pusch-Config of [Table 37], which is higher signaling, is "codebook" or "nonCodebook."

As described above, the PUSCH transmission may be dynamically scheduled through DCI format 0_0 or 0_1 and may be semi-statically configured by the configured grant. If the UE is instructed to schedule the PUSCH transmission through DCI format 0_0, the UE performs beam setting for PUSCH transmission using a puch-spatialRelationInfoID corresponding to the UE-specific PUCCH resource corresponding to the minimum ID within the uplink BWP activated in the serving cell, and in this case, the PUSCH transmission is based on a single antenna port. The UE does not expect scheduling of PUSCH transmission through DCI format 0_0 within the BWP in which the PUCCH resource including the pucch-spatialRelationInfo is not configured. If the UE has not received configured txConfig in pusch-Config of Table 37, the UE does not expect to be scheduled with DCI format 0_1.

TABLE 37

```
PUSCH-Config ::=                           SEQUENCE {
    dataScramblingIdentityPUSCH            INTEGER (0..1023)
OPTIONAL,   -- Need S
    txConfig                               ENUMERATED {codebook,
nonCodebook}                               OPTIONAL,   -- Need S
    dmrs-UplinkForPUSCH-MappingTypeA       SetupRelease { DMRS-
UplinkConfig }                             OPTIONAL,   -- Need M
    dmrs-UplinkForPUSCH-MappingTypeB       SetupRelease { DMRS-
UplinkConfig }                             OPTIONAL,   -- Need M
    pusch-PowerControl                     PUSCH-PowerControl
OPTIONAL,   -- Need M
    frequencyHopping                       ENUMERATED {intraSlot,
interSlot}                                 OPTIONAL,   -- Need S
    frequencyHoppingOffsetLists            SEQUENCE (SIZE (1..4)) OF
INTEGER (1.. maxNrofPhysicalResourceBlocks-1)
OPTIONAL,   -- Need M
    resourceAllocation                     ENUMERATED
{ resourceAllocationType0, resourceAllocationType1, dynamicSwitch},
    pusch-TimeDomainAllocationList         SetupRelease { PUSCH-
TimeDomainResourceAllocationList }        OPTIONAL,   -- Need M
    pusch-AggregationFactor                ENUMERATED { n2, n4, n8 }
OPTIONAL,   -- Need S
    mcs-Table                              ENUMERATED {qam256,
qam64LowSE}                                OPTIONAL,   -- Need
S
    mcs-TableTransformPrecoder             ENUMERATED {qam256,
qam64LowSE}                                OPTIONAL,   -- Need
S
    transformPrecoder                      ENUMERATED {enabled,
disabled}                                  OPTIONAL,   -- Need S
    codebookSubset                         ENUMERATED
{fullyAndPartialAndNonCoherent, partialAndNonCoherent,nonCoherent}
OPTIONAL, -- Cond codebookBased
    maxRank                                INTEGER (1..4)
OPTIONAL,   -- Cond codebookBased
    rbg-Size                               ENUMERATED { config2}
OPTIONAL,   -- Need S
    uci-OnPUSCH                            SetupRelease { UCI-
OnPUSCH}                                   OPTIONAL,   -- Need M
    tp-pi2BPSK                             ENUMERATED {enabled}
OPTIONAL,   -- Need S
    ...
}
```

Next, codebook-based PUSCH transmission will be described. The codebook-based PUSCH transmission may be dynamically scheduled through DCI format 0_0 or 0_1, and may operate semi-statically by a configured grant. When the codebook-based PUSCH is dynamically scheduled by DCI format 0_1 or is configured semi-statically by the configured grant, the UE determines a precoder for PUSCH transmission based on the SRS resource indicator (SRI), the transmission precoding matrix indicator (TPMI), and the transmission rank (the number of PUSCH transmission layers).

In this case, the SRI may be given through a field SRS resource indicator in the DCI or may be configured through srs-ResourceIndicator which is upper signaling. When transmitting the codebook-based PUSCH, the UE may receive at least one configured SRS resource and up to two configured SRS resources. When the UE is provided with an SRI through DCI, the SRS resource indicated by the corresponding SRI refers to an SRS resource corresponding to the SRI among SRS resources transmitted before the PDCCH including the corresponding SRI. In addition, TPMI and transmission rank may be given through field precoding information and number of layers in DCI, or may be configured through precodingAndNumberOfLayers, which is an upper signaling. TPMI is used to indicate the precoder applied to PUSCH transmission. If the UE receives one SRS resource configured, the TPMI is used to indicate the precoder to be applied in the configured one SRS resource. If the UE receives multiple SRS resources configured, the TPMI is used to indicate the precoder to be applied in the SRS resource indicated through the SRI.

The precoder to be used for PUSCH transmission is selected from an uplink codebook having the same number of antenna ports as the nrofSRS-Ports value in SRS-Config, which is an upper signaling. In codebook-based PUSCH transmission, the UE determines the codebook subset based on the TPMI and the codebookSubset within the pushConfig, which is the upper signaling. The codebookSubset in push-Config, which is the upper signaling, may be configured to one of "fullyAndPartialAndNonCoherent," "partialAndNonCoherent," or "nonCoherent" based on UE capability reported by the UE to the base station. If the UE reports "partialAndNonCoherent" as UE capability, the UE does not expect the value of the higher signaling codebookSubset to be configured to "fullyAndPartialAndNonCoherent." In addition, if the UE reports "nonCoherent" as UE capability, the UE does not expect the value of the higher signaling codebookSubset to be configured to "fullyAndPartialAndNonCoherent" or "partialAndNonCoherent." When nrofSRS-Ports in SRS-ResourceSet, which is the upper signaling, indicates two SRS antenna ports, the UE does not expect the value of codebookSub set, which is the upper signaling, to be configured to "partialAndNonCoherent."

The UE may receive one SRS resource set configured in which the value of the usage in the SRS-Resource Set, which is the upper signaling, is configured to "codebook," and one SRS resource within the SRS resource set may be indicated through the SRI. If multiple SRS resources are configured within the SRS resource set in which the usage value in the SRS-Resource Set, which is the upper signaling, is configured to "codebook," the UE expects that the value of nrofSRS-Ports in the SRS-Resource, which is the upper signaling, is configured to be the same for all SRS resources.

The UE transmits one or a plurality of SRS resources included in the SRS resource set in which the value of usage is configured to "codebook" to the base station according to upper level signaling, and the base station selects one of the SRS resources transmitted by the UE and instructs the UE to perform PUSCH transmission using the transmission beam information of the corresponding SRS resource. In this case, in the codebook-based PUSCH transmission, the SRI is used as information on selecting an index of one SRS resource and is included in the DCI. In addition, the base station includes information indicating the TPMI and rank to be used by the UE for PUSCH transmission in the DCI. The UE performs PUSCH transmission by applying the indicated rank and the precoder indicated by TPMI based on the transmission beam of the corresponding SRS resource by using the SRS resource indicated by the SRI.

Next, non-codebook-based PUSCH transmission will be described. The non-codebook-based PUSCH transmission may be dynamically scheduled through DCI format 0_0 or 0_1, and may operate semi-statically by a configured grant. When at least one SRS resource is configured in the SRS resource set in which the value of usage in the SRS-ResourceSet, which is the upper signaling, is configured to "nonCodebook," the UE may receive the non-codebook-based PUSCH transmission scheduled through DCI format 0_1.

For the SRS resource set in which the value of usage in the SRS-ResourceSet, which is the upper signaling, is configured to "nonCodebook," the UE may receive one connected non-zero power CSI-RS (NZP CSI-RS resource) configured. The UE may perform calculation on the precoder for SRS transmission through measurement of the NZP CSI-RS resource connected to the SRS resource set. If the difference between the last received symbol of the aperiodic NZP CSI-RS resource connected to the SRS resource set and the first symbol of the aperiodic SRS transmission in the UE is less than 42 symbols, the UE does not expect information on the precoder for SRS transmission to be updated.

When the value of resourceType in the SRS-ResourceSet, which is the upper signaling, is configured to "aperiodic," the connected NZP CSI-RS is indicated by the SRS request, which is a field in DCI format 0_1 or 1_1. In this case, if the connected NZP CSI-RS resource is an aperiodic NZP CSI-RS resource, it indicates that the connected NZP CSI-RS exists when the value of the field SRS request in DCI format 0_1 or 1_1 is not "00." In this case, the corresponding DCI may not indicate cross carrier or cross BWP scheduling. In addition, if the value of the SRS request indicates the presence of the NZP CSI-RS, the corresponding NZP CSI-RS is located in the slot in which the PDCCH including the SRS request field is transmitted. In this case, the TCI states configured in the scheduled subcarrier are not set to QCL-TypeD.

If a periodic or semi-persistent SRS resource set is configured, the connected NZP CSI-RS may be indicated through the associated CSI-RS in the SRS-ResourceSet, which is the upper signaling. For non-codebook-based transmission, the UE does not expect that spatialRelationInfo, which is the upper signaling for SRS resource, and associated CSI-RS in SRS-ResourceSet, which is the upper signaling, are configured together.

When a plurality of SRS resources are configured, the UE may determine the precoder to be applied to PUSCH transmission and the transmission rank based on the SRI indicated by the base station. In this case, the SRI may be indicated through a field SRS resource indicator in the DCI or may be configured through srs-ResourceIndicator, which is the upper signaling. Like the above-described codebook-based PUSCH transmission, when the UE receives SRI through DCI, the SRS resource indicated by the corresponding SRI refers to the SRS resource corresponding to the SRI among the SRS resources transmitted before the PDCCH including the corresponding SRI. The UE may use one or a plurality of SRS resources for SRS transmission, and the maximum number of SRS resources capable of simultaneous transmission in the same symbol in one SRS resource set is determined by the UE capability reported by the UE to the base station. In this case, the SRS resources simultaneously transmitted by the UE occupy the same RB. The UE configures one SRS port for each SRS resource. Only one SRS resource set in which the value of usage in the SRS-ResourceSet, which is the upper signaling, is configured to "nonCodebook," and up to four SRS resources for non-codebook-based PUSCH transmission may be configured.

The base station transmits one NZP-CSI-RS connected to the SRS resource set to the UE, and the UE calculates a precoder to be used when transmitting one or a plurality of SRS resources in the corresponding SRS resource set based on the result measured when receiving the corresponding NZP-CSI-RS. The UE applies the calculated precoder when transmitting one or a plurality of SRS resources in the SRS resource set in which usage is set to "nonCodebook" to the base station, and the base station selects one or a plurality of SRS resources among one or a plurality of SRS resources received. In this case, in non-codebook-based PUSCH transmission, the SRI indicates an index capable of representing one or a combination of a plurality of SRS resources, and the SRI is included in the DCI. In this case, the number of SRS resources indicated by the SRI transmitted by the base station may be the number of transmission layers of the PUSCH, and the UE transmits the PUSCH by applying the precoder applied to the SRS resource transmission to each layer.

[PUSCH: Preparation Procedure Time]

Next, PUSCH preparation procedure time will be described. When the base station schedules the UE to transmit the PUSCH using DCI format 0_0, 0_1, or 0_2, the UE may need PUSCH preparation procedure time for transmitting the PUSCH by applying the transmission method (SRS resource transmission precoding method, number of transport layers, and spatial domain transmission filter) indicated through DCI. In NR, the PUSCH preparation procedure time is defined in consideration of this. The UE's PUSCH preparation procedure time may follow Equation 4 below.

$$T_{proc,2} = \max((N_2 + d_{2,1} + d_2)(2048 + 144)K2^{-\mu}T_c + T_{ext} + T_{switch}, d_{2,2}).$$ [Equation 4]

Each variable in Tproc,2 described above with Equation 4 may have the following meanings:

N2: The number of symbols determined according to the UE processing capability 1 or 2 and the numerology μ according to the capability of the UE. N2 may have the value of Table 38 when reported as UE processing capability 1 according to the capability report of the UE, and may have the value of Table 39 when reported as UE processing capability 2 according to the capability report of the UE and configured through upper layer signaling that UE processing capability 2 may be used.

TABLE 38

| μ | PUSCH preparation time N₂ [symbols] |
|---|---|
| 0 | 10 |
| 1 | 12 |
| 2 | 23 |
| 3 | 36 |

TABLE 39

| μ | PUSCH preparation time N₂ [symbols] |
|---|---|
| 0 | 5 |
| 1 | 5.5 |
| 2 | 11 for frequency range 1 | d2,1: The number of symbols set to 0 when all resource elements of the first OFDM symbol of PUSCH transmission are configured to consist only of DM-RS, and set to 1 if not;

K: 64;

μ: Follows a value that Tproc,2 is larger among $\mu_{DL}$ and $\mu_{UL}$. $\mu_{DL}$ refers to the neurology of the downlink to which the PDCCH including DCI scheduling the PUSCH is transmitted, and $\mu_{UL}$ refers to the neurology of the uplink to which the PUSCH is transmitted;

Tc: Has $1/(\Delta f_{max} \cdot N_f)$, $\Delta f_{max} = 480 \cdot 10^3$ Hz, and $N_f = 4096$;

d2,2: When the DCI scheduling PUSCH indicates BWP switching, the BWP switching time is followed, otherwise it has 0;

d2: When OFDM symbols of a PUCCH and a PUSCH having a high priority index and a PUCCH having a low priority index overlap in time, the d2 value of the PUSCH having a high priority index is used. Otherwise, d2 is 0;

Text: When the UE uses the shared spectrum channel access method, the UE may calculate Tex and apply Tex to the PUSCH preparation procedure time. Otherwise, Text is assumed to be 0; and Tswitch: When the uplink switching interval is triggered, the Tswitch is assumed to be the switching interval time. Otherwise, 0 is assumed.

Considering the influence of the time-axis resource mapping information of the PUSCH scheduled through DCI and the timing advance between uplink and downlink, if the first symbol of the PUSCH starts before the first uplink symbol that the CP starts after Tproc,2 from the last symbol of the PDCCH including DCI that scheduled the PUSCH, the base station and the UE determine that the PUSCH preparation procedure time is insufficient. If not, the base station and the UE determine that the PUSCH preparation process time is sufficient. The UE may transmit the PUSCH only when the PUSCH preparation procedure time is sufficient, and ignore the DCI for scheduling the PUSCH when the PUSCH preparation procedure time is insufficient.

[PUSCH: Related to Repeated Transmission]

Hereinafter, repeated transmission of uplink data channels in the 5G system will be described in detail. The 5G system supports two types of repeated transmission methods of uplink data channels, PUSCH repeated transmission type A, and PUSCH repeated transmission type B. The UE may receive one of PUSCH repeated transmission type A or B configured by upper layer signaling.

PUSCH Repeated Transmission Type A

As described above, the symbol length and the location of the start symbol of the uplink data channel are determined by a time domain resource allocation method within one slot, and the base station may notify the UE of the number of repeated transmissions through upper layer signaling (e.g., RRC signaling) or L1 signaling (e.g., DCI).

The UE may repeatedly transmit the uplink data channel, in which the length of the configured uplink data channel and the start symbol are the same, in consecutive slots based on the number of repeated transmissions received from the base station. In this case, when at least one or more symbols are configured as downlink among the slots configured to the UE by the base station as downlink, or symbols of the uplink data channel configured that received by the UE. The UE omits the uplink data channel transmission, but counts the number of repeated transmissions of the uplink data channel.

PUSCH Repeated Transmission Type B

As described above, the start symbol and length of the uplink data channel are determined by a time domain resource allocation method within one slot, and the base station may notify the UE of the number of repeated transmissions, numberofrepetitions, through upper layer signaling (e.g., RRC signaling) or L1 signaling (e.g., DCI).

First, the nominal repetition of the uplink data channel is determined as follows based on the start symbol and length of the uplink data channel configured. The slot at which the n-th nominal repetition begins is given by $$K_s + \left\lfloor \frac{S + n \cdot L}{N_{symb}^{slot}} \right\rfloor$$

and the symbol starting in that slot is given by mod(S+n·L, $N_{symb}^{slot}$). The slot at which the n-th nominal repetition ends is given by $$K_s + \left\lfloor \frac{S + (n+1) \cdot L - 1}{N_{symb}^{slot}} \right\rfloor$$

and the symbol ending at that slot is given by mod (S+(n+1)·L−1, $N_{symb}^{slot}$). Here, n=0, . . . , numberofrepetitions−1, and S represents the start symbol of the configured uplink data channel and L represents the symbol length of the configured uplink data channel. $K_s$ represents a slot in which PUSCH transmission starts, and $N_{symb}^{slot}$ represents the number of symbols per slot.

The UE determines an invalid symbol for PUSCH repeated transmission type B. A symbol configured as downlink by tdd-UL-DL-ConfigurationCommon or tdd-UL-DL-ConfigurationDedicated is determined as an invalid symbol for PUSCH repeated transmission type B. Additionally, an invalid symbol may be configured in an upper layer parameter (e.g., InvalidSymbolPattern). The upper layer parameter (e.g., InvalidSymbolPattern) may provide a symbol level bitmap over one slot or two slots, so that the invalid symbol may be configured. In the bitmap, 1 represents an invalid symbol. Additionally, the period and pattern of the bitmap may be configured through an upper layer parameter (e.g., a periodicityAndPattern). If the upper layer parameter (e.g., InvalidSymbolPattern) is configured and the InvalidSymbolPatternIndicator-ForDCIFormat0_1 or InvalidSymbolPatternIndicator-ForDCIFormat0_2 parameter indicates 1, the UE applies the invalid symbol pattern, and if the parameter indicates 0, the UE does not apply the invalid symbol pattern. If the upper layer parameter (e.g., InvalidSymbolPattern) is configured and the InvalidSymbolPatternIndicator-ForDCIFormat0_1 or InvalidSymbolPatternIndicator-ForDCIFormat0_2 parameter is not configured, the UE applies the invalid symbol pattern.

After the invalid symbol is determined, for each nominal repetition, the UE may consider symbols other than the invalid symbol as valid symbols. If one or more valid symbols are included in each nominal repetition, the nominal repetition may include one or more actual repetitions. Here, each actual repetition includes a continuous set of valid symbols that may be used for PUSCH repeated transmission type B in one slot.

Figure 17:
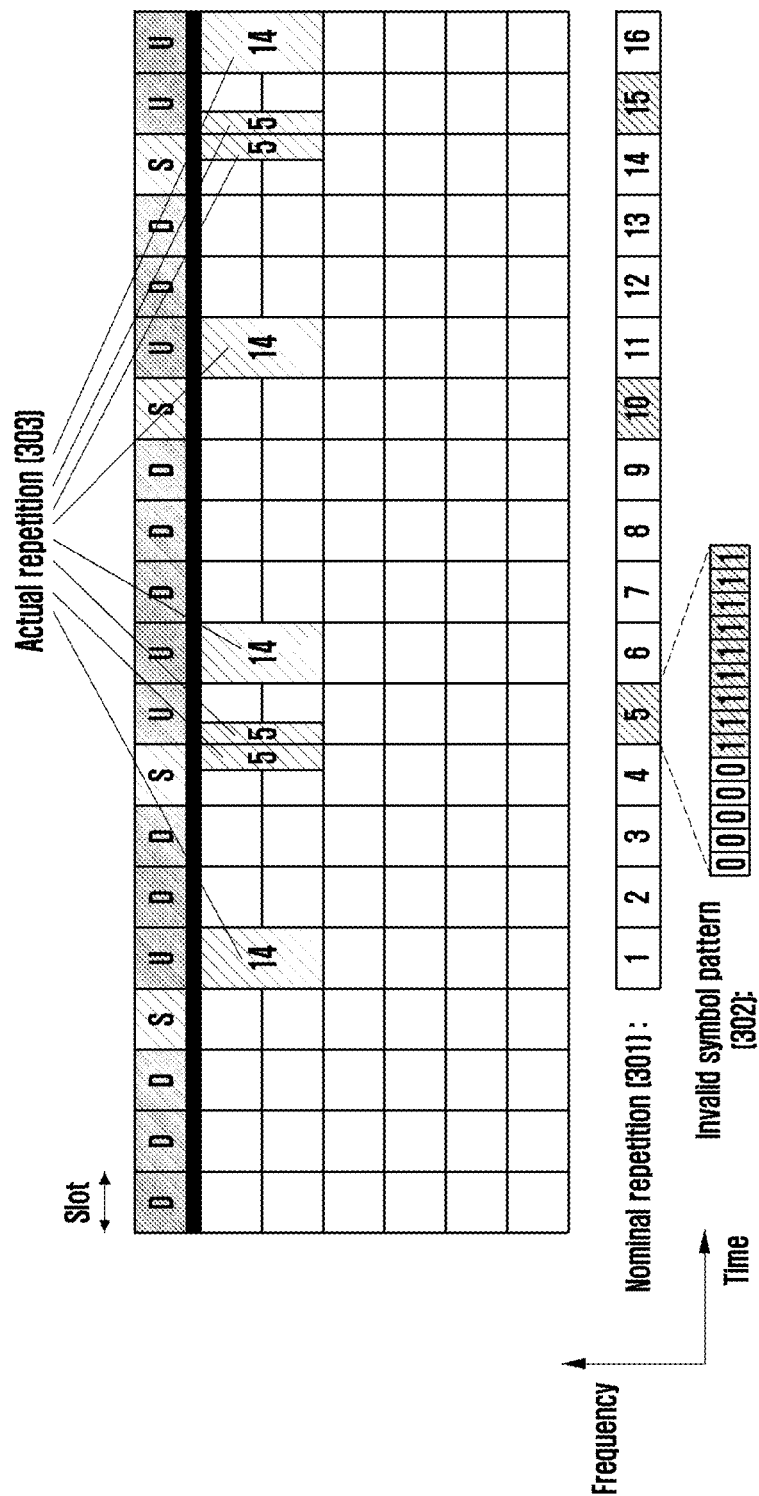
FIG. 17 is a diagram illustrating an example of repeated PUSCH transmission type B in a wireless communication system according to an embodiment of the disclosure.

FIG. 17 is a diagram illustrating an example of repeated PUSCH transmission type B in a wireless communication system according to an embodiment of the disclosure. The UE may receive the start symbol S of the uplink data channel set to 0, the length L of the uplink data channel set to 14, and the number of repeated transmissions set to 16. In this case, nominal repetition is indicated in 16 consecutive slots 1701. Thereafter, the UE may determine the symbol configured as the downlink symbol in each normal repetition 1701 as the invalid symbol. In addition, the UE determines symbols set to 1 in the invalid symbol pattern 1702 as invalid symbols. When valid symbols other than invalid symbols in each nominal repetition consist of one or more consecutive symbols in one slot, the symbols are configured to actual repetition and transmitted 1703.

In addition, for PUSCH repeated transmission, NR Release 16 may define the following additional methods for UL grant-based PUSCH transmission and configured grant-based PUSCH transmission beyond slot boundaries.

In one example of Method 1 (mini-slot level repetition), through one UL grant, two or more PUSCH repeated transmissions are scheduled within one slot or beyond the boundary of consecutive slots. In addition, for method 1, the time domain resource allocation information in the DCI indicates a resource of the first repeated transmission. In addition, time domain resource information of the first repeated transmission and time domain resource information of the remaining repeated transmission may be determined according to the uplink or downlink direction determined for each symbol of each slot. Each repeated transmission occupies consecutive symbols.

In one example of Method 2 (multi-segment transmission), through one UL grant, two or more PUSCH repeated transmissions are scheduled within consecutive slots. In this case, one transmission is designated for each slot, and starting points or repetition lengths may be different for each transmission. In addition, for method 2, the time domain resource allocation information in the DCI indicates the starting point and repetition length of all repeated transmissions. In addition, in the case of performing repeated transmission in a single slot through method 2, if multiple bundles of consecutive uplink symbols exist in the corresponding slot, each repeated transmission is performed for each bundle of uplink symbols. If a bundle of consecutive uplink symbols is uniquely present in the corresponding slot, one PUSCH repeated transmission is performed according to the method of NR Release 15.

In one example of Method 3, through two or more UL grants, two or more PUSCH repeated transmissions are scheduled within consecutive slots. In this case, one transmission is designated for each slot, and the n-th UL grant may be received before PUSCH transmission scheduled with the n−1-th UL grant ends.

In one example of Method 4, through one UL grant or one configured grant, repeated transmission of one or more PUSCHs within a single slot, or repeated transmission of two or more PUSCHs across the boundary of consecutive slots may be supported. The number of repetitions indicated by the base station to the UE is only a nominal value, and the number of repeated PUSCH transmissions actually performed by the UE may be greater than the nominal number of repetitions. The time domain resource allocation information in DCI or in the configured grant refers to the resource of the first repeated transmission indicated by the base station. The time domain resource information of the remaining repeated transmission may be determined by referring to at least resource information of the first repeated transmission and the uplink or downlink direction of the symbols. If the time domain resource information of the repeated transmission indicated by the base station spans the slot boundary or includes an uplink/downlink switching point, the repeated transmission may be divided into a plurality of repeated transmissions. In this case, one repeated transmission may be included for each uplink period in one slot.

[PUSCH: Frequency Hopping Process]

Hereinafter, frequency hopping of a physical uplink shared channel (PUSCH) in a 5G system will be described in detail.

In 5G, as a frequency hopping method of an uplink data channel, two methods are supported for each PUSCH repeated transmission type. First, PUSCH repeated transmission type A supports intra-slot frequency hopping and inter-slot frequency hopping, and PUSCH repeated transmission type B supports inter-repetition frequency hopping and inter-slot frequency hopping.

The intra-slot frequency hopping method supported by the PUSCH repeated transmission type A is a method in which the UE changes the allocated resources of the frequency domain by a configured frequency offset in two hops within one slot and transmits the same. In intra-slot frequency hopping, the start RB of each hop may be expressed through Equation 4.

$$RB_{start} = \begin{cases} RB_{start} & i=0 \\ (RB_{start} + RB_{offset}) \bmod N_{BWP}^{size} & i=1 \end{cases} \quad \text{[Equation 4]}$$

In Equation 4, i=0 and i=1 represent the first hop and the second hop, respectively, and $RB_{start}$ represents the start RB in the UL BWP and is calculated from the frequency resource allocation method. $RB_{offset}$ represents a frequency offset between two hops through an upper layer parameter. The number of symbols of the first hop may be represented by $\lfloor N_{symb}^{PUSCH,s}/2 \rfloor$, and the number of symbols of the second hop may be represented by $N_{symb}^{PUSCH,s} - \lfloor N_{symb}^{PUSCH,s}/2 \rfloor$. $N_{symb}^{PUSCH,s}$ is the length of PUSCH transmission within one slot, and is represented as the number of OFDM symbols.

Next, the inter-slot frequency hopping method supported by the repeated PUSCH transmission types A and B is a method in which the UE changes and transmits allocated resources of the frequency domain for each slot by a configured frequency offset. In the inter-slot frequency hopping, the start RB during slot $n_s^\mu$ may be expressed through Equation 5.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 5]}$$

In Equation 5, $n_s^\mu$ represent the current slot number in the multi-slot PUSCH transmission and $RB_{start}$ represents the start RB in the UL BWP and is calculated from the frequency resource allocation method. $RB_{offset}$ represents a frequency offset between two hops through an upper layer parameter.

Next, the inter-repetition frequency hopping method supported by the repeated PUSCH transmission types B is to move and transmit a resource allocated on the frequency domain for one or a plurality of actual repetitions within each nominal repetition by a configured frequency offset. RBstart(n), which is the index of the start RB on the frequency domain for one or a plurality of actual repetitions within the n-th nominal repetition, may follow Equation 6 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{[Equation 6]}$$

In Equation 6, n represent the index of nominal repetition and $RB_{offset}$ represents an RB offset between two hops through an upper layer parameter.

[PUSCH: Multiplexing Rule when AP/SP CSI Reporting]

Hereinafter, a method of measuring and reporting a channel state in a 5G communication system will be described in detail. The channel state information (CSI) may include a channel quality information (CQI), a precoding matrix indicator (PMI), a CSI-RS resource indicator (CRI), an SS/PBCH block resource indicator (SSBRI), a layer indicator (LI), a rank indicator (RI), and/or L1-reference signal received power (RSRP). The base station may control the time and frequency resources for the above-described CSI measurement and report of the UE.

For the above-described CSI measurement and report, the UE may receive setting information on N (≥1) CSI reports (CSI-ReportConfig), setting information on M (≥1) RS transmission resources (CSI-ResourceConfig), one or two trigger states (CSI-AperiodicTriggerStateList, CSI-SemiPersistentOnPUSCH-TriggerStateList) list information through upper layer signaling. The configuration information on the above-described CSI measurement and reporting may be more specifically described in Tables 40 to 46 below.

TABLE 40

CSI-ReportConfig:
The IE CSI-ReportConfig is used to configure a periodic or semi-persistent report
sent on PUCCH on the cell in which the CSI-ReportConfig is included, or to configure
a semi-persistent or aperiodic report sent on PUSCH triggered by DCI received on
the cell in which the CSI-ReportConfig is included (in this case, the cell on which
the report is sent is determined by the received DCI). See TS 38.214 [19], clause 5.2.1.
CSI-ReportConfig information element CSI-ReportConfig information element
-- ASN1START
-- TAG-CSI-REPORTCONFIG-START
CSI-ReportConfig ::=                    SEQUENCE {
  reportConfigId                           CSI-ReportConfigId,
  carrier                                                      Serv Cell Index
OPTIONAL,  -- Need S
  resourcesForChannelMeasurement           CSI-ResourceConfigId,
  csi-IM-ResourcesForInterference                            CSI-ResourceConfigId TABLE 40-continued CSI-ReportConfig:
The IE CSI-ReportConfig is used to configure a periodic or semi-persistent report
sent on PUCCH on the cell in which the CSI-ReportConfig is included, or to configure
a semi-persistent or aperiodic report sent on PUSCH triggered by DCI received on
the cell in which the CSI-ReportConfig is included (in this case, the cell on which
the report is sent is determined by the received DCI). See TS 38.214 [19], clause 5.2.1.
CSI-ReportConfig information element

```
OPTIONAL,    -- Need R
    nzp-CSI-RS-ResourcesForInterference               CSI-ResourceConfigId
OPTIONAL,    -- Need R
    reportConfigType                                  CHOICE {
        periodic                                          SEQUENCE {
            reportSlotConfig                                       CSI-
ReportPeriodicityAndOffset,
            pucch-CSI-ResourceList                                 SEQUENCE (SIZE
(1..maxNrofBWPs)) OF PUCCH-CSI-Resource
        },
        semiPersistentOnPUCCH                             SEQUENCE {
            reportSlotConfig                                       CSI-
ReportPeriodicityAndOffset,
            pucch-CSI-ResourceList                                 SEQUENCE (SIZE
(1..maxNrofBWPs)) OF PUCCH-CSI-Resource
        },
        semiPersistentOnPUSCH                             SEQUENCE {
            reportSlotConfig                                       ENUMERATED {sl5, sl10, sl20,
sl40, sl80, sl160, sl320},
            reportSlotOffsetList                          SEQUENCE (SIZE (1.. maxNrofUL-
Allocations)) OF INTEGER(0..32),
            p0alpha                                                P0-PUSCH-AlphaSetId
        },
        aperiodic                                         SEQUENCE {
            reportSlotOffsetList                          SEQUENCE (SIZE (1.. maxNrofUL-
Allocations)) OF INTEGER(0..32)
        }
    },
    reportQuantity                                    CHOICE {
        none                                              NULL,
        cri-RI-PMI-CQI                                    NULL,
        cri-RI-i1                                         NULL,
        cri-RI-i1-CQI                                     SEQUENCE {
            pdsch-BundleSizeForCSI                                 ENUMERATED {n2, n4}
OPTIONAL    -- Need S
        },
        cri-RI-CQI                                        NULL,
        cri-RSRP                                          NULL,
        ssb-Index-RSRP                                    NULL,
        cri-RI-LI-PMI-CQI                                 NULL
    },
    reportFreqConfiguration                           SEQUENCE {
        cqi-FormatIndicator                               ENUMERATED { widebandCQI,
subbandCQI }                                      OPTIONAL,    -- Need R
        pmi-FormatIndicator                               ENUMERATED { widebandPMI,
subbandPMI }                                      OPTIONAL,    -- Need R
        csi-ReportingBand                                 CHOICE {
            subbands3                                         BIT STRING(SIZE(3)),
            subbands4                                         BIT STRING(SIZE(4)),
            subbands5                                         BIT STRING(SIZE(5)),
            subbands6                                         BIT STRING(SIZE(6)),
            subbands7                                         BIT STRING(SIZE(7)),
            subbands8                                         BIT STRING(SIZE(8)),
            subbands9                                         BIT STRING(SIZE(9)),
            subbands10                                        BIT STRING(SIZE(10)),
            subbands11                                        BIT STRING(SIZE(11)),
            subbands12                                        BIT STRING(SIZE(12)),
            subbands13                                        BIT STRING(SIZE(13)),
            subbands14                                        BIT STRING(SIZE(14)),
            subbands15                                        BIT STRING(SIZE(15)),
            subbands16                                        BIT STRING(SIZE(16)),
            subbands17                                        BIT STRING(SIZE(17)),
            subbands18                                        BIT STRING(SIZE(18)),
            ...,
            subbands19-v1530                                  BIT STRING(SIZE(19))
        } OPTIONAL    -- Need S
    }
OPTIONAL,    -- Need R
    timeRestrictionForChannelMeasurements             ENUMERATED {configured,
notConfigured},
```

TABLE 40-continued

CSI-ReportConfig:
The IE CSI-ReportConfig is used to configure a periodic or semi-persistent report
sent on PUCCH on the cell in which the CSI-ReportConfig is included, or to configure
a semi-persistent or aperiodic report sent on PUSCH triggered by DCI received on
the cell in which the CSI-ReportConfig is included (in this case, the cell on which
the report is sent is determined by the received DCI). See TS 38.214 [19], clause 5.2.1.
CSI-ReportConfig information element

```
    timeRestrictionForInterferenceMeasurements              ENUMERATED {configured,
notConfigured},
    codebookConfig                                          CodebookConfig
OPTIONAL,   -- Need R
    dummy                                                   ENUMERATED {n1, n2}
OPTIONAL,   -- Need R
    groupBasedBeamReporting                                 CHOICE {
      enabled                                                 NULL,
      disabled                                                SEQUENCE {
        nrofReportedRS                                          ENUMERATED {n1, n2, n3,
n4}                                                     OPTIONAL   -- Need S
      }
    },
    cqi-Table                                               ENUMERATED {table1, table2, table3, spare1)
OPTIONAL,   -- Need R
    subbandSize                                             ENUMERATED {value1, value2},
    non-PMI-PortIndication                                  SEQUENCE (SIZE (1..maxNrofNZP-CSI-RS-
ResourcesPerConfig)) OF PortIndexFor8Ranks OPTIONAL,    -- Need R
    ...,
    [[
    semiPersistentOnPUSCH-v1530                             SEQUENCE {
      reportSlotConfig-v1530                                  ENUMERATED {sl4, sl8, sl16}
    }
OPTIONAL   -- Need R
    ]],
    [[
    semiPersistentOnPUSCH-v1610                             SEQUENCE {
      reportSlotOffsetListDCI-0-2-r16                         SEQUENCE (SIZE (1.. maxNrofUL-
Allocations-r16)) OF INTEGER(0..32)                     OPTIONAL,   -- Need R
      reportSlotOffsetListDCI-0-1-r16                         SEQUENCE (SIZE (1.. maxNrofUL-
Allocations-r16)) OF INTEGER(0..32)                     OPTIONAL   -- Need R
    }
OPTIONAL,   -- Need R
    aperiodic-v1610                                         SEQUENCE {
      reportSlotOffsetListDCI-0-2-r16                         SEQUENCE (SIZE (1.. maxNrofUL-
Allocations-r16)) OF INTEGER(0..32)                     OPTIONAL, -- Need R
      reportSlotOffsetListDCI-0-1-r16                         SEQUENCE (SIZE (1.. maxNrofUL-
Allocations-r16)) OF INTEGER(0..32)                     OPTIONAL -- Need R
    }
OPTIONAL,   -- Need R
    reportQuantity-r16                                      CHOICE {
      cri-SINR-r16                                            NULL,
      ssb-Index-SINR-r16                                      NULL
    }
OPTIONAL, -- Need R
    codebookConfig-r16                                      CodebookConfig-r16
OPTIONAL -- Need R
    ]]
}
CSI-ReportPeriodicityAndOffset ::= CHOICE {
    slots4                                                  INTEGER(0..3),
    slots5                                                  INTEGER(0..4),
    slots8                                                  INTEGER(0..7),
    slots10                                                 INTEGER(0..9),
    slots16                                                 INTEGER(0..15),
    slots20                                                 INTEGER(0..19),
    slots40                                                 INTEGER(0..39),
    slots80                                                 INTEGER(0..79),
    slots160                                                INTEGER(0..159),
    slots320                                                INTEGER(0..319)
}
PUCCH-CSI-Resource ::=                                    SEQUENCE {
    uplinkBandwidthPartId                                   BWP-Id,
    pucch-Resource                                          PUCCH-ResourceId
}
PortIndexFor8Ranks ::=                                    CHOICE {
    portIndex8                                              SEQUENCE)
      rank1-8                                                         PortIndex8
OPTIONAL,   -- Need R
      rank2-8                                               SEQUENCE(SIZE(2)) OF PortIndex8
OPTIONAL,   -- Need R
      rank3-8                                               SEQUENCE(SIZE(3)) OF PortIndex8
```

TABLE 40-continued

CSI-ReportConfig:
The IE CSI-ReportConfig is used to configure a periodic or semi-persistent report
sent on PUCCH on the cell in which the CSI-ReportConfig is included, or to configure
a semi-persistent or aperiodic report sent on PUSCH triggered by DCI received on
the cell in which the CSI-ReportConfig is included (in this case, the cell on which
the report is sent is determined by the received DCI). See TS 38.214 [19], clause 5.2.1.
CSI-ReportConfig information element

| | | |
|---|---|---|
| OPTIONAL, | -- Need R | |
| rank4-8 | | SEQUENCE(SIZE(4)) OF PortIndex8 |
| OPTIONAL, | -- Need R | |
| rank5-8 | | SEQUENCE(SIZE(5)) OF PortIndex8 |
| OPTIONAL, | -- Need R | |
| rank6-8 | | SEQUENCE(SIZE(6)) OF PortIndex8 |
| OPTIONAL, | -- Need R | |
| rank7-8 | | SEQUENCE(SIZE(7)) OF PortIndex8 |
| OPTIONAL, | -- Need R | |
| rank8-8 | | SEQUENCE(SIZE(8)) OF PortIndex8 |
| OPTIONAL | -- Need R | |
| }, | | |
| portIndex4 | | SEQUENCE{ |
| rank1-4 | | PortIndex4 |
| OPTIONAL, | -- Need R | |
| rank2-4 | | SEQUENCE(SIZE(2)) OF PortIndex4 |
| OPTIONAL, | -- Need R | |
| rank3-4 | | SEQUENCE(SIZE(3)) OF PortIndex4 |
| OPTIONAL, | -- Need R | |
| rank4-4 | | SEQUENCE(SIZE(4)) OF PortIndex4 |
| OPTIONAL | -- Need R | |
| }, | | |
| portIndex2 | | SEQUENCE{ |
| rank1-2 | | PortIndex2 |
| OPTIONAL, | -- Need R | |
| rank2-2 | | SEQUENCE(SIZE(2)) OF PortIndex2 |
| OPTIONAL | -- Need R | |
| }, | | |
| portIndex1 | | NULL |
| } | | |
| PortIndex8::= | | INTEGER (0..7) |
| PortIndex4::= | | INTEGER (0..3) |
| PortIndex2::= | | INTEGER (0..1) |
| -- TAG-CSI-REPORTCONFIG-STOP | | |
| -- ASN1STOP | | |

CSI-ReportConfig field descriptions carrier
Indicates in which serving cell the CSI-ResourceConfig indicated below are to be found. If the field is absent, the
resources are on the same serving cell as this report configuration.
codebookConfig
Codebook configuration for Type-1 or Type-2 including codebook subset restriction. Network does not configure
codebookConfig and codebookConfig-r16 simultaneously to a UE
cqi-FormatIndicator
Indicates whether the UE shall report a single (wideband) or multiple (subband) CQI. (see TS 38.214 [19], clause
5.2.1.4).
cqi-Table
Which CQI table to use for CQI calculation (see TS 38.214 [19], clause 5.2.2.1).
csi-IM-ResourcesForInterference
CSI IM resources for interference measurement. csi-ResourceConfigId of a CSI-ResourceConfig included in the
configuration of the serving cell indicated with the field "carrier" above. The CSI-ResourceConfig indicated here
contains only CSI-IM resources. The bwp-Id in that CSI-ResourceConfig is the same value as the bwp-Id in the
CSI-ResourceConfig indicated by resourcesForChannelMeasurement.
csi-ReportingBand
Indicates a contiguous or non-contiguous subset of subbands in the bandwidth part which CSI shall be reported for.
Each bit in the bit-string represents one subband. The right-most bit in the bit string represents the lowest subband in
the BWP. The choice determines the number of subbands (subbands3 for 3 subbands, subbands4 for 4 subbands,
and so on) (see TS 38.214 [19], clause 5.2.1.4). This field is absent if there are less than 24 PRBs (no sub band) and
present otherwise, the number of sub bands can be from 3 (24 PRBs, sub band size 8) to 18 (72 PRBs, sub band size
4).
dummy
This field is not used in the specification. If received it shall be ignored by the UE.
groupBasedBeamReporting
Turning on/off group beam based reporting (see TS 38.214 [19], clause 5.2.1.4)
non-PMI-PortIndication
Port indication for RI/CQI calculation. For each CSI-RS resource in the linked ResourceConfig for channel
measurement, a port indication for each rank R, indicating which R ports to use. Applicable only for non-PMI feedback
(see TS 38.214[19], clause 5.2.1.4.2).
The first entry in non-PMI-PortIndication corresponds to the NZP-CSI-RS-Resource indicated by the first entry in
nzp-CSI-RS-Resources in the NZP-CSI-RS-ResourceSet indicated in the first entry of nzp-CSI-RS-ResourceSetList
of the CSI-ResourceConfig whose CSI-ResourceConfigId is indicated in a CSI-MeasId together with the above TABLE 40-continued CSI-ReportConfig:
The IE CSI-ReportConfig is used to configure a periodic or semi-persistent report
sent on PUCCH on the cell in which the CSI-ReportConfig is included, or to configure
a semi-persistent or aperiodic report sent on PUSCH triggered by DCI received on
the cell in which the CSI-ReportConfig is included (in this case, the cell on which
the report is sent is determined by the received DCI). See TS 38.214 [19], clause 5.2.1.
CSI-ReportConfig information element CSI-ReportConfigId; the second entry in non-PMI-PortIndication corresponds to the NZP-CSI-RS-Resource indicated
by the second entry in nzp-CSI-RS-Resources in the NZP-CSI-RS-ResourceSet indicated in the first entry of
nzp-CSI-RS-ResourceSetList of the same CSI-ResourceConfig, and so on until the NZP-CSI-RS-Resource indicated
by the last entry in nzp-CSI-RS-Resources in the in the NZP-CSI-RS-ResourceSet indicated in the first entry of
nzp-CSI-RS-ResourceSetList of the same CSI-ResourceConfig. Then the next entry corresponds to the
NZP-CSI-RS-Resource indicated by the first entry in nzp-CSI-RS-Resources in the NZP-CSI-RS-ResourceSet
indicated in the second entry of nzp-CSI-RS-ResourceSetList of the same CSI-ResourceConfig and so on.
nrofReportedRS
The number (N) of measured RS resources to be reported per report setting in a non-group-based report. N <=
N_max, where N_max is either 2 or 4 depending on UE capability.
(see TS 38.214 [19], clause 5.2.1.4) When the field is absent the UE applies the value 1
nzp-CSI-RS-ResourcesForInterference
NZP CSI RS resources for interference measurement. csi-ResourceConfigId of a CSI-ResourceConfig included in the
configuration of the serving cell indicated with the field "carrier" above. The CSI-ResourceConfig indicated here
contains only NZP-CSI-RS resources. The bwp-Id in that CSI-ResourceConfig is the same value as the bwp-Id in the
CSI-ResourceConfig indicated by resourcesForChannelMeasurement.
p0alpha
Index of the p0-alpha set determining the power control for this CSI report transmission (see TS 38.214 [19], clause
6.2.1.2).
pdsch-BundleSizeForCSI
PRB bundling size to assume for CQI calculation when reportQuantity is CRI/RI/i1/CQI. If the field is absent, the UE
assumes that no PRB bundling is applied (see TS 38.214 [19], clause 5.2.1.4.2).
pmi-FormatIndicator
Indicates whether the UE shall report a single (wideband) or multiple (subband) PMI. (see TS 38.214 [19], clause
5.2.1.4).
pucch-CSI-ResourceList
Indicates which PUCCH resource to use for reporting on PUCCH.
reportConfigType
Time domain behavior of reporting configuration
reportFreqConfiguration
Reporting configuration in the frequency domain. (see TS 38.214 [19], clause 5.2.1.4).
reportQuantity
The CSI related quantities to report. see TS 38.214 [19], clause 5.5.1. If the field reportQuantity-r16 is present, UE
shall ignore reportQuantity (without suffix).
reportSlotConfig
Periodicity and slot offset (see TS 38.214 [19], clause 5.2.1.4). If the field reportSlotConfig-v1530 is present, the UE
shall ignore the value provided in reportSlotConfig (without suffix).
reportSlotOffsetList, reportSlotOffsetListDCI-0-1, reportSlotOffsetListDCI-0-2
Timing offset Y for semi persistent reporting using PUSCH. This field lists the allowed offset values. This list must have
the same number of entries as the pusch-TimeDomainAllocationList in PUSCH-Config. A particular value is indicated
in DCI. The network indicates in the DCI field of the UL grant, which of the configured report slot offsets the UE shall
apply. The DCI value 0 corresponds to the first report slot offset in this list, the DCI value 1 corresponds to the second
report slot offset in this list, and so on. The first report is transmitted in slot n + Y, second report in n + Y + P, where P is the
configured periodicity.
Timing offset Y for aperiodic reporting using PUSCH. This field lists the allowed offset values. This list must have the
same number of entries as the pusch-TimeDomainAllocationList in PUSCH-Config. A particular value is indicated in
DCI. The network indicates in the DCI field of the UL grant, which of the configured report slot offsets the UE shall
apply. The DCI value 0 corresponds to the first report slot offset in this list, the DCI value 1 corresponds to the second
report slot offset in this list, and so on (see TS 38.214 [19], clause 6.1.2.1). The field reportSlotOffsetList applies to DCI
format 0_0, the field reportSlotOffsetListDCI-0-1 applies to DCI format 0_1 and the field reportSlotOffsetListDCI-0-2
applies to DCI format 0 2 (see TS 38.214 [19], clause 6.1.2.1).
resourcesForChannelMeasurement
Resources for channel measurement. csi-ResourceConfigId of a CSI-ResourceConfig included in the configuration of
the serving cell indicated with the field "carrier" above. The CSI-ResourceConfig indicated here contains only
NZP-CSI-RS resources and/or SSB resources. This CSI-ReportConfig is associated with the DL BWP indicated by
bwp-Id in that CSI-ResourceConfig.
subbandSize
Indicates one out of two possible BWP-dependent values for the subband size as indicated in TS 38.214 [19], table
5.2.1.4-2. If csi-ReportingBand is absent, the UE shall ignore this field.
timeRestrictionForChannelMeasurements
Time domain measurement restriction for the channel (signal) measurements (see TS 38.214 [19], clause 5.2.1.1)
timeRestrictionForInterferenceMeasurements
Time domain measurement restriction for interference measurements (see TS 38.214 [19], clause 5.2.1.1)

TABLE 41

CSI-ResourceConfig
The IE CSI-ResourceConfig defines a group of one or more NZP-CSI-RS-ResourceSet, CSI-IM-ResourceSet and/or CSI-SSB-ResourceSet.

CSI-ResourceConfig information element

```
-- ASN1START
-- TAG-CSI-RESOURCECONFIG-START
CSI-ResourceConfig ::=              SEQUENCE {
   csi-ResourceConfigId                 CSI-ResourceConfigId,
   csi-RS-ResourceSetList               CHOICE {
      nzp-CSI-RS-SSB                       SEQUENCE {
         nzp-CSI-RS-ResourceSetList           SEQUENCE (SIZE (1..maxNrofNZP-CSI-RS-ResourceSetsPerConfig)) OF NZP-CSI-RS-ResourceSetId
OPTIONAL, -- Need R
         csi-SSB-ResourceSetList              SEQUENCE (SIZE (1..maxNrofCSI-SSB-ResourceSetsPerConfig)) OF CSI-SSB-ResourceSetId OPTIONAL -- Need R
      },
      csi-IM-ResourceSetList               SEQUENCE (SIZE (1..maxNrofCSI-IM-ResourceSetsPerConfig)) OF CSI-IM-ResourceSetId
   },
   bwp-Id                               BWP-Id,
   resourceType                         ENUMERATED { aperiodic, semiPersistent, periodic },
   ...
}
-- TAG-CSI-RESOURCECONFIG-STOP
-- ASN1STOP
```

CSI-ResourceConfig field descriptions bwp-Id
The DL BWP which the CSI-RS associated with this CSI-ResourceConfig are located in (see TS 38.214 [19], clause 5.2.1.2
csi-IM-ResourceSetList
List of references to CSI-IM resources used for beam measurement and reporting in a CSI-RS resource set Contains up to maxNrofCSI-IM-ResourceSetsPerConfig resource sets if resource Type is 'aperiodic' and 1 otherwise (see TS 38.214 [19], clause 5.2.1.2).
csi-ResourceConfigId
Used in CSI-ReportConfig to refer to an instance of CSI-ResourceConfig.
csi-SSB-ResourceSetList
List of references to SSB resources used for beam measurement and reporting in a CSI-RS resource set (see TS 38.214 [19], clause 5.2.1.2).)
nzp-CSI-RS-ResourceSetList
List of references to NZP CSI-RS resources used for beam measurement and reporting in a CSI-RS resource set. Contains up to maxNrofNZP-CSI-RS-ResourceSetsPerConfig resource sets if resoureType is 'aperiodic' and 1 otherwise (see TS 38.214 [19], clause 5.2.1.2).
resourceType
Time domain behavior of resource configuration (see TS 38.214 [19], clause 5.2.1.2). It does not apply to resources provided in the csi-SSB-ResourceSetList.

TABLE 42

NZP-CSI-RS-ResourceSet
The IE NZP-CSI-RS-ResourceSet is a set of Non-Zero-Power (NZP) CSI-RS resources (their IDs) and set-specific parameters.

NZP-CSI-RS-ResourceSet information element

```
-- ASN1START
-- TAG-NZP-CSI-RS-RESOURCESET-START
NZP-CSI-RS-ResourceSet ::=          SEQUENCE {
   nzp-CSI-ResourceSetId                NZP-CSI-RS-ResourceSetId,
   nzp-CSI-RS-Resources                 SEQUENCE (SIZE (1..maxNrofNZP-CSI-RS-ResourcesPerSet)) OF NZP-CSI-RS-ResourceId,
   repetition                           ENUMERATED { on, off }
OPTIONAL,   -- Need S
   aperiodicTriggeringOffset            INTEGER(0..6)
OPTIONAL,   -- Need S
   trs-Info                             ENUMERATED {true}
OPTIONAL,   -- Need R
   ...,
   [[
   aperiodicTriggeringOffset-r16        INTEGER(0..31)
OPTIONAL   -- Need S
   ]]
}
```

TABLE 42-continued

NZP-CSI-RS-ResourceSet
The IE NZP-CSI-RS-ResourceSet is a set of Non-Zero-Power (NZP)
CSI-RS resources (their IDs) and set-specific parameters.

-- TAG-NZP-CSI-RS-RESOURCESET-STOP
-- ASN1STOP

NZP-CSI-RS-ResourceSet field descriptions aperiodicTriggeringOffset, aperiodicTriggeringOffset-r16
Offset X between the slot containing the DCI that triggers a set of aperiodic NZP CSI-RS resources and the slot in
which the CSI-RS resource set is transmitted. For aperiodicTriggeringOffset the value 0 corresponds to 0 slots, value
1 corresponds to 1 slot, value 2 corresponds to 2 slots, value 3 corresponds to 3 slots, value 4 corresponds to 4 slots,
value 5 corresponds to 16 slots, value 6 corresponds to 24 slots. For aperiodicTriggeringOffset-r16 the value
indicates the number of slots. The network configures only one of the fields. When neither field is included, the UE
applies the value 0.
nzp-CSI-RS-Resources
NZP-CSI-RS-Resources associated with this NZP-CSI-RS resource set (see TS 38.214 [19], clause 5.2). For CSI,
there are at most 8 NZP CSI RS resources per resource set.
repetition
Indicates whether repetition is on/off. If the field is set to off or if the field is absent, the UE may not assume that the
NZP-CSI-RS resources within the resource set are transmitted with the same downlink spatial domain transmission
filter (see TS 38.214 [19], clauses 5.2.2.3.1 and 5.1.6.1.2). It can only be configured for CSI-RS resource sets which
are associated with CSI-ReportConfig with report of L1 RSRP or "no report".
trs-Info
Indicates that the antenna port for all NZP-CSI-RS resources in the CSI-RS resource set is same. If the field is absent
or released the UE applies the value false (see TS 38.214 [19], clause 5.2.2.3.1).

TABLE 43

CSI-SSB-ResourceSet
The IE CSI-SSB-ResourceSet is used to configure
one SS/PBCH block resource set which refers to
SS/PBCH as indicated in ServingCellConfigCommon.
CSI-SSB-ResourceSet information element -- ASN1START
-- TAG-CSI-SSB-RESOURCESET-START
CSI-SSB-ResourceSet ::= SEQUENCE {
    csi-SSB-ResourceSetId       CSI-SSB-ResourceSetId,
    csi-SSB-ResourceList        SEQUENCE (SIZE(1..maxNrofCSI-SSB-
ResourcePerSet)) OF SSB-Index,
    ...
}
-- TAG-CSI-SSB-RESOURCESET-STOP
-- ASN1STOP

TABLE 44

CSI-IM-ResourceSet
The IE CSI-IM-ResourceSet is used to configure a set of one or more CSI Interference
Management (IM) resources (their IDs) and set-specific parameters.

CSI-IM-ResourceSet information element

-- ASN1START
-- TAG-CSI-IM-RESOURCESET-START
CSI-IM-ResourceSet ::=         SEQUENCE {
    csi-IM-ResourceSetId        CSI-IM-ResourceSetId,
    csi-IM-Resources            SEQUENCE (SIZE(1..maxNrofCSI-IM-
ResourcesPerSet)) OF CSI-IM-ResourceId,
    ...
}
-- TAG-CSI-IM-RESOURCESET-STOP
-- ASN1STOP CSI-IM-ResourceSet field descriptions csi-IM-Resources
CSI-IM-Resources associated with this CSI-IM-ResourceSet (see TS 38.214 [19], clause 5.2)

TABLE 45

CSI-AperiodicTriggerStateList
The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.

CSI-AperiodicTriggerStateList information element

```
-- ASN1START
-- TAG-CSI-APERIODICTRIGGERSTATELIST-START
CSI-AperiodicTriggerStateList ::=        SEQUENCE (SIZE (1..maxNrOfCSI-
AperiodicTriggers)) OF CSI-AperiodicTriggerState
CSI-AperiodicTriggerState ::=            SEQUENCE {
    associatedReportConfigInfoList                SEQUENCE
(SIZE(1..maxNrofReportConfigPerAperiodicTrigger)) OF CSI-AssociatedReportConfigInfo,
    ...
}
CSI-AssociatedReportConfigInfo ::=       SEQUENCE {
    reportConfigId                       CSI-ReportConfigId,
    resourcesForChannel                  CHOICE {
        nzp-CSI-RS                           SEQUENCE {
            resourceSet                          INTEGER (1..maxNrofNZP-CSI-
RS-ResourceSetsPerConfig),
            qcl-info                             SEQUENCE (SIZE (1..maxNrofAP-
CSI-RS-ResourcesPerSet)) OF TCI-StateId OPTIONAL -- Cond Aperiodic
        },
        csi-SSB-ResourceSet                  INTEGER (1..maxNrofCSI-SSB-
ResourceSetsPerConfig)
    },
    csi-IM-ResourcesForInterference      INTEGER (1..maxNrofCSI-IM-
ResourceSetsPerConfig)                   OPTIONAL, -- Cond CSI-IM-ForInterference
    nzp-CSI-RS-ResourcesForInterference  INTEGER   (1..maxNrofNZP-CSI-RS-
ResourceSetsPerConfig)                   OPTIONAL,  -- Cond NZP-CSI-RS-ForInterference
    ...
}
-- TAG-CSI-APERIODICTRIGGERSTATELIST-STOP
-- ASN1STOP
```

CSI-AssociatedReportConfigInfo field descriptions csi-IM-ResourcesForInterference
CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.
csi-SSB-ResourceSet
CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).
nzp-CSI-RS-ResourcesForInterference
NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).
qcl-info
List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)
reportConfigId
The reportConfigId of one of the CSI-ReportConfigToAddMod configured in CSI-MeasConfig
resourceSet
NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to thesecond entry, and so on).

TABLE 45-continued

CSI-AperiodicTriggerStateList
The CSI-AperiodicTriggerStateList IE is used to configure the UE with a list of
aperiodic trigger states. Each codepoint of the DCI field "CSI request"
is associated with one trigger state. Upon reception of the value associated with
a trigger state, the UE will perform measurement of CSI-RS (reference signals)
and aperiodic reporting on L1 according to all entries in the
associatedReportConfigInfoList for that trigger state.

| Conditional Presence | Explanation |
|---|---|
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

TABLE 46

CSI-SemiPersistentOnPUSCH-TriggerStateList
The CSI-SemiPersistentOnPUSCH-TriggerStateList IE is used to configure the UE with
list of trigger states for semi-persistent reporting of channel state
information on L1. See also TS 38.214 [19], clause 5.2.
CSI-SemiPersistentOnPUSCH-TriggerStateList information element

```
-- ASN1START
-- TAG-CSI-SEMIPERSISTENTONPUSCHTRIGGERSTATELIST-START
CSI-SemiPersistentOnPUSCH-TriggerStateList  ::=         SEQUENCE(SIZE
(1..maxNrOfSemiPersistentPUSCH-Triggers)) OF CSI-SemiPersistentOnPUSCH-TriggerState
CSI-SemiPersistentOnPUSCH-TriggerState ::=              SEQUENCE {
    associatedReportConfigInfo                          CSI-ReportConfigId,
    ...
}
-- TAG-CSI-SEMIPERSISTENTONPUSCHTRIGGERSTATELIST-STOP
-- ASN1STOP
```

With respect to the above-described CSI report setting (CSI-ReportConfig), each report setting CSI-ReportConfig may be associated with CSI resource setting associated with the corresponding report setting and one downlink (DL) bandwidth part identified by an upper layer parameter bandwidth part identifier (bwp-id) given by CSI-ResourceConfig. As a time domain reporting operation for each report setting CSI-ReportConfig, "aperiodic," "semi-persistent," and "periodic" methods are supported, and this may be configured from the base station to the UE by the reportConfigType parameter configured from the upper layer. The semi-persistent CSI reporting method supports the "PUCCH-based semi-persistent (semi-PersistentOnPUCCH)" and "PUSCH-based semi-persistent (semi-PersistentOnPUSCH)." In the case of the periodic or semi-persistent CSI reporting method, the UE may receive configured PUCCH or PUSCH resource for transmitting CSI from the base station through upper layer signaling. A period and a slot offset of the PUCCH or PUSCH resource to transmit CSI may be given as the numerology of an uplink (UL) bandwidth part configured to transmit the CSI report. In the case of the aperiodic CSI reporting method, the UE may receive scheduled PUSCH resource for transmitting CSI from the base station through L1 signaling (DCI format 0_1 described above).

With respect to the above-described CSI resource setting (CSI-ResourceConfig), each CSI resource setting CSI-ReportConfig may include S (≥1) CSI resource sets (given as an upper layer parameter csi-RS-ResourceSetList). The CSI resource set list may be composed of a non-zero power (NZP) CSI-RS resource set and an SS/PBCH block set, or may be composed of a CSI-interference measurement (CSI-IM) resource set. Each CSI resource setting may be located in a downlink (DL) bandwidth part identified by an upper layer parameter bwp-id, and the CSI resource setting may be connected to the CSI report setting of the same downlink bandwidth part. The time domain operation of the CSI-RS resource in the CSI resource setting may be configured to one of "aperiodic" CSI resource configuration, "periodic" CSI resource configuration, or "semi-persistent" CSI resource configuration from an upper layer parameter resourceType. For the periodic or semi-persistent CSI resource setting, the number of CSI-RS resource sets may be limited to S=1, and the configured period and slot offset may be given as the numerology of the downlink bandwidth part identified by bwp-id.

The UE may receive one or more CSI resource settings for channel or interference measurement from the base station through upper layer signaling, and may include, for example, the following CSI resources.

CSI-IM resource for interference measurement;
NZP CSI-RS resource for interference measurement; and
NZP CSI-RS resource for channel measurement.

For CSI-RS resource sets associated with resource settings in which the upper layer parameter resourceType is configured to "aperiodic," "periodic," or "semi-persistent," the trigger state for the CSI report setting in which the reportType is set to "aperiodic" and the resource setting for channel or interference measurement for one or more component cells (CC) may be configured as an upper layer parameter CSI-AperiodicTriggerStateList.

Aperiodic CSI reporting of the UE may be performed using PUSCH, periodic CSI reporting of the UE may be performed using PUCCH, Semi-persistent CSI reporting of the UE may be performed using PUSCH when triggered or activated with DCI and may be performed using the PUCCH after being activated with a MAC control element (MAC CE). As described above, the CSI resource setting may also be configured aperiodically, periodically, or semi-persistently. The combination between the CSI report setting and the CSI resource configuration may be supported based on the following Table 47.

TABLE 47

Table 5.2.1.4-1: Triggering/Activation of CSI Reporting for the possible CSI-RS Configurations.
Table 5.2.1.4-1: Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI report may be triggered by the "CSI request" field of the aforementioned DCI format 0_1 corresponding to the scheduling DCI for the PUSCH. The UE may monitor the PDCCH, and obtain DCI format 0_1, scheduling information on PUSCH, and a CSI request indicator. The CSI request indicator may be configured to NTS (=0, 1, 2, 3, 4, 5, or 6) bits, and may be determined by upper layer signaling (reportTriggerSize). One trigger state among one or a plurality of aperiodic CSI reporting trigger states that may be configured as upper layer signaling (CSI-AperiodicTriggerStateList) may be triggered by the CSI request indicator.

In one example, when all bit values of the CSI request field are 0, it may refer to that no CSI report is requested.

In one example, if the number (M) of CSI trigger states in the configured CSI-AperiodicTriggerStateList is greater than 2NTS-1, according to a predefined mapping relationship, M CSI trigger states may be mapped to 2NTS-1, and one of the trigger states of 2NTS-1 may be indicated by the CSI request field.

In one example, if the number (M) of CSI trigger states in the configured CSI-AperiodicTriggerStateList is less than or equal to 2NTS-1, one of the M CSI trigger states may be indicated by the CSI request field.

The following Table 48 illustrates an example of a relationship between a CSI request indicator and a CSI trigger state that may be indicated by the corresponding indicator.

TABLE 48

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1 CSI resource#2 |
| 10 | CSI trigger state#2 | CSI report#3 | CSI resource#3 |
| 11 | CSI trigger state#3 | CSI report#4 | CSI resource#4 |

Figure 13:
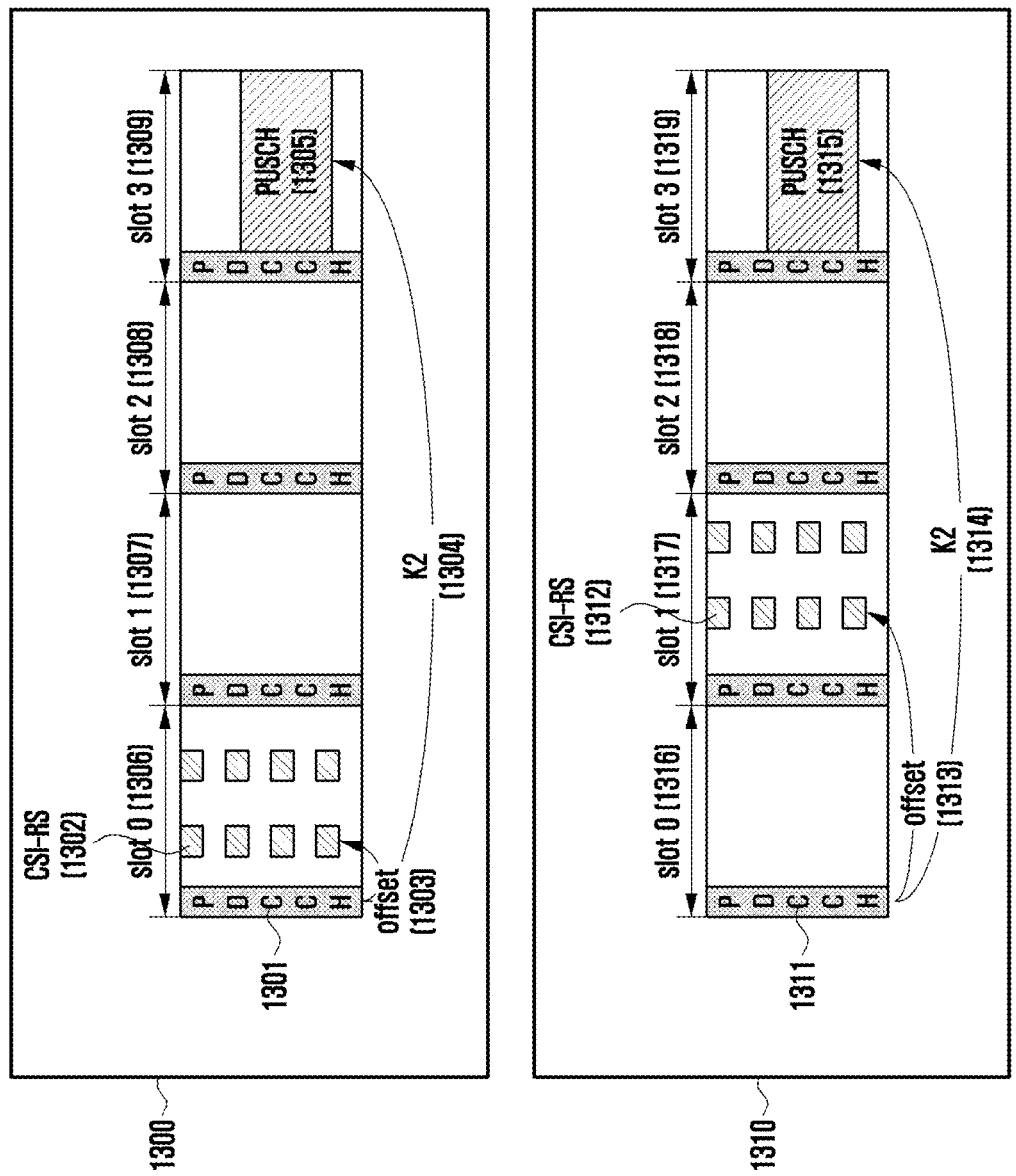
FIG. 13 is a diagram illustrating an example of an aperiodic CSI reporting method according to an embodiment of the disclosure.

The UE may perform measurement on the CSI resource in the CSI trigger state triggered by the CSI request field, and from this, may generate CSI (including at least one of the CQI, PMI, CRI, SSBRI, LI, RI, or L1-RSRP). The UE may transmit the obtained CSI using the PUSCH scheduled by the corresponding DCI format 0_1. When one bit corresponding to the uplink data indicator (UL-SCH indicator) in DCI format 0_1 indicates "1," uplink data (UL-SCH) and obtained CSI may be multiplexed and transmitted to the PUSCH resource scheduled by DCI format 0_1. When one bit corresponding to the uplink data indicator (UL-SCH indicator) in DCI format 0_1 indicates "0," only CSI without uplink data (UL-SCH) may be mapped and transmitted to the PUSCH resource scheduled by DCI format 0_1. FIG. 13 is a diagram illustrating an example of an aperiodic CSI reporting method.

In the example 1300 of FIG. 13, the UE may monitor PDCCH 1301 to obtain DCI format 0_1 and may obtain scheduling information and CSI request information on the PUSCH 1305 therefrom. The UE may obtain resource information on the CSI-RS 1302 to be measured from the received CSI request indicator. The UE may determine at which time point the UE may perform measurement on the transmitted CSI-RS 1302 resource, based on the time when DCI format 0_1 is received and the parameter (the aforementioned aperiodicTriggeringOffset) for the offset in the CSI resource set configuration (e.g., NZP CSI-RS resource set configuration (NZP-CSI-RS-ResourceSet)). More specifically, the UE may receive the offset value X of the parameter aperiodicTriggeringOffset in the NZP-CSI-RS resource set configuration by upper layer signaling from the base station, and the configured offset value X may refer to an offset between a slot in which a DCI triggering aperiodic CSI report is received and a slot in which a CSI-RS resource is transmitted. For example, the aperiodicTriggeringOffset parameter value and the offset value X may have a mapping relationship described in Table 49 below.

TABLE 49

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

An example 1300 of FIG. 13 illustrates an example in which the above-described offset value is set to X=0. In this case, the UE may receive the CSI-RS 1302 in the slot (corresponding to slot 0 1306 of FIG. 13) in which DCI format 0_1 triggering aperiodic CSI reporting is received, and may report the CSI information measured by the received CSI-RS to the base station through the PUSCH 1305. The UE may obtain scheduling information (the aforementioned information corresponding to each field of DCI format 0_1) for the PUSCH 1305 for CSI reporting from DCI format 0_1. As an example, in DCI format 0_1, the UE may obtain information on a slot in which the PUSCH 1305 to be transmitted from the time domain resource allocation information on the PUSCH 1305. In an example 1310 of FIG. 13, the UE obtains a K2 value corresponding to a slot offset value for PDCCH-to-PUSCH as 3, and accordingly, the PUSCH 1305 may be transmitted at slot 3 1309 three slots away from the slot 0 1306, at which the PUSCH 1305 receives the PDCCH 1301. In an example 1300 of FIG. 13, the UE may obtain the DCI format 0_1 by monitoring the PDCCH 1311, and may obtain scheduling information and CSI request information on the PUSCH 1315 therefrom. The UE may obtain resource information on the CSI-RS 1312 to be measured from the received CSI request indicator. In the example 1310 of FIG. 13 illustrates an example in which the offset value for the aforementioned CSI-RS is set to X=1. In this case, the UE may receive the CSI-RS 1312 in the slot (corresponding to slot 0 1316 of FIG. 13) in which DCI format 0_1 triggering aperiodic CSI reporting is received, and may report the CSI information measured by the received CSI-RS to the base station through the PUSCH 1315.

The aperiodic CSI report may include at least one or both of CSI part 1 and CSI part 2, and when the aperiodic CSI report is transmitted through the PUSCH, the aperiodic CSI report may be multiplexed with the transport block. After the CRC is inserted into the input bit of the aperiodic CSI for multiplexing, the aperiodic CSI report may be mapped to the resource element in the PUSCH in a specific pattern and transmitted after encoding and rate matching. The CRC insertion may be omitted according to a coding method or the length of input bits. When multiplexing CSI Part 1 or CSI Part 2 included in the aperiodic CSI report, the number of modulation symbols calculated for rate matching may be calculated as illustrated in Table 50 below.

TABLE 50

For CSI part 1 transmission on PUSCH not using repetition type B with UL-S CH, the number of coded modulation symbols per layer for CSI part 1 transmission, denoted as $Q'_{CSI-part1}$, is determined as follows:

$$Q'_{CSI-1} = \min\left\{ \left\lceil \frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) \right\rceil - Q'_{ACK/CG-UCI} \right\}$$

. . .

For CSI part 1 transmission on an actual repetition of a PUSCH with repetition Type B with UL-SCH, the number of coded modulation symbols per layer f or CSI part 1 transmission, denoted as $Q'_{CSI-part1}$, is determined as follows:

$$Q'_{CSI-1} = \min\left\{ \left\lceil \frac{(O_{CSI-1} + L_{CSI-1}) \cdot \beta^{PUSCH}_{offset} \cdot \sum_{l=0}^{N^{PUSCH}_{symb,nominal}-1} M^{UCI}_{sc,nominal}(l)}{\sum_{r=0}^{C_{UL-SCH}-1} K_r} \right\rceil, \right.$$

TABLE 50-continued $$\left. \left[ \alpha \cdot \sum_{l=0}^{N_{symb,nominal}^{PUSCH}-1} M_{sc,nominal}^{UCI}(l) \right] - Q'_{ACK/CG-UCI}, \sum_{l=0}^{N_{symb,actual}^{PUSCH}-1} M_{sc,actual}^{UCI}(l) - Q'_{ACK/CG-UCI} \right\}$$

...

For CSI part 1 transmission on PUSCH without UL-SCH, the number of code d modulation symbols per layer for CSI part 1 transmission, denoted as $Q_{CSI-part1}'$, is determined as follows: if there is CSI part 2 to be transmitted on the PUSCH, $$Q'_{CSI-1} = \min\left\{ \left\lceil \frac{(O_{CSI-1} + L_{CSI-1}) \cdot \beta_{offset}^{PUSCH}}{R \cdot Q_m} \right\rceil, \sum_{l=0}^{N_{symb,all}^{PUSCH}-1} M_{sc}^{UCI}(l) - Q'_{ACK} \right\}$$

else $$Q'_{CSI-1} = \sum_{l=0}^{N_{symb,all}^{PUSCH}-1} M_{sc}^{UCI}(l) - Q'_{ACK}$$

end if

...

For CSI part 2 transmission on PUSCH not using repetition type B with UL-S CH, the number of coded modulation symbols per layer for CSI part 2 transmission, denoted as $Q_{CSI-part2}'$, is determined as follows:

$$Q'_{CSI-2} = \min\left\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left[ \alpha \cdot \sum_{l=0}^{N_{symb,all}^{PUSCH}-1} M_{sc}^{UCI}(l) \right] - Q'_{ACK/CG-UCI} - Q'_{CSI-1} \right\}$$

For CSI part 2 transmission on an actual repetition of a PUSCH with repetition Type B with UL-SCH, the number of coded modulation symbols per layer f or CSI part 2 transmission, denoted as $Q_{CSI-part2}'$, is determined as follows:

$$Q'_{CSI-2} =$$

$$\min\left\{ \left\lceil \frac{(O_{CSI-2} + L_{CSI-2}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \left[ \alpha \cdot \sum_{l=0}^{N_{symb,nominal}^{PUSCH}-1} M_{sc,nominal}^{UCI}(l) \right] - Q'_{ACK/CG-UCI} - Q'_{CSI-1}, \right.$$

$$\left. \sum_{l=0}^{N_{symb,actual}^{PUSCH}-1} M_{sc,actual}^{UCI}(l) - Q'_{ACK/CG-UCI} - Q'_{CSI-1} \right\}$$

TABLE 50-continued

...

For CSI part 2 transmission on PUSCH without UL-SCH, the number of code d modulation symbols per layer for CSI part 2 transmission, denoted as $Q'_{CSI\text{-}part2}$, is determined as follows:

$$Q'_{CSI-2} = \sum_{l=0}^{N^{PUSCH}_{symb,all}-1} M^{UCI}_{sc}(l) - Q'_{ACK} - Q'_{CSI-1}$$

In particular, in the case of repeated PUSCH transmission schemes A and B, the UE may transmit the aperiodic CSI report by multiplexing only the first repeated PUSCH transmission among the repeated PUSCH transmissions.

This is because the multiplexed aperiodic CSI report information is encoded in a polar code scheme, and in this case, in order to be multiplexed to several PUSCH repetitions, each PUSCH repetition may have the same frequency and time resource allocation, and in particular, in the case of PUSCH repetition type B, because each actual repetition may have a different OFDM symbol length, the aperiodic CSI report may be multiplexed and transmitted only for the first PUSCH repetition.

In addition, for PUSCH repeated transmission type B, when the UE schedules aperiodic CSI reporting without scheduling for a transport block or receives DCI for activating semi-persistent CSI reporting, even if the number of PUSCH repeated transmissions configured by upper layer signaling is greater than 1, the value of nominal repetition may be assumed to be 1. In addition, when the UE schedules or activates aperiodic or semi-persistent CSI reporting without scheduling for the transport block based on the PUSCH repeated transmission type B, the UE may expect that the first nominal repetition is equal to the first actual repetition. For PUSCH transmitted including semi-persistent CSI based on PUSCH repeated transmission type B without a schedule for DCI after semi-persistent CSI reporting is activated with DCI, if the first nominal repetition is different from the first actual repetition, the transmission for the first nominal repetition may be ignored.

[Related to UE Capability Report]

In LTE and NR, the UE may perform a procedure of reporting capability supported by the UE to the corresponding base station while being connected to the serving base station. In the description below, this is referred to as a UE capability report.

The base station may transmit a UE capability enquiry message requesting capability report to the UE in the connected state. The message may include a UE capability request for each radio access technology (RAT) type of the base station. The request for each RAT type may include supported frequency band combination information and the like. In addition, in the case of the UE capability enquiry message, UE capability for each RAT type may be requested through one RRC message container transmitted by the base station, or the base station may include a UE capability enquiry message including a UE capability request for each RAT type a plurality of times and deliver the UE capability enquiry message to the UE. That is, the UE capability enquiry may be repeated multiple times within one message, and the UE may configure a corresponding UE capability information message and report the corresponding UE capability information message a plurality of times. In the next generation mobile communication system, a UE capability request for NR, LTE, EN-DC (E-UTRA-NR dual connectivity), and MR-DC (Multi-RAT dual connectivity) may be requested. In addition, the UE capability enquiry message is generally transmitted initially after the UE is connected to the base station, but may be requested under any conditions when the base station is required.

In the above step, the UE receiving the UE capability report request from the base station may configure the UE capability according to the RAT type and band information requested from the base station. Below, methods of configuring UE capability by the UE in the NR system is summarized In one example, if the UE is provided with a list for the LTE and/or the NR band through the UE capability request from the base station, the UE may configure a band combination (BC) for EN-DC and NR stand-alone (SA). That is, based on the requested bands through the FreqBandList from the base station, the UE may configure a BC candidate list for EN-DC and NR SA. In addition, the priorities of the bands may have priorities in the order described in the FreqBandList.

In one example, if the base station requests UE capability report by setting the "eutra-nr-only" flag or "eutra" flag, the UE completely removes things about NR SA BCs from the candidate list of BCs configured above. This operation may occur only when an LTE base station (eNB) requests "eutra" capability.

In one example, thereafter, the UE may remove fallback BCs from the candidate list of BCs configured in the above step. The fallback BC refers to BC obtained by removing the band corresponding to at least one SCell from any BC, and may be omitted because BC before removing the band corresponding to at least one SCell may already cover the fallback BC. This step may also be applied to MR-DC, and LTE bands may also be applied. BCs remaining after this step are the final "candidate BC list."

In one example, the UE may select BCs to be reported by selecting BCs corresponding to the requested RAT type from the "final candidate BC list" above. In this step, the UE configures a supportedBandCombinationList in a fixed order. That is, the UE configures BC and UE capability to be reported according to the preset RAT-Type order (nr→eutra-nr→eutra). In addition, the UE configures a featureSetCombination for the configured supportedBandCombinationList, and configures a list of "candidate feature set combinations" from the candidate BC list from which the list for fallback BC (including the same or lower level capability) has been removed. The above "candidate feature set combination" may include both feature set combinations for NR and EUTRA-NR BC, and may be obtained from the feature set combination of UE-NR-Capabilities and UE-MRDC-Capabilities containers.

In one example, in addition, if the RAT Type requested is eutra-nr and affects, the featureSetCombinations may be included in two containers of UE-MRDC-Capabilities and UE-NR-Capabilities. However, the NR feature set may be included only in UE-NR-Capabilities.

After the UE capability is configured, the UE transmits a UE capability information message including the UE capability to the base station. The base station performs scheduling and transmission/reception management to the UE, based on the UE capability information received from the UE.

[Related to CA/DC]

Figure 18:
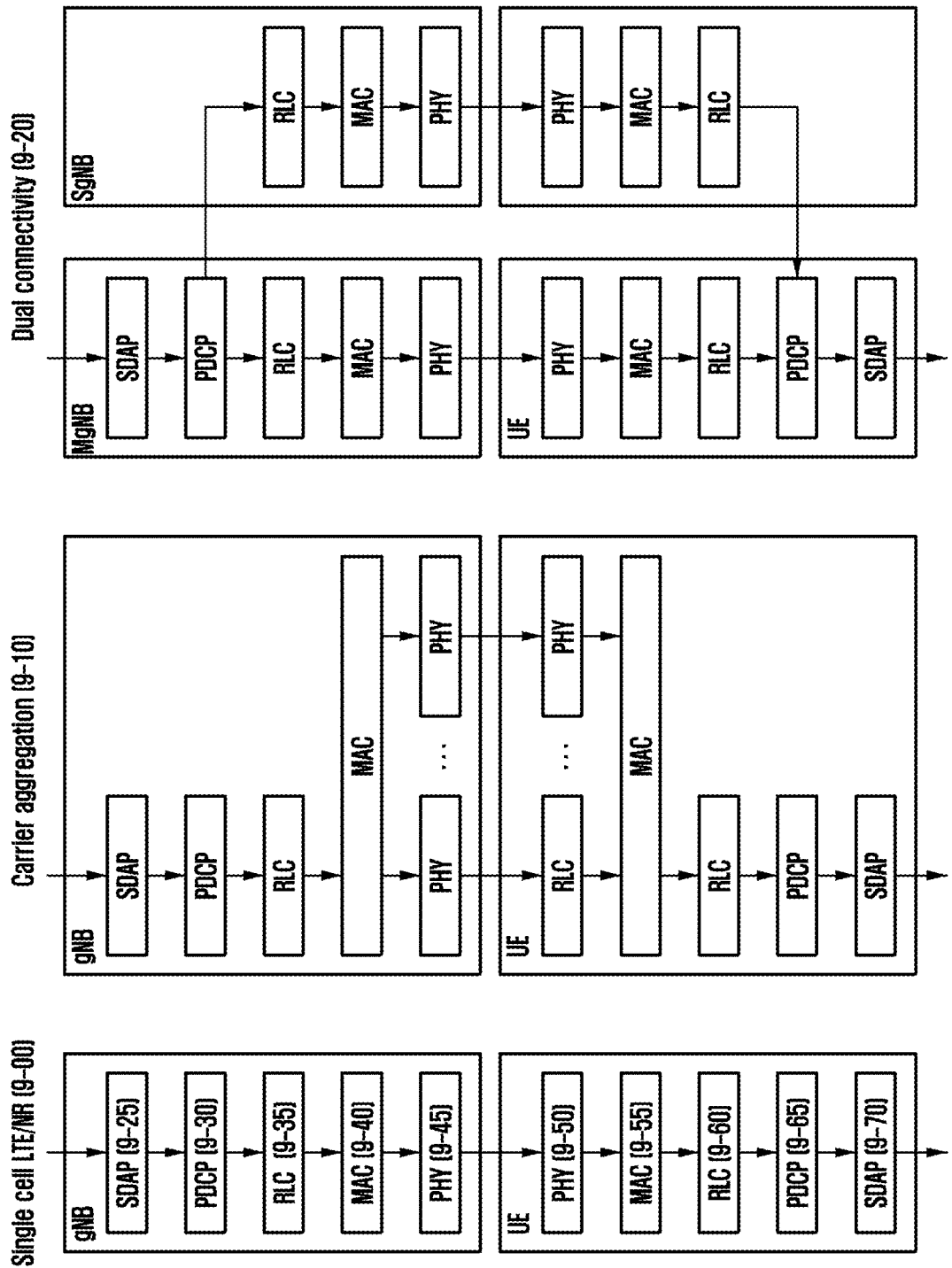
FIG. 18 is a diagram illustrating a radio protocol structure of a base station and a UE in a single cell, carrier aggregation, and dual connectivity situation in a wireless communication system according to an embodiment of the disclosure.

FIG. 18 is a diagram illustrating a radio protocol structure of a base station and a UE in a single cell, carrier aggregation, and dual connectivity situation according to an embodiment of the disclosure.

Referring to FIG. 18, the wireless protocols of the next-generation mobile communication system includes service data adaptation protocol (NR SDAP) S25 and S70, packet data convergence protocol (NR PDCP) S30 and S65, radio RLC link control (NR RLC) S35 and S60, and medium access control (NR MAC) S40 and S55 in the UE and the NR base station, respectively.

The main functions of the NR SDAPs S25 and S70 may include some of the following functions:

Transfer of user plane data;
Mapping between a QoS flow and a DRB for both DL and UL;
Marking QoS flow ID in both DL and UL packets; and
Reflective QoS flow to DRB mapping for the UL SDAP PDUs).

With respect to the SDAP layer device, as an RRC message, the UE may be configured whether to use the header of the SDAP layer device for each PDCP layer device, bearer, or logical channel, or whether to use the function of the SDAP layer device, for each bearer, or for each logical channel. When the SDAP header is configured, the base station may indicate the UE to update or reconfigure mapping information on uplink and downlink QoS flows and data bearers with NAS QoS reflection setting 1-bit indicator of SDAP header (NAS reflective QoS) and AS QoS reflection setting 1-bit indicator (AS reflective QoS). The SDAP header may include QoS flow ID information indicating QoS. The QoS information may be used as data processing priority and scheduling information to support a smooth service.

The main functions of the NR PDCPs S30 and S65 may include some of the following functions:

Header compression and decompression (ROHC only);
Transfer of user data;
In-sequence delivery of upper layer PDUs;
Out-of-sequence delivery of upper layer PDUs;
PDCP PDU reordering for reception;
Duplicate detection of lower layer SDUs;
Retransmission of PDCP SDUs;
Ciphering and deciphering; and
Timer-based SDU discard in uplink.

In the above, the reordering function of the NR PDCP refers to a function of reordering PDCP PDUs received from a lower layer in order based on a PDCP sequence number (SN) and may include a function of delivering data to an upper layer in the rearranged order. In addition, the reordering function of the NR PDCP may include a function of directly delivering without considering the order, may include a function of reordering the order to record lost PDCP PDUs, may include a function of reporting a status on the lost PDCP PDUs to the transmitting side, or may include a function of requesting retransmission for the lost PDCP PDUs.

The main functions of the NR RLCs S35, S60 may include some of the following functions:

Transfer of upper layer PDUs.
In-sequence delivery of upper layer PDUs.
Out-of-sequence delivery of upper layer PDUs.
Error Correction through ARQ.
Concatenation, segmentation and reassembly of RLC SDUs.
Re-segmentation of RLC data PDUs.
Reordering of RLC data PDUs.
Duplicate detection.
Protocol error detection.
RLC SDU discard; and
RLC re-establishment.

In the above, in-sequence delivery of the NR RLC device refers to a function of sequentially delivering RLC SDUs received from a lower layer to an upper layer, The in-sequence delivery of the NR RLC device may include a function of reassembling and delivering when originally one RLC SDU is divided into several RLC SDUs and received, may include a function of rearranging the received RLC PDUs based on an RLC sequence number (SN) or a PDCP sequence number (SN), may include a function of reordering the order to record lost RLC PDUs, may include a function of performing a status report on the lost RLC PDUs to the transmitting side, may include a function of requesting retransmission for lost RLC PDUs, The in-sequence delivery of the NR RLC device may include a function of sequentially delivering only RLC SDUs before loss of RLC SDU to a upper layer when there is a lost RLC SDU, or may include a function of sequentially delivering all RLC SDUs received before the timer starts to a upper layer if a predetermined timer expires even if there is a lost RLC SDU.

Alternatively, the in-sequence delivery of the NR RLC device may include a function of sequentially delivering all RLC SDUs received so far to an upper layer if a predetermined timer expires even if there is a lost RLC SDU. In addition, the RLC PDUs may be processed in the order in which the RLC PDUs are received (in the order of arrival, regardless of the sequence number and sequence number) and delivered to the PDCP device out-of-sequence (out-of-sequence delivery), and when the received RLC PDU is a segment, segments stored in the buffer or to be received may be received, reconstructed into one complete RLC PDU, processed, and delivered to the PDCP device. The NR RLC layer may not include a concatenation function, and the function may be performed in the NR MAC layer or replaced with a multiplexing function of the NR MAC layer.

In the above, out-of-sequence delivery of the NR RLC device refers to a function of directly delivering RLC SDUs received from a lower layer to an upper layer regardless of order, may include a function of reassembling and delivering when one RLC SDU is originally divided into several RLC SDUs and received, and may include a function of storing the RLC SN or PDCP SN of the received RLC PDUs, arranging the order, and recording the lost RLC PDUs.

The NR MACs S40 and S55 may be connected to several NR RLC layer configured in one UE, and the main function of the NR MAC may include some of the following functions:

Mapping between logical channels and transport channels;
Multiplexing/demultiplexing of MAC SDUs;
Scheduling information reporting function;
Error correction through HARQ;
Priority handling between logical channels of one UE;
Priority handling between UEs by means of dynamic scheduling;
MBMS service identification;
Transport format selection; and
Padding function.

The NR PHY layer S45 and S50 may perform of channel-coding and modulating the upper layer data, making OFDM symbols and transmitting them through a wireless channel, or demodulating an OFDM symbol received through a radio channel and channel-decoding to transmit the OFDM symbol to an upper layer.

The detailed structure of the radio protocol structure may be variously changed according to a carrier (or cell) operating method. For example, when the base station transmits data to the UE based on a single carrier (or cell), the base station and the UE use a protocol structure having a single structure for each layer, such as S00. On the other hand, when the base station transmits data to the UE based on carrier aggregation (CA) using multiple carriers in a single TRP, the base station and the UE have a single structure up to RLC as in S10, but use a protocol structure for multiplexing the PHY layer through the MAC layer. As another example, when the base station transmits data to the UE based on DC (dual connectivity) using multiple carriers in multiple TRPs, the base station and the UE have a single structure up to RLC like S20, but use a protocol structure for multiplexing the PHY layer through the MAC layer.

Referring to the descriptions related to PDCCH and beam configuration described above, it is difficult to achieve the required reliability in scenarios requiring high reliability, such as URLLC, because repeated PDCCH transmission is not currently supported in Rel-15 and Rel-16 NRs. The disclosure improves the PDCCH reception reliability of the UE by providing a PDCCH repeated transmission method through multiple transmission/reception points (TRP). The specific method is described in detail in the following embodiments.

Hereinafter, embodiments of the disclosure will be described in detail with reference to the accompanying drawings. The contents of the disclosure are applicable to FDD and TDD systems. Hereinafter, in the disclosure, upper signaling (or upper layer signaling) is a signal transmission method from the base station to the UE using the downlink data channel of the physical layer, or from the UE to the base station using the uplink data channel of the physical layer, and may be referred to as RRC signaling, PDCP signaling, or medium access control (MAC) control element (CE).

In the disclosure below, in determining whether to apply cooperative communication, the UE may use various methods, such as PDCCH (s) allocating PDSCH to which cooperative communication is applied has a specific format, the PDCCH(s) allocating the PDSCH to which the cooperative communication is applied includes a specific indicator indicating whether cooperative communication is applied, PDCCH(s) allocating PDSCH to which cooperative communication is applied is scrambled by a specific RNTI, or assuming that cooperative communication is applied in a specific section indicated by a upper layer. Hereinafter, for convenience of description, a case in which a UE receives a PDSCH to which cooperative communication is applied based on similar conditions will be referred to as a non-coherent joint transmission (NC-JT) case.

In the disclosure, determining the priority between A and B may variously refer to selecting the one having a higher priority according to a predetermined priority rule and performing the corresponding operation or omit or drop the operation with the lower priority, etc.

In the disclosure below, the above examples are described through a plurality of embodiments, but these are not independent, and it is possible that one or more embodiments may be applied simultaneously or in combination.

[Related to NC-JT]

According to an embodiment of the disclosure, non-coherent joint transmission (NC-JT) may be used for the UE to receive the PDSCH from a plurality of TRPs.

Unlike the existing system, 5G wireless communication system may support all of services requiring a high transmission rate, a service having a very short transmission delay, and a service requiring a high connection density. In a wireless communication network including a plurality of cells, transmission and reception points (TRPs), or beams, a coordinated transmission between each cell, TRP, and/or beam may satisfy various service requirements by increasing the strength of a signal received by the UE or efficiently performing interference control between each cell, TRP, and/or beam.

Joint transmission (JT) is a representative transmission technology for coordinated transmission described above and is a technology that increases the strength or throughput of a signal received by a UE by transmitting a signal to one UE through multiple different cells, TRPs, or/beams. In this case, the characteristics of each cell, TRP, and/or the channel between the beam and the UE may be significantly different, and in particular, in the case of each cell, TRP, and/or non-coherent joint transmission (NC-JT, non-coherent joint transmission) supporting non-coherent precoding between beams, individual precoding, MCS, resource allocation, TCI indication, etc. may be required depending on channel characteristics for each cell, TRP, or/and link between the beam and the UE.

The above-described NC-JT transmission may be applied to at least one of a physical downlink shared channel (PDSCH), a physical downlink control channel (PDCCH), a physical uplink shared channel (PUSCH), and a physical uplink control channel (PUCCH). When transmitting PDSCH, transmission information such as precoding, MCS, resource allocation, TCI, etc. is indicated as DL DCI, and for NC-JT transmission, the transmission information may be independently indicated for each cell, TRP, and/or beam. Such independent indication becomes a major factor in increasing the payload required for DL DCI transmission, which may adversely affect reception performance of PDCCH transmitting DCI. Therefore, it is necessary to carefully design a tradeoff between the amount of DCI information and the control information reception performance for JT of PDSCH support.

Figure 19:
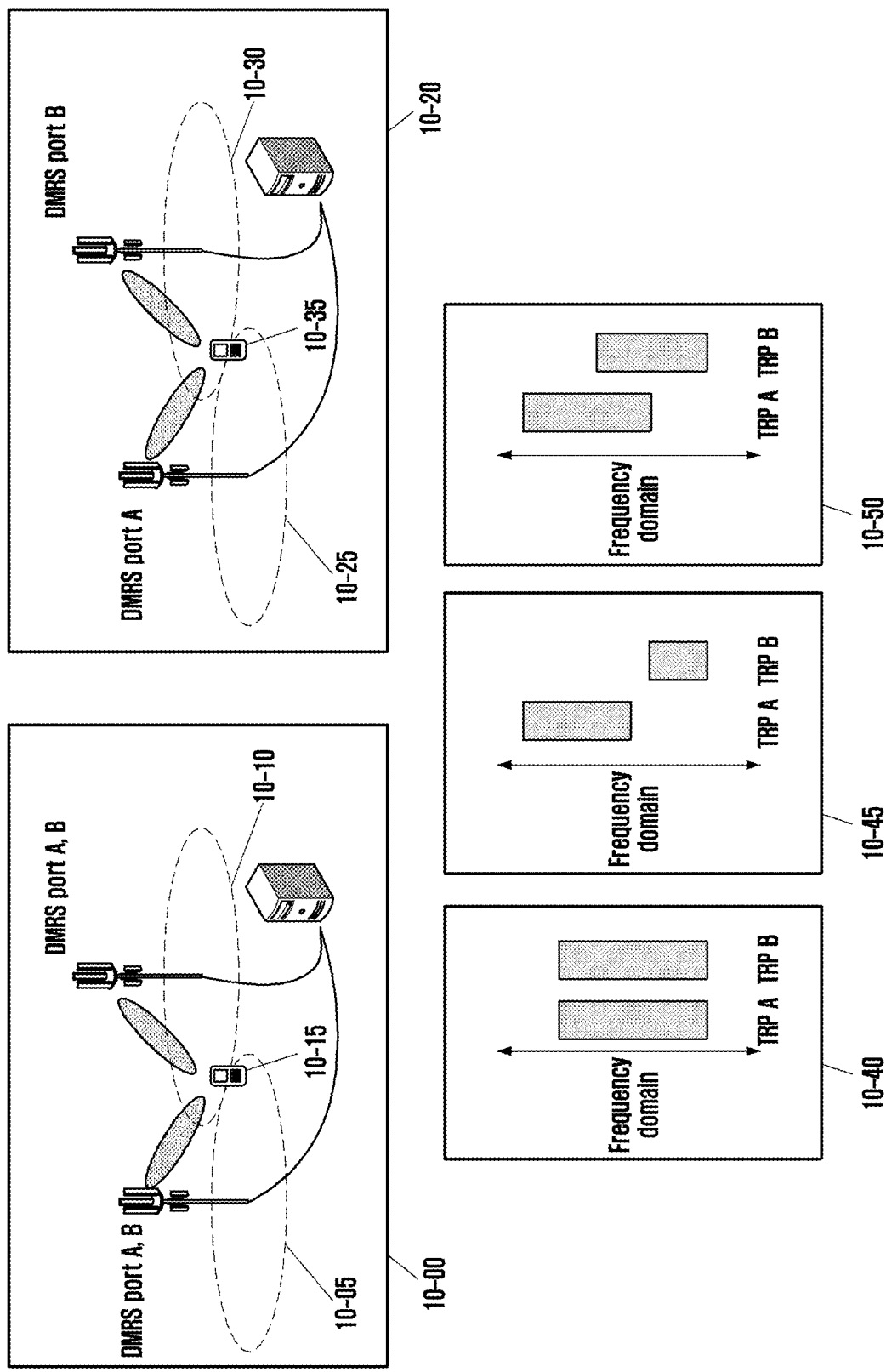
FIG. 19 is a diagram illustrating an example of an antenna port configuration and resource allocation for cooperative communication in a wireless communication system according to an embodiment of the disclosure.

FIG. 19 is a diagram illustrating an example of an antenna port configuration and resource allocation for transmitting a PDSCH using cooperative communication in a wireless communication system according to an embodiment of the disclosure.

Referring to FIG. 19, examples for PDSCH transmission are described for each technique of joint transmission (JT), and examples for allocating radio resources for each TRP are illustrated.

Referring to FIG. 19, an example 1900 of a coherent joint transmission (C-JT) supporting coherent precoding between each cell, TRP, and/or beam is illustrated.

In the case of C-JT, TRP A 1905 and TRP B 1910 transmit a single data (PDSCH) to the UE 1915, and joint precoding may be performed in a plurality of TRPs. This may refer to that the DMRS is transmitted through the same DMRS ports in order for the TRP A 1905 and the TRP B 1910 to transmit the same PDSCH. For example, each of TRP A 1905 and TRP B 1910 may transmit a DRMS to a UE through DMRS port A and DMRS B. In this case, the UE may receive one piece of DCI information on receiving one PDSCH demodulated based on DMRS transmitted through the DMRS port A and the DMRS B.

FIG. 19 illustrates an example 1920 of a non-coherent joint transmission (NC-JT) supporting non-coherent precoding between each cell, TRP and/or beam for PDSCH transmission In the case of NC-JT, a PDSCH is transmitted to the UE 1935 for each cell, TRP, and/or beam, and individual precoding may be applied to each PDSCH. Each cell, TRP and/or beam transmits a different PDSCH or a different PDSCH layer to the UE to improve the throughput compared to single cell, TRP, and/or beam transmission. In addition, each cell, TRP and/or beam repeatedly transmits the same PDSCH to the UE, and it is possible to improve reliability compared to single cell, TRP and/or beam transmission. For convenience of description, a cell, a TRP, and/or a beam is hereinafter collectively referred to as a TRP.

In this case, various radio resource allocation may be considered such as a case when all of the frequency and time resources used by a plurality of TRPs for PDSCH transmission are the same 1940, a case when the frequency and time resources used by multiple TRPs do not overlap 1945 at all, and a case when some of the frequency and time resources used by a plurality of TRPs overlap 1950.

Figure 20:
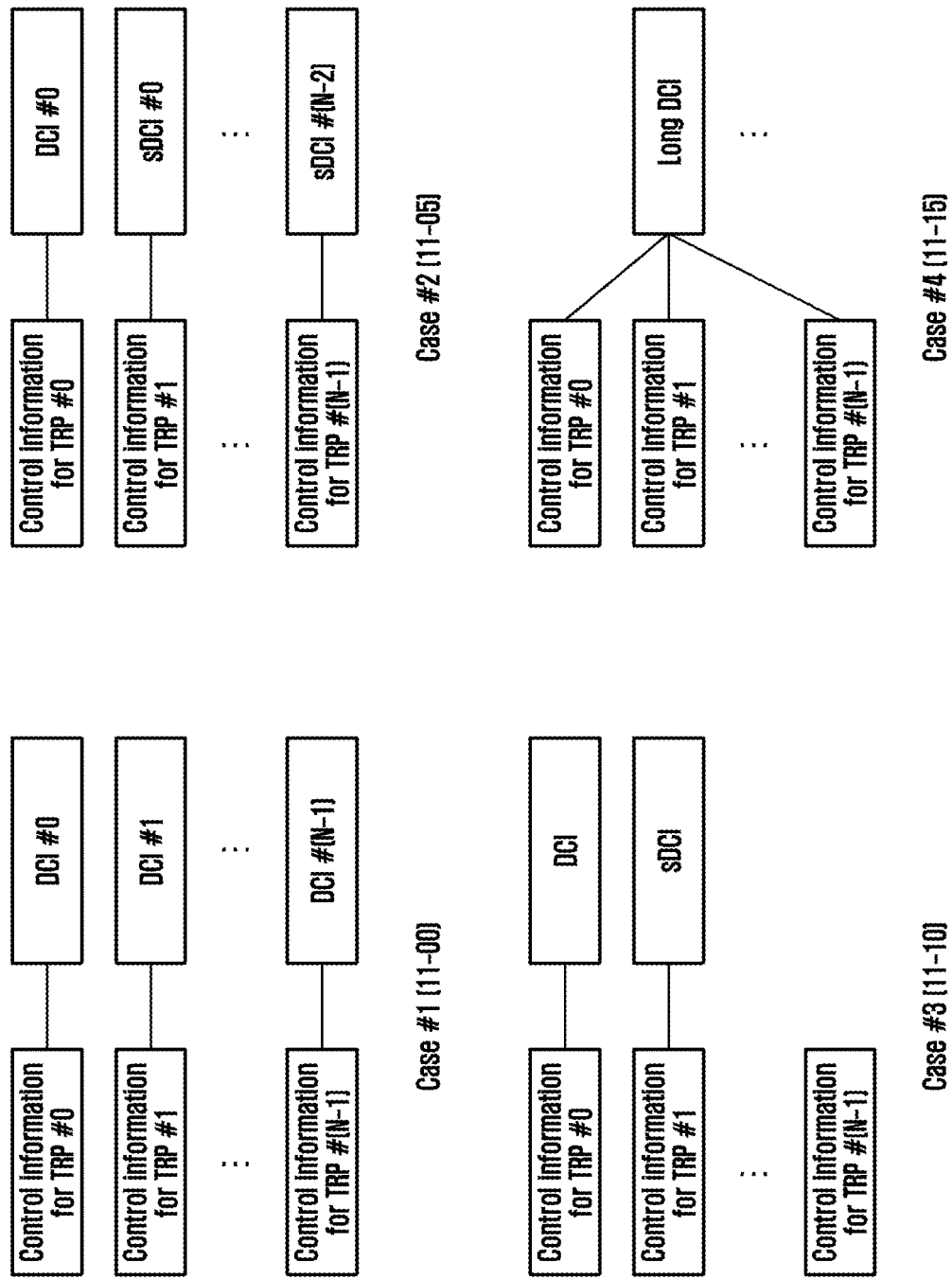
FIG. 20 is a diagram illustrating a configuration example of downlink control information (DCI) for cooperative communication in a wireless communication system according to an embodiment of the disclosure.

In order to simultaneously allocate a plurality of PDSCHs to one UE for NC-JT support, DCIs of various types, structures, and relationships may be considered FIG. 20 is a diagram illustrating an example of a configuration of downlink control information (DCI) for NC-JT in which each TRP transmits different PDSCH or different PDSCH layers to a UE in a wireless communication system according to an embodiment of the disclosure.

Referring to FIG. 20, in a situation where N−1 different PDSCHs are transmitted in N−1 additional TRPs (TRP #1 to TRP #(N−1)) in addition to the serving TRP (TRP #0) used for single PDSCH transmission, case #1 2000 is an example in which control information on PDSCH transmitted in N−1 additional TRPs is transmitted independently of control information on PDSCH transmitted in serving TRP. That is, the UE may obtain control information on PDSCHs transmitted in different TRPs (TRP #0 to TRP #(N−1)) through independent DCIs (DCI #0 to DCI #(N−1)). The format between the independent DCIs may be the same or different from each other, and the payload between DCIs may also be the same or different from each other. In case #1 described above, each PDSCH control or allocation degree of freedom may be completely guaranteed, but when each DCI is transmitted in different TRPs, a coverage difference for each DCI may occur and reception performance may deteriorate.

In a situation where N−1 different PDSCHs are transmitted in N−1 additional TRPs (TRP #1 to TRP #(N−1)) in addition to the serving TRP (TRP #0) used for single PDSCH transmission, case #2 2005 illustrates an example in which control information (DCI) for PDSCH of (N−1) additional TRPs is transmitted, and each of these DCIs is dependent on control information on PDSCH transmitted from a serving TRP.

For example, in the case of DCI #0, which is control information on PDSCH transmitted in the serving TRP (TRP #0), all information elements of DCI format 1_0, DCI format 1_1, and DCI format 1_2 are included, but in the case of shortened DCIs (hereinafter sDCI) (sDCI #0 to sDCI #(N−2)), which are control information on PDSCHs transmitted in the cooperative TRP (TRP #1 to TRP #(N−1)), only some of the information elements of DCI format 1_0, DCI format 1_1, and DCI format 1_2 may be included. Therefore, in the case of sDCI transmitting control information on PDSCHs transmitted in the cooperative TRP, because the payload is smaller than normal DCI (nDCI) transmitting PDSCH-related control information transmitted from the serving TRP, it is possible to include reserved bits compared to nDCI.

In case #2 described above, each PDSCH control or allocation degree of freedom may be limited according to the content of information elements included in sDCI, but because the reception performance of sDCI is superior to that of nDCI, the probability of a difference in coverage for each DCI may be lowered.

In a situation where N−1 different PDSCHs are transmitted in N−1 additional TRPs (TRP #1 to TRP #(N−1)) in addition to the serving TRP (TRP #0) used for single PDSCH transmission, case #3 2010 illustrates an example in which one control information on PDSCH of N−1 additional TRPs is transmitted, and this DCI is dependent on control information on PDSCH transmitted from a serving TRP.

For example, in the case of DCI #0, which is control information on PDSCH transmitted in the serving TRP (TRP #0), all information elements of DCI format 1_0, DCI format 1_1, and DCI format 1_2 are included, and in the case of the control information on PDSCHs transmitted in the cooperative TRP (TRP #1 to TRP #(N−1)), only some of the information elements of DCI format 1_0, DCI format 1_1, and DCI format 1_2 may be collected and transmitted in one "secondary" DCI (sDCI). For example, the sDCI may include at least one of HARQ-related information such as frequency domain resource assignment of cooperative TRPs, time domain resource assignment, and MCS. In addition, in the case of information not included in the sDCI, such as a bandwidth part (BWP) indicator or a carrier indicator, DCI (DCI #0, normal DCI, and nDCI) of the serving TRP may be followed.

In case #3 2010, each PDSCH control or allocation degree of freedom may be limited according to the contents of the information element included in sDCI, but sDCI reception performance may be adjusted and the complexity of DCI blind decoding of the UE may be reduced compared to case #1 2000 or case #2 2005.

In a situation where N−1 different PDSCHs are transmitted in N−1 additional TRPs (TRP #1 to TRP #(N−1)) in addition to the serving TRP (TRP #0) used for single PDSCH transmission, case #4 2015 is an example in which control information on PDSCH transmitted in N−1 additional TRPs is transmitted from the same DCI (long DCI, lDCI) as control information on PDSCH transmitted in serving TRP. That is, the UE may obtain control information on PDSCHs transmitted in different TRPs (TRP #0 to TRP #(N−1)) through a single DCI. In case #4 2015, the complexity of DCI blind decoding of the UE may not increase, but the PDSCH control (allocation) degree of freedom may be low, such as the number of cooperative TRPs being limited according to long DCI payload restrictions.

In the following description and embodiments, sDCI may refer to various auxiliary DCIs such as shortened DCI, secondary DCI, or normal DCI (the aforementioned DCI format 1_0 to 1_1) including PDSCH control information transmitted in cooperative TRP, and if no special restrictions are specified, the description is similarly applicable to various auxiliary DCIs.

In the following description and embodiments, the above-described case #1 2000, case #2 2005, and case #3 2010 in which one or more DCIs (PDCCH) are used to support NC-JT may be distinguished as multiple PDCCH-based NC-JTs, and the above-described case #4 2015 in which a single DCI (PDCCH) is used for NC-JT support may be distinguished as a single PDCCH-based NC-JT. In multiple PDCCH-based PDSCH transmission, the CORESET in which the DCI of the serving TRP (TRP #0) is scheduled and the CORESET in which the DCI of the cooperative TRPs (TRP #1 to TRP #(N−1)) are scheduled may be distinguished. As a method for distinguishing CORESETs, there may be a distinguishing method through an upper layer indicator for each CORESET, a distinguishing method through a beam configuration for each CORESET, and the like. In addition, in a single PDCCH-based NC-JT, a single DCI schedules a single PDSCH having a plurality of layers instead of scheduling a plurality of PDSCHs, and the plurality of layers described above may be transmitted from a plurality of TRPs. In this case, the connection relationship between the layer and the TRP transmitting the layer may be indicated through transmission configuration indicator (TCI) indication for the layer.

In embodiments of the disclosure, "cooperative TRP" may be replaced with various terms such as "cooperative panel" or "cooperative beam" when actually applied.

In the embodiments of the disclosure, "when NC-JT is applied" may be interpreted variously according to the situation, such as "when a UE receives one or more PDSCHs at the same time in one BWP," "when a UE receives the PDSCH based on two or more transmission configuration indicator (TCI) indications at the same time in one BWP," "when the PDSCH received by the UE is associated with one or more DMRS port groups," etc., but for convenience of explanation, one expression has been used.

In the disclosure, the radio protocol structure for NC-JT may be used in various ways according to TRP deployment scenarios. As an example, if there is no or small backhaul delay between cooperative TRPs, it is possible to use a structure based on MAC layer multiplexing similar to S10 of FIG. 18 (CA-like method). On the other hand, when the backhaul delay between cooperative TRPs is so large that it may not be ignored (for example, when information exchange of CSI, scheduling, HARQ-ACK, etc. between cooperative TRPs requires more than 2 ms), it is possible to secure a characteristic strong against delay by using an independent structure for each TRP from the RLC layer, similar to S20 of FIG. 18 (DC-like method).

The UE supporting C-JT/NC-JT may receive C-JT/NC-JT related parameters or setting values from the upper layer configuration, and set RRC parameters of the UE based on the received parameters. In order to configure the upper layer, the UE may utilize UE capability parameters, for example, tci-StatePDSCH. Here, UE capability parameter, for example, tci-StatePDSCH may define TCI states for the purpose of PDSCH transmission, and the number of TCI states may be set to 4, 8, 16, 32, 64, and 128 in FR1, and 64 and 128 in FR2, and among the set numbers, a maximum of eight states that may be indicated by 3 bits of the TCI field of DCI may be set through the MAC CE message. The maximum value 128 refers to a value indicated by the maxNumberConfirmedTCIstatesPerCC in the tci-StatePDSCH parameter included in the capability signaling of the UE. In this way, a series of configuration procedures from upper layer configuration to MAC CE configuration may be applied to a beamforming indication or a beamforming change command for at least one PDSCH in one TRP.

[Multi-DCI Based Multi-TRP]

According to an embodiment of the disclosure, a downlink control channel for NC-JT transmission may be configured based on the Multi-PDCCH.

In the NC-JT based on the Multiple PDCCH, when transmitting DCI for the PDSCH schedule of each TRP, it may have a CORESET or search space divided for each TRP. The CORESET or search space for each TRP may be configured as in at least one of the following cases.

In one example, upper layer index configuration for each CORESET: The CORESET configuration information configured by the upper layer may include an index value, and the TRP transmitting the PDCCH in the corresponding CORESET may be distinguished by set index value for each CORESET. That is, in a set of CORESETs having the same upper layer index value, it may be considered that the same TRP transmits a PDCCH or that a PDCCH scheduling a PDSCH of the same TRP is transmitted. The above-described index for each CORESET may be named as CORESETPoolIndex, and it may be considered that the PDCCH is transmitted from the same TRP for CORESETs in which the same CORESETPoolIndex value is set. In the case of CORESET in which the CORESETPoolIndex value is not set, it may be considered that the default value of CORESETPoolIndex has been set, and the above-described default value may be 0.

In one example, multiple PDCCH-Config configurations: Multiple PDCCH-Configs in one BWP are configured, and each PDCCH-Config may include PDCCH configuration for each TRP. That is, a list of CORESETs per TRP and/or a list of search spaces per TRP may be configured in one PDCCH-Config, and one or more CORESETs and one or more search spaces included in one PDCCH-Config may be considered to correspond to a specific TRP.

In one example, CORESET beam/beam group configuration: TRP corresponding to the corresponding CORESET may be distinguished through a beam or beam group configured for each CORESET. For example, when the same TCI state is configured in multiple CORESETs, the CORESETs may be considered to be transmitted through the same TRP, or it may be considered that the PDCCH scheduling the PDSCH of the same TRP is transmitted from the corresponding CORESETs.

In one example, search space beam/beam group configuration: A beam or beam group is configured for each search space, and through this, TRP for each search space may be distinguished. For example, when the same beam/beam group or TCI state is configured in multiple search spaces, in the corresponding search space, it may be considered that the same TRP transmits the PDCCH or that the PDCCH scheduling the PDSCH of the same TRP is transmitted in the corresponding search space.

As described above, by distinguishing the CORESET or search space for each TRP, it is possible to classify the PDSCH and HARQ-ACK information on each TRP, and through this, it is possible to generate an independent HARQ-ACK codebook for each TRP and use an independent PUCCH resource.

The setting may be independent for each cell or for each BWP. For example, while two different CORESETPoolIndex values are set in the PCell, the CORESETPoolIndex value may not be set in a specific SCell. In this case, it may be considered that NC-JT transmission is configured in the PCell, whereas NC-JT transmission is not configured in the SCell in which the CORESETPoolIndex value is not set.

[Single-DCI Based Multi-TRP]

According to another embodiment of the disclosure, a downlink beam for NC-JT transmission may be configured based on Single-PDCCH.

In Single PDCCH-based NC-JT, PDSCH transmitted by multiple TRPs may be scheduled with one DCI. In this case, the number of TCI states may be used as a method of indicating the number of TRPs transmitting the corresponding PDSCH. That is, if the number of TCI states indicated by the DCI scheduling the PDSCH is 2, it may be regarded as a single PDCCH-based NC-JT transmission, and if the number of TCI states is 1, it may be regarded as a single-TRP transmission. The TCI states indicated by the DCI may correspond to one or two TCI states among TCI states activated by MAC-CE. When the TCI states of DCI correspond to two TCI states activated by MAC-CE, a correspondence relationship between the TCI codepoint indicated by DCI and the TCI states activated by MAC-CE may be established, and may be the time when there are two TCI states activated by MAC-CE corresponding to the TCI codepoint.

The above configuration may be independent for each cell or for each BWP. For example, a PCell may have a maximum of two activated TCI states corresponding to one TCI codepoint, whereas a specific SCell may have a maximum of one activated TCI state corresponding to one TCI codepoint. In this case, it may be considered that NC-JT transmission is configured in the PCell, whereas NC-JT transmission is not configured in the SCell described above.

Introduction of the Embodiment

Referring to the descriptions related to the PDCCH transmission/reception configuration and transmission beam configuration described above, in the current Rel-15/16 NR, within a specific PDCCH monitoring period, for a plurality of control resource sets that may be configured for a single or multiple cells, only other control resource sets having the same QCL-TypeD characteristics as the control resource set determined by the above-mentioned rule may be received. That is, it was possible to receive a plurality of control resource sets overlapping in time within a specific PDCCH monitoring period using only one QCL-TypeD.

Meanwhile, in Rel-17 FeMIMO, standardization of a method of improving PDCCH reception reliability through repeated PDCCH transmission is in progress. As a method of PDCCH repeated transmission, there may be a method of repeatedly transmitting control resource sets connected to each of a plurality of search spaces explicitly connected by upper layer signaling by separating time or frequency resources through different TRPs, and a method of repeatedly transmitting in the SFN method by configuring a plurality of TCI states in one control resource set.

In this way, in the case of PDCCH repeated transmission, because repeated transmission is performed using multiple QCL-TypeD from multiple TRPs within a specific time, in order to enable reception in this regard, the restriction of receiving a plurality of control resource sets overlapping in a specific time with only one QCL-TypeD characteristic at present may be relaxed. The disclosure provides a method for determining priorities for receiving a control resource set when repeated PDCCH transmission is performed in consideration of multiple TRPs, so that the UE may receive repeated PDCCH transmissions. The specific method will be described in detail in the following embodiments.

For convenience in the following description of the disclosure, upper layer/L1 parameters such as TCI state or spatial relation information, or a cell that may be classified through indicators such as cell ID, TRP ID, panel ID, etc., a transmission point, a panel, a beam, and/or a transmission direction are unified and described as a transmission reception point (TRP). Therefore, when applied in practice, TRP may be appropriately replaced with one of the above terms.

Hereinafter, in the disclosure, the UE may use various methods in determining whether to apply cooperative communication such as the PDCCH(s) allocating the PDSCH to which the cooperative communication is applied have a specific format, the PDCCH(s) allocating the PDSCH to which the cooperative communication is applied may include a specific indicator indicating whether the cooperative communication is applied, PDCCH(s) allocating PDSCH to which cooperative communication is applied are scrambled to a specific RNTI, or it is assumed that cooperative communication is applied in a specific section indicated by an upper layer. Hereinafter, for convenience of description, the UE receiving the PDSCH to which cooperative communication is applied based on conditions similar to the above may be referred to as NC-JT case.

Hereinafter, embodiments of the disclosure will be described in conjunction with the accompanying drawings. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the following description, embodiments of the disclosure will be described in connection with 5G systems by way of example, but the embodiments of the disclosure may also be applied to other communication systems having similar technical backgrounds or channel types. Examples of such communication systems may include LTE or LTE-A mobile communication systems and mobile communication technologies developed beyond 5G. Therefore, based on determinations by those skilled in the art, the embodiments of the disclosure may also be applied to other communication systems through some modifications without significantly departing from the scope of the disclosure.

Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, in describing the disclosure, the upper layer signaling may be signaling corresponding to at least one or a combination of one or more of the following signaling:
 MIB (master information block).
 SIB (system information block) or SIB X (X=1, 2, . . . ).
 RRC (radio resource control); and
 MAC (medium access control) CE (control element).

In addition, the L1 signaling may be signaling corresponding to at least one or a combination of signaling methods using a physical layer channel or signaling method below:
 PDCCH (physical downlink control channel);
 DCI (downlink control information);
 UE-specific DCI;
 Group common DCI;
 Common DCI;
 Scheduling DCI (e.g., DCI used for scheduling downlink or uplink data);
 Non-scheduling DCI (e.g., DCI not for the purpose of scheduling downlink or uplink data).
 PUCCH (physical uplink control channel); and
 UCI (uplink control information).

Hereinafter, in the disclosure, determining the priority between A and B may be mentioned in various ways such as selecting the one having a higher priority according to a predetermined priority rule and performing the corresponding operation or omit or drop the operation with the lower priority, etc.

Hereinafter, in the disclosure, the above examples are described through a plurality of embodiments, but these are not independent, and it is possible that one or more embodiments may be applied simultaneously or in combination.

First Embodiment: Multiple TRP-Based PDCCH Repeated Transmission Method

As an embodiment of the present disclosure, a PDCCH repeated transmission method considering multiple TRPs will be described. The PDCCH repeated transmission considering multiple TRPs may have various methods depending on how each TCI state to be applied when transmitting PDCCH in each TRP is applied to the above-described various parameters used for PDCCH transmission. For example, various parameters used for PDCCH transmission to which different TCI states are applied may include a CCE, a PDCCH candidate group, a control resource set, a search space, and the like. In case of repeated PDCCH transmission considering multiple TRPs, a soft combining scheme, a selection scheme, and the like may be considered as a reception method of the UE.

The following five methods may exist for PDCCH repeated transmission through multiple TRPs, and for the at least one of the five methods, the base station may configure the UE through upper layer signaling, or indicate the UE through L1 signaling, or configure and indicate the UE through combination of upper layer signaling and L1 signaling.

[Method 1-1] Repeated Transmission Method of a Plurality of PDCCHs Having the Same Payload Method 1-1 is a method of repeatedly transmitting a plurality of pieces of control information having the same DCI format and payload. Each of the above-described control information may indicate information on scheduling repeatedly transmitted PDSCHs, for example, repeatedly transmitted {PDSCH #1, PDSCH #2, ..., PDSCH #Y} over a plurality of slots. The fact that the payload of each of the repeatedly transmitted control information is the same may be expressed as that PDSCH scheduling information, for example, the number of repeated PDSCH transmissions, the time axis PDSCH resource allocation information, i.e., the slot offset K_0 between the control information and PDSCH #1 and the number of PDSCH symbols, etc., frequency axis PDSCH resource allocation information, DMRS port allocation information, PDSCH-to-HARQ-ACK timing, PUCCH resource indicator, etc. of each of the control information are the same. The UE may improve reception reliability of the control information by soft-combining repeated transmission control information having the same payload.

For the soft combine, the UE needs to know in advance the resource location and the number of repeated transmissions of the control information to be repeatedly transmitted. To this end, the base station may instruct in advance the configuration of time domain, frequency domain, and spatial domain resources of the above-described repeated transmission control information. When control information is repeatedly transmitted on the time axis, control information may be repeatedly transmitted over different CORESETs, repeatedly transmitted over different search space sets within one CORESET, or may be repeatedly transmitted over different PDCCH monitoring occasions within one CORESET and one search space set. A unit (CORESET unit, search space set unit, and PDCCH monitoring occasion unit) of a repeatedly transmitted resource and a location (PDCCH candidate index, etc.) of a repeatedly transmitted resource on the time axis may be indicated through an upper layer configuration of the base station, etc. In this case, the number of PDCCH repeated transmissions and/or the list and transmission pattern of the TRP participating in the repeated transmission may be explicitly indicated, and upper layer indication or MAC-CE/L1 signaling may be used as an explicit indication method. In this case, the list of TRPs may be indicated in the form of TCI state or QCL acceptance described above.

When control information is repeatedly transmitted on the frequency axis, control information may be repeatedly transmitted over different CORESETs, repeatedly transmitted over different PDCCH candidates within one CORESET, or repeatedly transmitted for each CCE. The unit of the resource repeatedly transmitted on the frequency axis and the location of the repeated transmission resource may be indicated through upper layer configuration of the base station, etc. In addition, the number of repeated transmissions and/or the list and transmission pattern of TRPs participating in repeated transmission may be explicitly indicated, and an upper layer indication or MAC-CE/L1 signaling may be used as an explicit indication method. In this case, the list of TRPs may be indicated in the form of TCI state or QCL acceptance described above.

When control information is repeatedly transmitted in the spatial axis, control information may be repeatedly transmitted over different CORESETs, or two or more TCI states may be configured in one CORESET to be transmitted repeatedly.

[Method 1-2] a Method of Repeatedly Transmitting Multiple Pieces of Control Information that May have Different DCI Format and/or Payload.

The method 1-2 is a method of repeatedly transmitting multiple pieces of control information that may have different DCI format and/or payload. The control information schedules the repeatedly transmitted PDSCH, and the number of PDSCH repeated transmissions indicated by each control information may be different from each other. For example, PDCCH #1 may indicate information or scheduling {PDSCH #1, PDSCH #2, ..., PDSCH #Y}, while PDCCH #2 may indicate information on scheduling {PDSCH #2, ..., PDSCH #Y}, and PDCCH #X may indicate information on scheduling {PDSCH #Y}. This method of repeatedly transmitting control information has an advantage in that it is possible to reduce the total delay time required for repeated transmission of control information and PDSCH compared to method 1-1. On the other hand, in this method, because the payload of each repeatedly transmitted control information may be different from each other, soft combining of the repeatedly transmitted control information is impossible, and thus reliability may be lower than that of the method 1-1.

In the method 1-2, the UE may not need to know in advance the resource location of the control information to be repeatedly transmitted and the number of repeated transmissions, and the UE may independently decode and process each of the repeatedly transmitted control information. If the UE decodes a plurality of repeated transmission control information scheduling the same PDSCH, only the first repeated transmission control information may be processed and the second and subsequent repeated transmission control information may be ignored. Alternatively, the resource location of control information to be repeatedly transmitted and the number of repeated transmissions may be indicated in advance, and the indication method may be the same as the method described in the method 1 above.

[Method 1-3] a Method of Repeatedly Transmitting Each of Multiple Pieces of Control Information that May have Different DCI Format and/or Payload.

The method 1-3 is a method of repeatedly transmitting each of multiple pieces of control information that may have different DCI format and/or payload. In this case, each control information repeatedly transmitted has the same DCI format and payload. Because it is impossible to soft combine multiple pieces of control information in the method 1-2, reliability may be lower than that of the method 1-1, and in the method 1-1, the total delay time required for repeated transmission of control information and PDSCH may be increased. The method 1-3 is a method using the advantages of the method 1-1 and the method 1-2, and may transmit control information with upper reliability than the method 1-2 while reducing the total delay time required for repeated transmission of control information and PDSCH compared to the method 1-1.

In the method 1-3, the soft combine of the method 1-1 and the individual decoding of the method 1-2 may be used to decode and soft combine the repeatedly transmitted control information. For example, the first transmitted control information among repeated transmissions for multiple pieces of control information that may have different DCI formats and/or payloads may be decoded as illustrated in the method 1-2, and repeated transmission for the decoded control information may be soft combined as illustrated in the method 1-1.

Meanwhile, the base station may select and configure one of the above-described methods 1-1, 1-2, or 1-3 for repeated control information transmission. The control information repeated transmission method may be explicitly indicated by the base station to the UE through upper layer signaling. Alternatively, the control information repeated transmission method may be indicated in combination with other configuration information. For example, the upper layer configuration indicating the PDSCH repeated transmission method may be combined with the repeated control information transmission indication. When the PDSCH is indicated to be repeatedly transmitted by the FDM method, it may be interpreted that the control information is repeatedly transmitted only by the method 1-1, because the PDSCH repeated transmission of the FDM method has no effect of reducing the delay time by the method 1-2. For similar reasons, when the PDSCH is indicated to be repeatedly transmitted in an intra-slot TDM method, it may be interpreted that the control information is repeatedly transmitted by the method 1-1. On the other hand, when the PDSCH is indicated to be repeatedly transmitted in an inter-slot TDM method, the above-described methods 1-1, 1-2, or 1-3 for control information repeated transmission may be selected through upper layer signaling or L1 signaling.

On the other hand, the base station may explicitly indicate the control information repeated transmission unit to the UE through the configuration of the upper layer or the like. Alternatively, the control information repeated transmission unit may be indicated in combination with other configuration information. For example, an upper layer configuration indicating a PDSCH repeated transmission method may be combined with the control information repeated transmission unit. When the PDSCH is indicated to be repeatedly transmitted by the FDM method, it may be interpreted that the control information is repeatedly transmitted to FDM or SDM because there is no effect of reducing the delay time due to the repeated transmission of the PDSCH of the FDM method if control information is repeatedly transmitted, such as in the inter-slot TDM method. For similar reasons, when the PDSCH is indicated to be repeatedly transmitted in an intra-slot TDM method, it may be interpreted that the control information is repeatedly transmitted by the TDM, FDM, or SDM in the slot. On the other hand, when the PDSCH is indicated to be repeatedly transmitted in an inter-slot TDM method, it may be selected by upper layer signaling, etc. so that control information may be repeatedly transmitted through multiple inter-slot TDM, intra-slot TDM, FDM, or SDM.

[Method 1-4] PDCCH Transmission Method that Applies TCI State to Different CCEs within the Same PDCCH Candidate Group.

The methods 1-4 may apply different TCI states meaning transmission from multiple TRPs to different CCEs within the PDCCH candidate group to improve PDCCH reception performance without PDCCH repeated transmission. Although this method is not repeated transmission of PDCCH, it may be a method of obtaining spatial diversity in the PDCCH candidate group because different CCEs in the PDCCH candidate group are transmitted by applying different TCI states to each TRP. Different CCEs to which different TCI states are applied may be separated into time or frequency dimension, and the UE needs to know in advance the location of resources to which different TCI states are applied. The UE may receive different CCEs to which different TCI states are applied within the same PDCCH candidate group and independently decode or decode at once.

[Method 1-5] PDCCH Transmission Method (SFN Method) that Applies Multiple TCI States to all CCEs within the Same PDCCH Candidate Group.

The methods 1-5 may apply multiple TCI states to all CCEs in the PDCCH candidate group to improve PDCCH reception performance without PDCCH repeated transmission and transmit all CCEs by the SFN method. The corresponding method is not a PDCCH repeated transmission, but may be a method of obtaining spatial diversity through SFN transmission at the same CCE location in the PDCCH candidate group. The UE may receive CCEs of the same location to which different TCI states are applied within the same PDCCH candidate group and independently decode or decode at once using some or all of a plurality of TCI states.

2nd Embodiment: Report Soft Combining-Related UE Capabilities when PDCCH Repeated Transmission The UE may report soft combining-related UE capability when repeatedly transmitting PDCCH to the base station, and there may be several methods for this. Specific methods may be as follows.

[UE capability reporting method 1] The UE may report in the form of possible or impossible only on whether soft combining is possible during repeated PDCCH transmission to the base station.

As an example, if the UE reports information that soft combining is possible during repeated PDCCH transmission to the base station as the UE capability, the base station may determine (for example, the UE determines that soft combining is possible at the LLR level) whether the soft combining of the UE is possible to the most flexible degree, and may notify the UE of the PDCCH repeated transmission-related configuration as flexibly as possible when configuring the PDCCH transmission-related configuration. In this case, as an example related to repeated PDCCH configuration, the base station may notify the UE of the corresponding configuration assuming that the UE may perform soft combining between control resource sets or search spaces with different configurations, soft combining between PDCCH candidates within the same aggregation level, or soft combining between PDCCH candidates between different aggregation levels.

As another example, if the UE reports information that soft combining is possible during repeated PDCCH transmission to the base station as the UE capability, the base station may most conservatively determine (for example, the UE determines that soft combining is possible at the OFDM symbol level) the level of soft combining available to the UE and notify the UE of the PDCCH repeated transmission-related configuration most restrictively when configuring the PDCCH transmission-related configuration. In this case, as an example related to repeated PDCCH configuration, the base station may notify the UE of the corresponding configuration assuming that the UE may perform soft combining between a plurality of control resource sets having the same configuration or soft combining between PDCCH candidates between the same aggregation level.

[UE capability reporting method 2] In order to express in more detail the operation of soft combining available in the UE as a UE capability compared to the above-described UE capability reporting method 1, the UE may divide the level of the availability of soft combining and report to the base station as UE capability when PDCCH repeated transmission is performed. That is, among each signal level generated from the reception operation processes of the UE, the UE may identify the signal level to which soft combining may be applied for repeated PDCCH transmission, and may report such information to the base station as a UE capability. For example, the UE may inform that soft combining is available at the OFDM symbol level as a signal level to which soft combining may be applied, soft combining is available at the modulation symbol level, and soft combining is available at LLR level. According to each signal level reported by the UE, the base station may notify an appropriate configuration so that the UE may perform soft combining according to the reported UE capability.

[UE capability reporting method 3] The UE may transmit to the base station the restrictions necessary for soft combining at the UE side when repeatedly transmitting the PDCCH as the UE capability. As an example, the UE may report to the base station that the configuration of each control resource set including two repeated PDCCHs may be the same. As another example, the UE may report to the base station that the two repeated PDCCH candidates may have at least the same aggregation level.

[UE capability reporting method 4] When receiving PDCCH repetitive transmission from the base station, the UE may report which PDCCH repeated transmission method is supported through the UE capability. For example, the UE may report to the base station about supporting the method 1-5 (SFN transmission method). As another example, the UE may report to the base station about supporting the intra-slot TDM, inter-slot TDM, or FDM scheme among the method 1-1 (multiple PDCCH repeated transmission method with the same payload). In particular, in the case of TDM, the UE may report the maximum value of the time interval between two repeated PDCCHs to the base station. As an example, if the UE reports the maximum value of the time interval between PDCCHs repeated twice as 4 OFDM symbols, when the base station performs repeated TDM-based PDCCH transmission to the UE based on the corresponding information, the time interval between the twice repeated PDCCHs may need to be adjusted to 4 OFDM symbols or less.

The above-described UE capability reporting methods may be configured in a combination of two or more in actual application. As an example, the UE reports that soft combining is available at the LLR level by [UE capability reporting method 2] and at the same time reports that two repeated PDCCH candidates by [UE capability reporting method 3] may have the same aggregation level, and the UE supports PDCCH repeated transmission that is TDMed by [UE capability reporting method 4] but may report the maximum value of the time interval between two repeated PDCCHs as 4 OFDM symbols. In addition, the UE may report each UE capability report according to the type of search space or DCI format, or may include information on each search space in each UE capability.

For example, the UE may report UE capabilities for each common search space and UE-specific search space respectively, and may report that the repeated PDCCH transmission is not supported in the common search space, and it is possible to perform soft combining while supporting repeated PDCCH transmission in the UE-specific search space. As another example, it may be reported that repeated PDCCH transmission may be supported and soft combining may be performed for a UE-specific DCI format, and PDCCH repeated transmission may not be supported for a common DCI format. In addition, applications based on a combination of various UE capability reporting methods are possible, but a detailed description thereof will be omitted.

$3^{rd}$ Embodiment: PDCCH Repeated Transmission and Explicit Connectivity-Related Configuration Method As an embodiment of the disclosure, a PDCCH repeated transmission configuration method for enabling soft combination during PDCCH repeated transmission will be described. When the base station performs repeated PDCCH transmission to the UE based on the above method 1-1 (multiple PDCCH repeated transmission method with the same payload) among various PDCCH repeated transmission methods, to reduce the number of blind decoding considering whether soft combining of the UE is possible, the base station may configure information that the repeated PDCCH candidates are explicitly linked or associated to each other by upper layer signaling, indicate by L1 signaling, or configure and indicate through upper layer signaling or a combination of L1 signaling. In more detail, various connection methods may exist as follows.

There may be various methods for configuring PDCCH repeated transmission and explicit connectivity-related to upper layer signaling as follows.

[PDCCH Repetition Configuration Method 1] when Configuration Information Exists in Upper Layer Signaling PDCCH-Config The base station may configure PDCCH-repetition-config in PDCCH-config, which is upper layer signaling, for repeated PDCCH transmission and explicit connectivity-related configuration to the UE, and the PDCCH-repetition-config may include the following information:

PDCCH repeat transmission method—One of TDM, FDM, and SFN;

Control resource set-search space combination(s) to be used during repeated PDCCH transmission;
Control resource set index(es)—OPTIONAL;
Search space index(es)—OPTIONAL;
Aggregation level(s) for explicit connectivity—OPTIONAL;
PDCCH candidate index(s) for explicit connectivity—OPTIONAL; and
Frequency resources for explicit connectivity—OPTIONAL.

Based on the above information, the base station may configure the PDCCH repeated transmission by upper layer signaling to the UE. For example, if the PDCCH repeated transmission scheme is set to SFN, the control resource set index is set to 1 as a control resource set-search space combination to be used during repeated PDCCH transmission, and the search space index is not set, the UE may expect that the PDCCH is repeatedly transmitted through the method 1-5 (SFN transmission method) in the control resource set having index 1. In this case, the configured control resource set may receive one or a plurality of different TCI states configured by upper layer signaling, may be instructed by L1 signaling or MAC-CE signaling, or may be configured and indicated by a combination of upper layer signaling and L1 signaling or MAC-CE signaling. In addition, if the PDCCH repeated transmission method is configured as SFN, the UE may not expect that a search space index is set in the control resource set-search space combination to be used for repeated PDCCH transmission.

As another example, if the PDCCH repeated transmission method is set to TDM or FDM, total two combinations of control resource set-search space to be used for repeated PDCCH transmission are configured, the control resource set index 1 and the search space index are set to 1 for the first combination, and the control resource set index 2 and the search space index are set to 2 for the second combination, the UE may expect that the PDCCH is repeatedly transmitted by the TDM or FDM method through the method 1-1 using the two control resource sets-search space combination. In this case, the configured control resource set may receive a plurality of same or different TCI states configured by upper layer signaling, may be instructed by L1 signaling or MAC-CE signaling, or may be configured and indicated by a combination of upper layer signaling and L1 signaling or MAC-CE signaling. In addition, if the PDCCH repeated transmission method is configured as TDM or FDM, the UE may expect that up to two control resource set-search space combinations to be used during repeated PDCCH transmission are configured, and both control resource sets and search space indexes may be expected to be configured in each combination.

In addition, the values of the five pieces of information may be updated without RRC reconfiguration based on MAC-CE. If the base station does not configure the PDCCH-repetition-config to the UE, the UE may not expect the PDCCH to be repeatedly transmitted, but may expect only a single PDCCH transmission. All of the above-described aggregation level, PDCCH candidate index, and frequency resources for explicit connectivity may not be configured, or at least one may be configured according to an explicit connectivity method to be described later.

[PDCCH Repeated Configuration Method 2] when Configuration Information Exists in Upper Layer Signaling for Search Space The base station may notify the UE by adding upper layer signaling in searchSpace, which is upper layer signaling for the search space, for repeated PDCCH transmission. For example, a parameter called repetition, which is an additional upper layer signaling, is set to on or off in searchSpace, which is an upper layer signaling, so that the base station may configure that the corresponding search space is used for repeated transmission. The search space in which repetition is set to on may be one or two per bandwidth part. For example, if searchSpaceId is set to 1, controlResourceSetId is set to 1, and repetition is set to on in searchSpace, which is upper layer signaling for search space index 1, the UE may expect that repeated PDCCH transmission is performed according to the method 1-5 (SFN transmission method) in the control resource set 1 connected to the search space 1.

As another embodiment, if searchSpaceId is set to 1, controlResourceSetId is set to 1, and repetition is set to on in searchSpace, which is upper layer signaling for search space index 1, and searchSpaceId is set to 2, controlResourceSetId is set to 2, and repetition is set to on in searchSpace, which is upper layer signaling for search space index 2, the UE may know that repeated PDCCH transmission is performed by TDM or FDM using method 1-1 between the combination of control resource set 1+search space 1 and control resource set 2+search space 2 combination. TDM and FDM may be divided according to time and frequency configurations through upper layer signaling of control resource sets 1 and 2 and search spaces 1 and 2, respectively. In addition, in upper layer signaling for the search space in which repetition is set on, the aggregation level or PDCCH candidate indexes for explicit connectivity specified in [PDCCH repeated configuration method 1] may be configured, and neither of them may be configured, either one of them may be configured, or both may be configured according to an explicit connection method to be described later.

4th Embodiment: Priority Determination Method Upon Reception for Repeated PDCCH Transmission As an embodiment of the disclosure, a method for determining priorities when receiving repeated PDCCH transmission will be described. The UE may report to the base station at least one of the UE capabilities listed below as a UE capability related to a method for determining a priority upon reception for repeated PDCCH transmission.

In one example, whether it is possible to include a control resource set in which a plurality of TCI states are set among a plurality of control resource sets overlapping in time for a plurality of cells in a specific PDCCH monitoring period.

In one example, whether it is possible to include control resource sets respectively connected to a plurality of explicitly connected search spaces among a plurality of control resource sets overlapping in time for a plurality of cells in a specific PDCCH monitoring period.

In one example, the number of receivable maximum reception beams or the number of different TCI states or QCL-TypeD characteristics among a plurality of control resource sets overlapping in time for a plurality of cells in a specific PDCCH monitoring period.

In one example, the maximum number of different control resource sets receivable considering above 3) for all control resource sets connected to a common search space or a UE-specific search space among a plurality of control resource sets overlapping in time for a plurality of cells in a specific PDCCH monitoring period.

In one example, the maximum number of different control resource sets receivable considering above 3) for all control resource sets connected to a common search space among a plurality of control resource sets overlapping in time for a plurality of cells in a specific PDCCH monitoring period.

In one example, the maximum number of different control resource sets receivable considering above 3) for all control resource sets connected to a UE-specific search space among a plurality of control resource sets overlapping in time for a plurality of cells in a specific PDCCH monitoring period.

In one example, the maximum number of control resource sets in which a plurality of TCI states are configured among a plurality of control resource sets overlapping in time for a plurality of cells in a specific PDCCH monitoring period.

In one example, the maximum number of pairs of control resource sets each connected to a plurality of explicitly connected search spaces among a plurality of control resource sets overlapping in time for a plurality of cells in a specific PDCCH monitoring period.

If the UE does not report above 1) or reports that it is impossible, the UE may not expect to include a single control resource set in which a plurality of TCI states are configured among a plurality of control resource sets overlapping in time for a plurality of cells in a specific PDCCH monitoring period, and may expect that the control resource set in which a plurality of TCI states are configured does not have another control resource set overlapping in time across the plurality of cells in the PDCCH monitoring period of the corresponding control resource set. Similarly, if the UE does not report above 2) or reports that it is impossible, the UE may not expect to include a control resource set respectively connected to a plurality of explicitly connected search spaces among a plurality of control resource sets overlapping in time for a plurality of cells in a specific PDCCH monitoring period, and if each control resource set connected to a plurality of explicitly connected search spaces is repeatedly transmitted through FDM, another control resource set overlapping in time across the plurality of cells does not exist in the PDCCH monitoring period of the corresponding control resource set.

If the UE reports above 7) as 2, the UE may expect that up to two control resource sets in which a plurality of TCI states are configured among a plurality of overlapping control resource sets in time for a plurality of cells may exist across a plurality of cells within the corresponding PDCCH monitoring period in a specific PDCCH monitoring period. That is, a maximum of two control resource sets may be connected to a plurality of TCI states in the corresponding PDCCH monitoring period.

If the UE reports above 8) as 3, UE may expect that a pair of control resource sets respectively connected to a plurality of explicitly connected search spaces among a plurality of control resource sets overlapping in time for a plurality of cells in a specific PDCCH monitoring period exists up to three across a plurality of cells within the corresponding PDCCH monitoring period. That is, in the corresponding PDCCH monitoring period, a maximum of three pairs of control resource sets may be connected to three pairs of a plurality of explicitly connected search spaces, respectively.

In addition, information that the UE intends to report to the base station through the eight UE capabilities may be simultaneously received by using a plurality of different QCL-TypeD characteristics from among a plurality of control resource sets overlapping in time. Accordingly, because the eight UE capabilities are information focused on whether a plurality of PDCCHs may be received, there may be a reporting method for enabling simultaneous reception using a plurality of QCL-TypeD characteristics at an any time point.

As a method of reporting a more generalized UE capability to the base station, the UE capability for simultaneous reception based on multiple QCL-TypeD characteristics of a control resource set may be substituted. In this case, the UE reporting the corresponding UE capability may let the base station know that simultaneous reception is possible using a plurality of QCL-TypeD characteristics overlapping in time for all downlink signals (e.g., SSB, CSI-RS, CSI-IM, PRS, DMRS, PTRS, PDSCH, PDCCH, . . . ) at any point in time. In addition, when reporting the corresponding capability, the UE may let the base station know that simultaneous reception is possible using a plurality of QCL-TypeD characteristics overlapping in time at any time point for only some combinations of the examples of the downlink signals listed above.

The following is a specific embodiment in consideration of repeated PDCCH transmission, and a method for determining priorities considering repeated PDCCH transmission using a single control resource set in which a plurality of TCI states are configured or PDCCH repeated transmission using a control resource set respectively connected to a plurality of explicitly connected search spaces when receiving a PDCCH will be described in detail.

Embodiment 4-1: Priority Determination Method when Receiving Repeated PDCCH Transmission Using a Single Control Resource Set in which a Plurality of TCI States are Configured As an embodiment of the disclosure, A method for determining the priority of PDCCH reception in the UE when receiving repeated PDCCH transmission using a single control resource set in which a plurality of TCI states is configured will be described. If a plurality of control resource sets existing within an activated bandwidth part of a single or a plurality of subcarriers overlap in time while having the same or different QCL-TypeD characteristics in a specific PDCCH monitoring period, and particularly, if at least one control resource set has a plurality of TCI states within the corresponding PDCCH monitoring period, the UE may perform the QCL priority determination operation considering the following three references.

In one example of Reference 1, a method of selecting a reference control resource set to determine whether each of the control resource sets overlapping in time within a specific PDCCH monitoring period may be received.

In one example of Reference 2, based on one or more QCL-TypeD characteristics included in the control resource set selected in reference 1), a control resource set to be simultaneously received within a specific PDCCH monitoring period is selected.

In one example of Reference 3, when the maximum number of control resource sets that may be monitored in reference 2) is limited, the priority between control resource sets.

For the method of determining the references 1 to 3, the UE may assume that a control resource set connected to a common search space or a UE-specific search space has one or a plurality of QCL-TypeD characteristics within a PDCCH monitoring period overlapping in time considering a plurality of subcarriers. For example, if the first control resource set (C1) connected to the first common search space (CSS #1) in the first subcarrier (CC #1) has N QCL-TypeD characteristics (wN), this control resource set, which will be described later, may be named as "CC #1-CSS #1-C1wN." For another example, if the third control resource set (C3) connected to the second UE-specific search space (USS #2) in the n-th subcarrier (CC #n) has N-1 QCL-TypeD characteristics (w(N-1)), this control resource set may be defined as "CC #n-USS #2-C #3w (N-1)." The corresponding naming scheme may be used in the embodiment 4-1. Based on this, the following methods for determining the reference 1 may be considered.

[Method 1 of Determining Reference 1]

If the maximum number of a plurality of TCI states that an arbitrary control resource set may have is N, and each of the common search space and the UE-specific search space have the same N value within the active bandwidth portion of all subcarriers, the UE may select a control resource set that meets Reference 1 according to the order of Table 51 below. In the following order, the subcarrier index, the index of the common and UE-specific search spaces, and the control resource set index are excluded from among the naming schemes.

TABLE 51

| Priority | Control resource set | Note |
|---|---|---|
| 1 | CSS-CwN | Multiple (2 or more) |
| 2 | CSS-Cw(N − 1) | QCL-TypeD |
| ... | ... | |
| N | CSS-Cw1 | Single (1) QCL-TypeD |
| N + 1 | USS-CwN | Multiple (2 or more) |
| N + 2 | USS-Cw(N − 1) | QCL-TypeD |
| ... | ... | |
| 2N | USS-Cw1 | Single (1) QCL-TypeD |

As described above, when the subcarrier index, the index of the common and UE-specific search spaces, and the control resource set index are excluded, the corresponding control resource set may be understood as a control resource set having a specific number of QCL-TypeD characteristics connected to a common or UE-specific search space. For example, the CSS-CwN may be defined as a control resource set having N QCL-TypeD characteristics connected to the common search space, and the USS-Cw(N-2) may be defined as a control resource set having N-2 QCL-TypeD characteristics connected to the UE-specific search space. According to [Table 51], the UE may preferentially select a control resource set having a plurality of QCL-TypeD characteristics among control resource sets connected to the common search space over the control resource sets having a single QCL-TypeD characteristic, and may preferentially select a control resource set having a single QCL-TypeD characteristic connected to the common search space over the control resource sets having a plurality of QCL-TypeD characteristics connected to the UE-specific search space.

When at least one control resource set corresponding to the priority of any value illustrated in Table 51 exists within the corresponding PDCCH monitoring period, a control resource set connected to a search space having the lowest subcarrier index and the lowest common and UE-specific search space index among the corresponding control resource sets may be determined as the reference control resource set. In addition, if the control resource sets corresponding to the 1st to nth priorities do not exist in the activated bandwidth portion of all subcarriers within the corresponding PDCCH monitoring period, the existence or nonexistence of the PDCCH monitoring period is determined for the control resource set corresponding to the (n+1)th priority, and if there is at least one control resource set, the lowest subcarrier index, the lowest common and UE-specific search space index among the corresponding control resource sets may be determined to be a control resource set connected to the search space as the reference control resource set.

For example, if the CSS-CwN, which is a control resource set corresponding to the first priority, does not exist within the corresponding PDCCH monitoring period, and the CSS-Cw(N-1), which is a control resource set corresponding to the second priority, corresponds to the corresponding PDCCH monitoring period, and one CSS-Cw(N-1), which is a control resource set corresponding to the second priority, exists in each of subcarriers 1 and 2 within the corresponding PDCCH monitoring period, the UE may select the control resource set existing in subcarrier 1 as the control resource set conforming to Reference 1.

[Method 2 of Determining Reference 1]

As another method, the UE may follow the order of Table 52 below in order to determine the control resource set conforming to Reference 1. Similar to the above-mentioned [Method 1 of determining Reference 1], the subcarrier index, the index of the common and UE-specific search space, and the control resource set index are excluded from the naming schemes in the following order.

TABLE 52

| Priority | Control resource set | Note |
|---|---|---|
| 1 | CSS-CwN | Multiple (2 or more) |
| 2 | CSS-Cw(N − 1) | QCL-TypeD |
| ... | ... | |
| N − 1 | CSS-Cw2 | |
| N | USS-CwN | |
| N + 1 | USS-Cw(N − 1) | |
| ... | ... | |
| 2N − 2 | USS-Cw2 | |
| 2N − 1 | CSS-Cw1 | Single (1) QCL- |
| 2N | USS-Cw1 | TypeD |

According to Table 52, the UE may preferentially select a control resource set having a plurality of QCL-TypeD characteristics among control resource sets connected to the common search space rather than control resource sets having a plurality of QCL-TypeD characteristics among the control resource sets connected to the UE-specific search space, may preferentially select a control resource set having a plurality of QCL-TypeD characteristics among the control resource sets connected to the UE-specific search space rather than the control resource sets with a single QCL-TypeD characteristic among the control resource sets connected to the common search space, and in the case of a control resource set having a single QCL-TypeD, a control resource set connected to a common search space may have a higher priority than a control resource set connected to a UE-specific search space. Similar to the [Method 1 of determining Reference 1], if at least one control resource set corresponding to the priority of any value illustrated in Table 52 exists within the corresponding PDCCH monitoring period, a control resource set connected to a search space having the lowest subcarrier index and the lowest common and UE-specific search space index among the corresponding control resource sets may be determined as the reference control resource set.

In addition, if the control resource sets corresponding to the 1st to nth priorities do not exist in the activated bandwidth portion of all subcarriers within the corresponding PDCCH monitoring period, the existence or nonexistence of the PDCCH monitoring period is determined for the control resource set corresponding to the (n+1)th priority, and if there is at least one control resource set, the control resource set connected to a search space having the lowest subcarrier index and the lowest common and UE-specific search space index among the corresponding control resource sets may be determined as the reference control resource set. For example, with respect to Table 52, if CSS-CwN, which is a control resource set corresponding to the first priority, does not exist in the corresponding PDCCH monitoring period, and one CSS-Cw (N−1), which is a control resource set corresponding to the second priority, exists in each of subcarriers 1 and 2 within the corresponding PDCCH monitoring period, the UE may select the control resource set existing in subcarrier 1 as the control resource set conforming to reference 1.

As another example, with respect to [Table 52], if the control resource sets from the 1st to the (2N−2)th priorities did not exist in the corresponding PDCCH monitoring period, and two CSS-Cw1s, control resource sets corresponding to the (2N−1)th priority, exist on subcarrier 1 within the corresponding PDCCH monitoring period (e.g., there are two CSSs, and each of indices 1 and 2 is have), the UE may select the control resource set connected to CSS #1 existing in subcarrier 1 as a control resource set conforming to reference 1.

[Method 3 of Determining Reference 1]

As another method, the UE may follow the order of Table 53 below in order to determine the control resource set conforming to reference 1. Similar to the above-mentioned [Method 1 of determining Reference 1] and [Method 2 of determining Reference 1], the subcarrier index, the index of the common and UE-specific search space, and the control resource set index are excluded from among the naming schemes in the following order.

TABLE 53

| Priority | Control resource set | Note |
| --- | --- | --- |
| 1 | CSS-CwN | Multiple (2 or more) |
| 2 | USS-CwN | QCL-TypeD |
| 3 | CSS-Cw(N − 1) | |
| 4 | USS-Cw(N − 1) | |
| ... | | |
| 2N − 3 | CSS-Cw2 | |
| 2N − 2 | USS-Cw2 | |
| 2N − 1 | CSS-Cw1 | Single (1) QCL-TypeD |
| 2N | USS-Cw1 | |

According to Table 53, if the numbers of QCL-TypeD characteristics are the same for the control resource sets connected to the common search space and the control resource sets connected to the UE-specific search space, the UE may preferentially select a control resource set connected to the common search space, and if the numbers of QCL-TypeD characteristics are different, the UE may preferentially select a control resource set connected to the common or UE-specific search space having a larger number of QCL-TypeD characteristics. Similar to [Method 1 of determining Reference 1] and [Method 2 of determining Reference 1], if at least one control resource set corresponding to the priority of any value illustrated in Table 53 exists within the corresponding PDCCH monitoring period, a control resource set connected to a search space having the lowest subcarrier index and the lowest common and UE-specific search space index among the corresponding control resource sets may be determined as the reference control resource set.

In addition, if the control resource sets corresponding to the 1st to nth priorities do not exist in the activated bandwidth portion of all subcarriers within the corresponding PDCCH monitoring period, the existence or nonexistence of the PDCCH monitoring period may be determined for the control resource set corresponding to the (n+1)th priority, and if there is at least one control resource set, the control resource set connected to a search space having the lowest subcarrier index and the lowest common and UE-specific search space index among the corresponding control resource sets may be determined as the reference control resource set. For example, with respect to Table 53, if the CSS-CwN, which is a control resource set corresponding to the first priority, does not exist in the corresponding PDCCH monitoring period, and one USS-CwN, which is a control resource set corresponding to the second priority, exists in each of subcarriers 1 and 2 within the corresponding PDCCH monitoring period, the UE may select the control resource set existing in subcarrier 1 as the control resource set conforming to reference 1.

As another example, with respect to Table 53, if the control resource sets from the 1st to the (2N−1)th priorities did not exist in the corresponding PDCCH monitoring period, and there are two USS-Cw1s, control resource sets corresponding to the 2Nth priority, on subcarrier 1 within the corresponding PDCCH monitoring period (e.g., when there are two UE-specific search spaces, USS #1 and USS #2), the UE may select the control resource set connected to USS #1 existing in subcarrier 1 as the control resource set conforming to reference 1.

The [Method 1 of determining Reference 1] to [Method 3 of determining reference 1] are some examples, and another determination method, which is not limited thereto, may be used for the reference 1. In addition, referring to the UE capability to support repeated PDCCH transmission for the common search space described above in the second embodiment, the UE and the base station may not support repeated PDCCH transmission for CSS. In this case, when considering the priority, the priority considering the repeated PDCCH transmission for CSS in Table 51 to Table 53 may be ignored. More specifically, in Table 51 and Table 52, the priorities 1 to N−1, odd-numbered priorities (e.g., 1, 3, 5, . . . , 2N−3) except for the (2N−1)th priority in Table 53 may be ignored.

Following the [Method 1 of determining Reference 1] to [Method 3 of determining Reference 1], the following methods may be considered for a method of determining reference 2. Each method described below will be described on the premise that the reference control resource set determined by the [Method 1 of determining Reference 1] to [Method 3 of determining Reference 1] has M (1≤M≤N) QCL-TypeD characteristics.

[Method 1-1 of Determining Reference 2]

The UE may receive the control resource sets connected to the common search space and the UE-specific search space with the same number and type of QCL-TypeD characteristics as the specific control resource set determined by reference 1 in the corresponding PDCCH monitoring period using the corresponding QCL-TypeD characteristics.

[Method 1-2 of Determining Reference 2]

The UE may receive the control resource sets connected to the common search space with the same number and type of QCL-TypeD characteristics as the specific control resource set determined by reference 1 in the corresponding PDCCH monitoring period, using the corresponding QCL-TypeD characteristics.

[Method 1-3 of Determining Reference 2]

The UE may receive the control resource sets connected to the UE-specific search space with the same number and type of QCL-TypeD characteristics as the specific control resource set determined by reference 1 in the corresponding PDCCH monitoring period, using the corresponding QCL-TypeD characteristics.

[Method 1-4 of Determining Reference 2]

The UE may receive the same number and type of QCL-TypeD characteristics as the specific control resource set determined by reference 1, and control resource sets connected to the same type of search space in the corresponding PDCCH monitoring period, using the corresponding QCL-TypeD characteristics.

[Method 2-1 of Determining Reference 2]

The UE may receive the control resource sets connected to the common search space and the UE-specific search space while having at least one QCL-TypeD characteristic of the same type as the specific control resource set determined by the reference 1 in the corresponding PDCCH monitoring period, using the corresponding QCL-TypeD characteristics.

[Method 2-2 of Determining Reference 2]

The UE may receive the control resource sets connected to the common search space while having at least one QCL-TypeD characteristic of the same type as the specific control resource set determined by reference 1 in the corresponding PDCCH monitoring period, using the corresponding QCL-TypeD characteristics.

[Method 2-3 of Determining Reference 2]

The UE may receive the control resource sets connected to the UE-specific search space while having at least one QCL-TypeD characteristic of the same type as the specific control resource set determined by reference 1 in the corresponding PDCCH monitoring period, using the corresponding QCL-TypeD characteristics.

[Method 2-4 of Determining Reference 2]

The UE may receive control resource sets connected to a search space of the same type as the search space to which a specific control resource set is connected, while having at least one QCL-TypeD characteristic of the same type as the specific control resource set determined by the reference 1 in the corresponding PDCCH monitoring period, using the corresponding QCL-TypeD characteristics.

[Method 3-1 of Determining Reference 2]

The UE may receive control resource sets corresponding to the case in which all QCL-TypeD characteristics of each control resource set are a subset of all QCL-TypeD characteristics of a specific control resource set determined by the reference 1 among the control resource sets connected to the common search space and the UE-specific search space existing within the corresponding PDCCH monitoring period.

[Method 3-2 of Determining Reference 2]

The UE may receive control resource sets corresponding to the case in which all QCL-TypeD characteristics of each control resource set are a subset of all QCL-TypeD characteristics of a specific control resource set determined by the reference 1 among the control resource sets connected to the common search space existing within the corresponding PDCCH monitoring period.

[Method 3-3 of Determining Reference 2]

The UE may receive control resource sets corresponding to the case in which all QCL-TypeD characteristics of each control resource set are a subset of all QCL-TypeD characteristics of a specific control resource set determined by the reference 1 among the control resource sets connected to the UE-specific search space existing within the corresponding PDCCH monitoring period.

[Method 3-4 of Determining Reference 2]

The UE may receive control resource sets connected to a search space of the same type as a search space to which a specific control resource set is connected while all QCL-TypeD characteristics of each control resource set are a subset of all QCL-TypeD characteristics of a specific control resource set determined by the reference 1 among the control resource sets existing within the corresponding PDCCH monitoring period.

When considering the Method 3 of determining Reference 2 following the [Method 1-1 of determining Reference 2] to [Method 3-4 of determining reference 2], if the reference control resource set is selected in consideration of the [Method 1 of determining Reference 1], if the number of different control resource sets that may be received is limited in consideration of the same method (the Method 1 of determining Reference 1) for the method of determining reference 3, the limited control resource set may be selected according to the priority.

As described above, the UE may determine the priority when receiving the repeated PDCCH transmission through a combination of the above-described various methods applicable to Reference 1 to Reference 3, respectively. Applicable methods for each reference may be semi-statically configured by upper layer signaling from the base station, or may be dynamically indicated by L1 signaling, or may be configured and indicated by a combination of upper layer signaling and L1 signaling, or a fixed method determined by a standard may be used. As an example of combinations of the methods, [Method 1 of determining Reference 1] may be applied to the references 1 and 3, and [Method 1-1 of determining Reference 2] may be applied to reference 2. It will be described in more detail with the example of FIG. 21 below.

Figure 21:
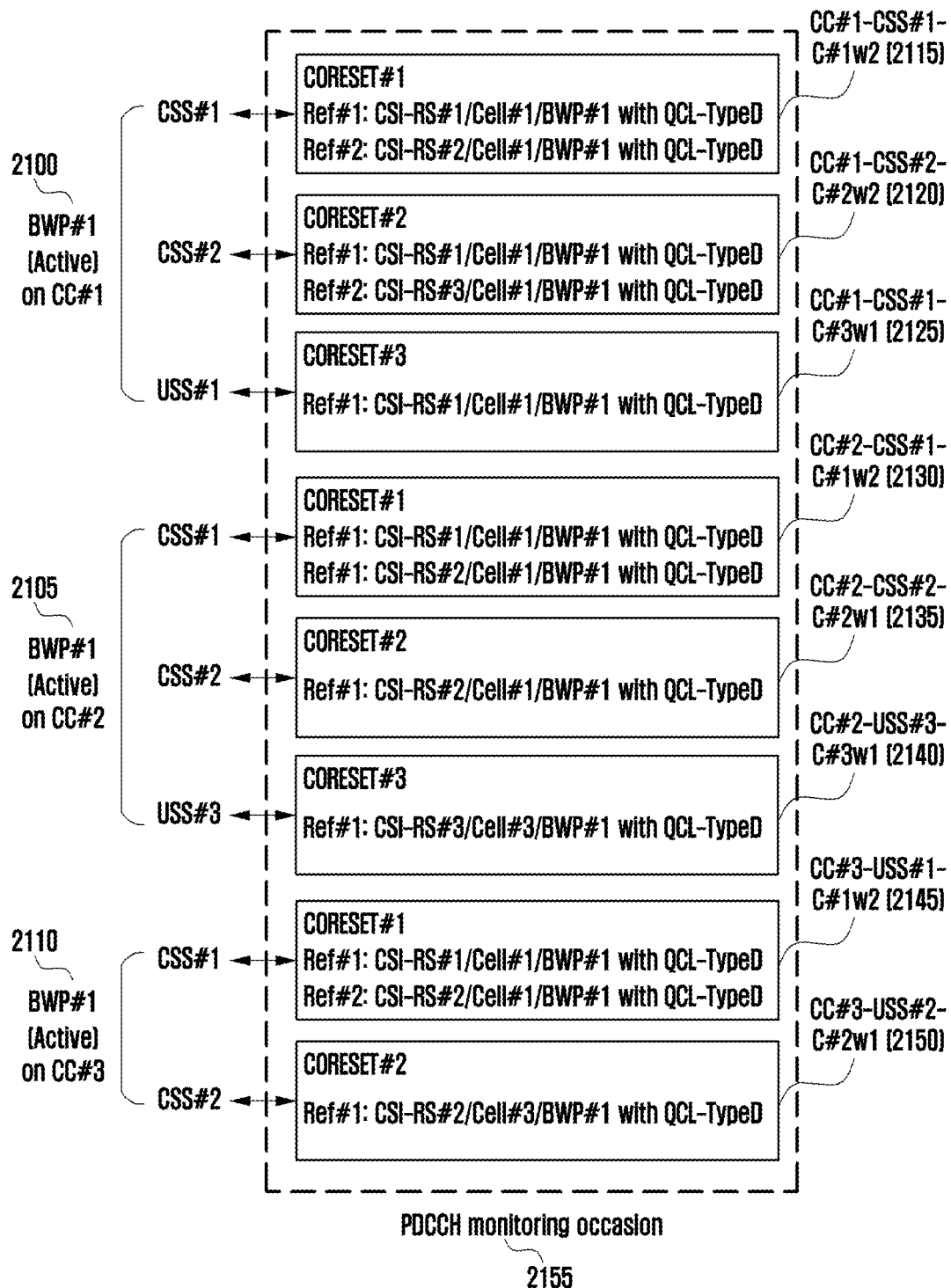
FIG. 21 is a diagram illustrating a method of determining priorities when receiving repeated PDCCH transmission according to an embodiment of the disclosure.

FIG. 21 is a diagram illustrating a method of determining priorities when receiving repeated PDCCH transmission according to an embodiment of the disclosure. In this example, a case in which a total of eight control resource sets 2115 to 2150 overlap in time for a total of three subcarriers 2100, 2105, and 2110 in a specific PDCCH monitoring period 2155 was considered. According to the [Method 3 of determining Reference 1], the reference control resource set conforming to the reference 1 is the first control resource set connected to CSS #1 in CC #1 (e.g., may be named CC #1-CSS #1-C #1w2 2115).

As an example, if the [Method 1-1 of determining Reference 2] in FIG. 21 is applied, since the UE may receive the control resource sets connected to the common search space and the UE-specific search space while having the same number and type of QCL-TypeD characteristics as the CC #1-CSS #1-C #1w2 within the corresponding PDCCH monitoring period, the UE may receive a first resource set connected to USS #1 in CC #2 (e.g., may be named as CC #2-USS #1-C #1w2 2130) and a first resource set connected to USS #1 in CC #3 having the same two QCL-TypeD characteristics (e.g., may be named as CC #3-USS #1-C #1w2 2145).

As another example, if the [Method 2-3 of determining Reference 2] in FIG. 21 is applied, since the UE may receive control resource sets connected to the UE-specific search space while having at least one QCL-TypeD characteristic of the same type as the CC #1-CSS #1-C #1w2 within the corresponding PDCCH monitoring period, the UE may receive a third control resource set connected to USS #2 in CC #1 that has the same first QCL-TypeD characteristics as the reference control resource set (e.g., may be named as CC #1-USS #2-C #3w1 2125), a second control resource set connected to USS #2 in CC #2 having the same second QCL-TypeD characteristic as the reference control resource set (e.g., may be named as CC #2-USS #2-C #2w1 2135), a first control resource set connected to USS #1 in CC #2 that has both the reference control resource set and the two QCL-TypeD characteristics the same (e.g., may be named as CC #2-USS #1-C #1w2 2130), and a first control resource set (e.g., may be named as CC #3-USS #1-C #1w2 2145) connected to USS #1 in CC #3.

At this time, if the maximum number of different control resource sets that may be received in the corresponding PDCCH monitoring period is two, since the UE may select the reference control resource set as the first priority according to the [Method 3 of determining Reference 1], the control resource set considered as the second priority is connected to the USS, and there are two QCL-TypeD characteristics, CC #2-USS #1-C #1w2 2130 and CC #3-USS #1-C #1w2 2145, the UE may receive CC #2-USS #1-C #1w2 2130 corresponding to the lower subcarrier index among them.

As another example, if the maximum number of different control resource sets that may be received in the corresponding PDCCH monitoring period is three, since only the reference control resource set among the currently receivable control resource sets is connected to the common search space, since the control resource set considered as the third priority is connected to the USS in addition to the above two (the reference control resource set and CC #2-USS #1-C #1w2 (2130)), and because there are a plurality of QCL-TypeD characteristics, CC #1-USS #1-C #3w1 2125 and CC #2-USS #2-C #2w1 2135, CC #1-USS #1-C #3w1 2125 and CC #2-USS #2-C #2w1 2135, the UE may receive CC #1-USS #1-C #3w1 2125 corresponding to the lower subcarrier index among them.

As another example, if the [Method 3-4 of determining Reference 2] in FIG. 21 is applied, since the UE may receive control resource sets connected to a search space of the same type as the search space to which a specific control resource set is connected while all QCL-TypeD characteristics of each control resource set are a subset of all QCL-TypeD characteristics of a specific control resource set determined by the reference 1 among the control resource sets existing within the corresponding PDCCH monitoring period, the UE may receive the reference control resource set and the first control resource set connected to CSS #1 in CC #2 having the same two QCL-TypeD characteristics (e.g., may be named as CC #2-CSS #1-C #1w2 2130).

Figure 22A:
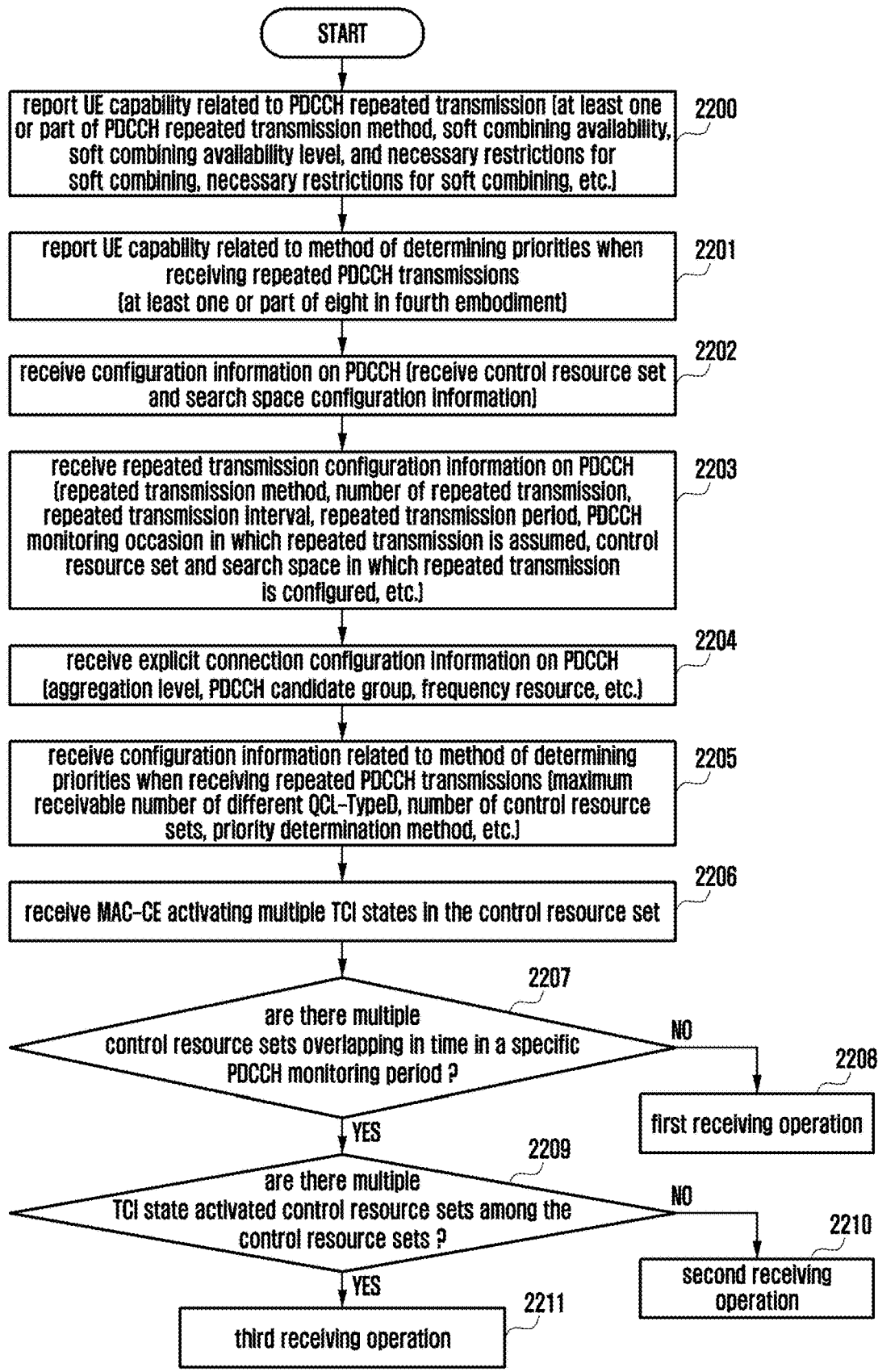
FIG. 22A is a diagram illustrating operations of a UE and a base station with respect to a method of determining priorities when receiving repeated PDCCH transmission according to an embodiment of the disclosure.
Figure 22B:
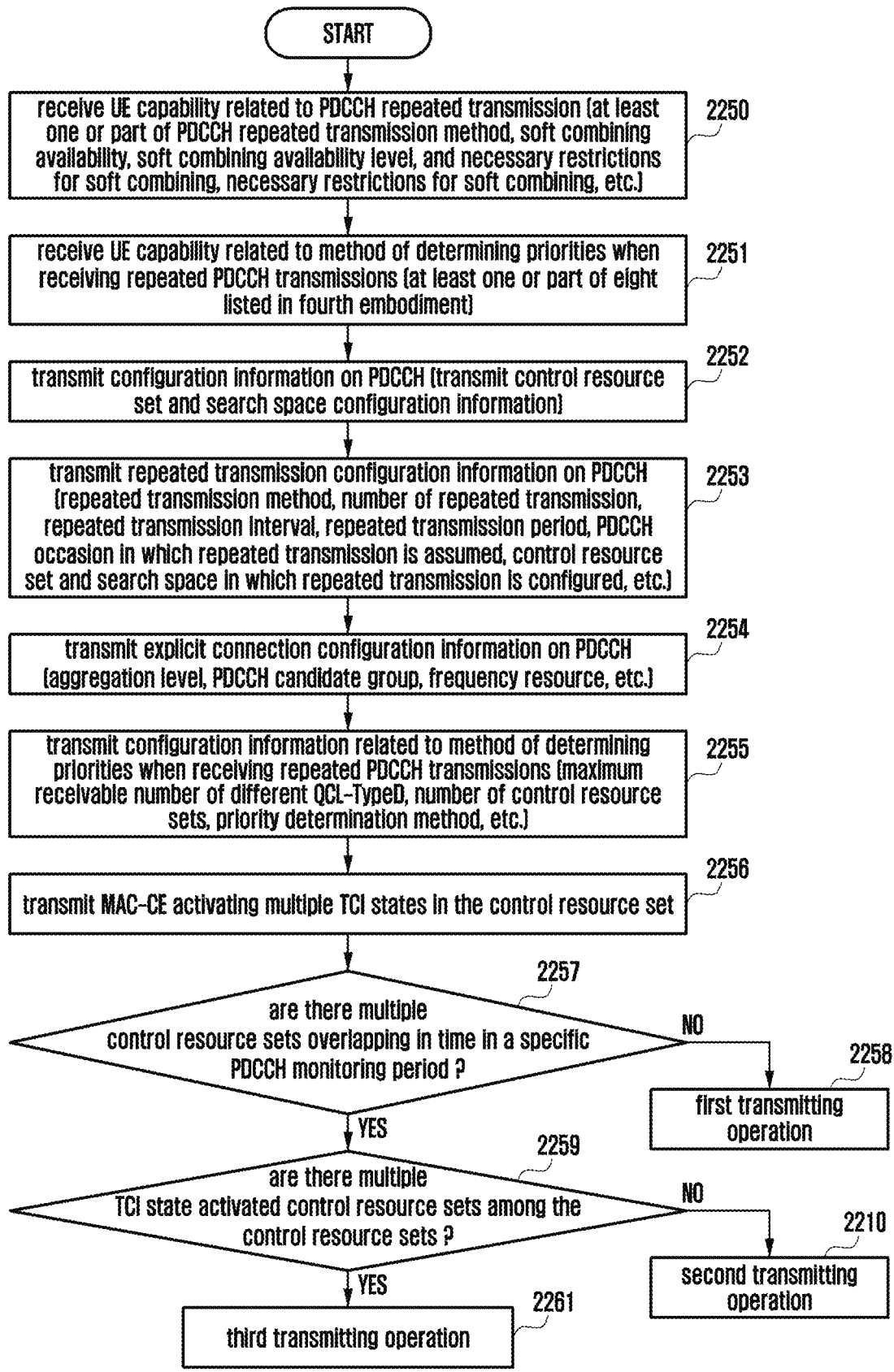
FIG. 22B is a diagram illustrating operations of a UE and a base station with respect to a method of determining priorities when receiving repeated PDCCH transmission according to an embodiment of the disclosure.

FIG. 22A and FIG. 22B are a diagram illustrating operations of a UE and a base station with respect to a method of determining priorities when receiving repeated PDCCH transmission according to an embodiment of the disclosure. The UE may report information (e.g., at least one or part of PDCCH repeated transmission method, whether soft combining is possible, soft combining possible level, necessary restrictions for soft combining, and the like) related to repeated PDCCH transmission to the base station as a UE capability 2200 and 2250. In addition, the UE may report information (e.g., at least one or part of the UE capabilities listed in the fourth embodiment) related to a method of determining a priority upon reception of repeated PDCCH transmission to the base station as a UE capability 2201 and 2251.

The base station may receive the same and transmit configuration information (e.g., configuration information on the control resource set and the search space) for the PDCCH to the UE 2202 and 2252, the base station may additionally transmit configuration information (e.g., repeated transmission method, number of repeated transmissions, repeated transmission period, repeated transmission period, PDCCH monitoring period in which repeated transmission is assumed, control resource set and search space in which repeated transmission is set, etc.) related to repeated PDCCH transmission to the UE 2203 and 2253.

In addition, the base station may additionally transmit explicit connection configuration related information (e.g., aggregation level, PDCCH candidate group, frequency resource, etc.) to the UE during repeated PDCCH transmission 2204 and 2254. If the base station sets to the UE a method based on a control resource set in which a plurality of TCI states are configured as the PDCCH repeated transmission method, explicit connection configuration related information during such repeated PDCCH transmission may not be transmitted from the base station to the UE. In addition, the base station may additionally transmit configuration information (e.g., the maximum number of different QCL-TypeDs that may be received or the number of control resource sets, the priority determination method, etc.) related to the priority determination method to the UE when receiving repeated PDCCH transmissions 2205 and 2255.

As described above, if the base station sets to the UE a method based on a control resource set in which a plurality of TCI states are configured in a PDCCH repeated transmission method, the base station may transmit a MAC-CE for activating a plurality of TCI states in a specific control resource set 2206 and 2256. Then, based on the configuration information received from the base station, if there are no overlapping control resource sets in time in a specific PDCCH monitoring period 2207 and 2257, that is, if only a single control resource set exists, the UE may perform a first reception operation 2208 and 2258. The first reception operation may be a method of receiving a single control resource set existing within the corresponding PDCCH monitoring period. If there are a plurality of control resource sets overlapping in time in a specific PDCCH monitoring period 2207 and 2257, and there is no control resource set in which a plurality of TCI states are activated among the control resource sets 2209 and 2259, the UE may perform a second reception operation 2210 and 2260.

The second reception operation may be a method of determining the priority for the control resource set reception in consideration of only a single PDCCH transmission as the operation of the existing Rel-15/16. If there are a plurality of control resource sets overlapping in time in a specific PDCCH monitoring period 2207 and 2257, and among the control resource sets, a plurality of TCI state activated control resource sets exist 2209 and 2259, the UE may perform a third reception operation 2211 and 2261. The third receiving operation may be a method of receiving by combining the respective methods for the references 1 to 3 in the above-described 4-1 embodiment, and as an example, as described above, the UE may determine the priority when receiving the repeated PDCCH transmission through a combination of the above-described various methods applicable to each of the Reference 1 to 3.

Applicable methods for each reference may be semi-statically configured by upper layer signaling from the base station, or may be dynamically indicated by L1 signaling, may be configured and indicated by a combination of upper layer signaling and L1 signaling, or a fixed method determined by a standard may be used. As an example of combinations of the methods, [Method 1 of determining Reference 1] may be applied to References 1 and 3, and [Method 1-1 of determining Reference 2] may be applied to Reference 2.

4-2 Embodiment: Priority Determination Method Upon Reception of PDCCH Repeated Transmission Using Control Resource Sets Respectively Connected to a Plurality of Explicitly Connected Search Spaces As an embodiment of the disclosure, a method for determining a priority for PDCCH reception in the UE when receiving repeated PDCCH transmission using a control resource set respectively connected to a plurality of explicitly connected search spaces will be described. If a plurality of control resource sets existing within an activated bandwidth portion of a single or a plurality of subcarriers by the UE overlap in time while having the same or different QCL-TypeD characteristics in a specific PDCCH monitoring period, particularly, when at least one of the control resource sets respectively connected to a plurality of search spaces for which explicit connectivity is configured for PDCCH repeated transmission is included in the corresponding PDCCH monitoring period, the UE may perform the QCL prioritization operation in consideration of the following three references.

In one example of Reference 1, a method of selecting a set of reference control resource sets to determine whether each of the control resource sets overlapping in time within a specific PDCCH monitoring section may be received.

In one example of Reference 2, based on the QCL-TypeD characteristic included in the set of control resource sets selected in the above reference 1), a control resource set to be simultaneously received within a specific PDCCH monitoring period is selected.

In one example of Reference 3, when the number of maximum control resource sets that may be monitored in Reference 2) is limited, the priority between control resource sets.

When considering the method of determining the references 1 to 3, for a plurality of subcarriers, it may be assumed that one or a plurality of control resource sets exist within a PDCCH monitoring period in which a plurality of search spaces having explicit connectivity and a control resource set respectively connected thereto overlap in time. For example, in the first subcarrier (CC #1), when the first to Nth common search spaces (e.g., {CSS #1, . . . , CSS #N}) have explicit connectivity to each other, and the first to Nth control resource sets (e.g., {C #1, . . . , C #N}) respectively connected thereto overlap in time within a specific PDCCH monitoring period, when the set of the corresponding control resource set is described later, it may be named "CC #1-CN/N{(CSS #1-C #1), (CSS #N-C #N)}." Here, CX/Y means that a total of X control resource sets overlap in time within the corresponding PDCCH monitoring period among all control resource sets respectively connected to Y search spaces having explicit connectivity.

In this example, X=Y=N. As another example, in the nth subcarrier (CC #n), when the second, third, and fifth UE-specific search spaces (e.g., {USS #2, USS #3, USS #5}) have explicit connectivity to each other, and the first to third control resource sets (e.g., {C #1, C #2, C #3}) respectively connected thereto overlap in time within a specific PDCCH monitoring period, this set of control resource sets will be named "CC #n-C3/3{(USS #2-C #1), (USS #3-C #2), and (USS #5-C #3)}." Here, C3/3 means that all three of all control resource sets connected to three search spaces each having explicit connectivity overlap in time within the corresponding PDCCH monitoring period.

As another example, in the m-th subcarrier (CC #m), when the first and second UE-specific search spaces (e.g., {USS #1, USS #2}) have explicit connectivity to each other, and only the first control resource set among the first and second control resource sets (e.g., {C #1, C #2}) connected to each overlaps in time within a specific PDCCH monitoring period, a set of these control resource sets may be named "CC #m-C1/2{(USS #1-C #1), and !(USS #2-C #2)}." Here, C1/2 means that, within the corresponding PDCCH monitoring period, one of all control resource sets respectively connected to two search spaces having explicit connectivity overlaps in time. Unlike the previous two examples, the expression !(.) used in the last example may mean that the control resource set corresponding to ! (.) does not exist in the corresponding PDCCH monitoring period among the control resource sets respectively connected to a plurality of search spaces having explicit connectivity to each other. In !(.), (.) may be a specific search space or control resource sets, and one of the candidates that may be (.) may be "USS #2-C #2." That is, it may be seen that the control resource set corresponding to ! (.) is used for repeated PDCCH transmission in the TDM method together with the control resource set existing in the corresponding monitoring period.

On the contrary, in the previous two examples, since all control resource sets respectively connected to a plurality of search spaces having explicit connectivity exist in the corresponding PDCCH monitoring period, it may be seen that all control resource sets are used for repeated PDCCH transmission in the FDM method. The corresponding naming scheme may be used only in the 4-2 embodiment. In addition, being determined as a set of reference control resource set below means that a plurality of QCL-TypeDs of control resource sets existing in the corresponding set of reference control resource set may be determined based on the same when determining a control resource set to be received in the corresponding PDCCH monitoring period to be determined in the Reference 2. In addition, for both the common search space and the UE-specific search space, if the first and second search spaces have explicit connectivity to each other, the first and second search spaces may have explicit connectivity with another search space. The following methods for determining the Reference 1 may be considered.

[Method 1 of Determining Reference 1]

If the maximum number of a plurality of search spaces having explicit connectivity is N, and each of the common search space and the UE-specific search space within the active bandwidth portion of all subcarriers have the same N value, the UE may select a set of control resource sets that meet Reference 1 according to the order of [Table 54] below. In the following order, the subcarrier index, the index of the common and UE-specific search space, and the control resource set index are excluded among the naming schemes, and only CX/Y expressing the number of total control resource sets connected to the types of a plurality of search spaces having explicit connectivity (whether it is a common search space or a UE-specific search space), Y and the number X overlapping within the corresponding PDCCH monitoring period are considered.

TABLE 54

| Priority | Set of control resource set | Number of control resource sets within specific PDCCH monitoring period | Number of all control resource sets connected to the search space with explicit connectivity | |
|---|---|---|---|---|
| 1 | CN/N(CSS-C) | N | N | Using |
| 2 | C(N − 1)/1{ } | N − 1 | N | multiple |
| ... | ... | ... | ... | search |
| N | C1/N{CSS-C} | 1 | N | spaces with |
| ... | ... | ... | ... | explicit |
| N(N + 1)/2 − 2 | C2/2{CSS-C} | 2 | 2 | connectivity |
| N(N + 1)/2 − 1 | C1/2{CSS-C} | 1 | 2 | |
| N(N + 1)/2 | C1/1{CSS-C} | 1 | 1 | Using single search space |
| N(N + 1)/2 + 1 | CN/N{USS-C} | N | N | Using |
| N(N + 1)/2 + 2 | C(N − 1)/N{USS-C} | N − 1 | N | multiple search |
| ... | ... | ... | ... | spaces with |
| N(N + 1)/2 + N | C1/N{USS-C} | 1 | N | explicit |
| ... | ... | ... | ... | connectivity |
| N(N + 1) − 2 | C2/2{USS-C} | 2 | 2 | |
| N(N + 1) − 1 | C1/2{USS-C} | 1 | 2 | |
| N(N + 1) | C1/1{USS-C} | 1 | 1 | Using single search space |

When excluding the subcarrier index, the index of the common and UE-specific search space, and the control resource set index as described above, the corresponding set of control resource sets may be understood as a set of a specific number of control resource sets respectively connected to common or UE-specific search spaces in which explicit connectivity is set for repeated PDCCH transmission. For example, CN/N{CSS-C} may be defined as meaning that there are a total of N control resource sets overlapping in time within the corresponding PDCCH monitoring period among all control resource sets connected to N common search spaces with explicit connectivity set, and C1/2{USS-C} may be defined as meaning that there is a total of one control resource set overlapping in time within the corresponding PDCCH monitoring period among all control resource sets respectively connected to two UE-specific search spaces in which explicit connectivity is configured.

When at least one control resource set configured corresponding to the priority of any value illustrated in [Table 54] exists within the corresponding PDCCH monitoring period, a set of control resource sets connected to a search space having the lowest subcarrier index among the corresponding control resource sets and the lowest index among a plurality of explicitly connected common and UE-specific search spaces may be determined as the reference control resource set. For example, if there are two sets of control resource sets CN/N{CSS-C} corresponding to priority 1 in Table 54 (first and second control resource set sets) within the corresponding PDCCH monitoring period, if the two control resource sets exist in the same subcarrier, by comparing the index of the common search space (e.g., CSS #1) of the lowest index among the N common search spaces connected to the first control resource set and the common search space (e.g., CSS #3) of the lowest index among the N common search spaces connected to the second control resource set, the set of control resource set (in this example, a first set of control resource set) connected to a low index search space may be considered as a reference set of control resource set.

In addition, if the control resource sets corresponding to the 1st to nth priorities do not exist in the activated bandwidth portion of all subcarriers within the corresponding PDCCH monitoring period, the existence or nonexistence of the PDCCH monitoring period is determined for the set of control resource set corresponding to the (n+1)th priority, and if at least one exists, the set of control resource set connected to a search space having the lowest subcarrier index among the corresponding control resource sets and the lowest index among a plurality of explicitly connected common and UE-specific search spaces may be determined as the reference control resource set.

[Method 2 of Determining Reference 1]

As another method, the UE may follow the order of [Table 55] below in order to determine the control resource set conforming to reference 1. Similar to the above-mentioned [Method 1 of determining Reference 1], in the following order, the subcarrier index, common and UE-specific search space indexes, and control resource set indexes are excluded among the naming schemes, and only CX/Y expressing the number of total control resource sets connected to the types of a plurality of search spaces having explicit connectivity (whether it is a common search space or a UE-specific search space), Y and the number X overlapping within the corresponding PDCCH monitoring period are considered.

TABLE 55

| Priority | Set of control resource set | Number of control resource sets within specific PDCCH monitoring period | Number of all control resource sets connected to the search space with explicit connectivity | |
|---|---|---|---|---|
| 1 | CN/N(CSS-C) | N | N | Using |
| 2 | C(N − 1)/N{CSS-C} | N − 1 | N | multiple search |
| ... | ... | ... | ... | spaces with |
| N | C1/N{CSS-C} | 1 | N | explicit |
| ... | ... | ... | ... | connectivity |

TABLE 55-continued

| Priority | Set of control resource set | Number of control resource sets within specific PDCCH monitoring period | Number of all control resource sets connected to the search space with explicit connectivity | |
|---|---|---|---|---|
| N(N + 1)/2 − 2 | C2/2{CSS-C} | 2 | 2 | |
| N(N + 1)/2 − 1 | C1/2{CSS-C} | 1 | 2 | |
| N(N + 1)/2 | CN/N{USS-C} | N | N | |
| N(N + 1)/2 + 1 | C(N − 1)/N{USS-C} | N − 1 | N | |
| ... | ... | ... | ... | |
| N(N + 1)/2 + N − 1 | C1/N{USS-C} | 1 | N | |
| ... | ... | ... | ... | |
| N(N + 1) − 3 | C2/2{USS-C} | 2 | 2 | |
| N(N + 1) − 2 | C1/2{USS-C} | 1 | 2 | |
| N(N + 1) − 1 | C1/1{CSS-C} | 1 | 1 | Using single search space |
| N(N + 1) | C1/1{USS-C} | 1 | 1 | Using single search space |

In accordance with Table 55, when determining the set of reference control resource set, the UE may preferentially select a set of control resource sets that may be determined based on control resource sets connected to a plurality of common search spaces having explicit connectivity, rather than a set of control resource sets that may be determined based on control resource sets connected to a plurality of UE-specific search spaces having explicit connectivity. In addition, the UE may select a set of control resource sets that may be determined based on control resource sets connected to a plurality of search spaces having explicit connectivity, rather than a control resource set connected to a single search space. Similar to the [method 1 of determining Reference 1], if at least one control resource set configured corresponding to the priority of any value illustrated in [Table 55] exists within the corresponding PDCCH monitoring period, the UE may determine, as the reference control resource set, a set of control resource sets connected to a search space having the lowest subcarrier index among the corresponding control resource sets and the lowest index among a plurality of explicitly connected common and UE-specific search spaces.

In addition, if the control resource sets corresponding to the 1st to nth priorities do not exist in the activated bandwidth portion of all subcarriers within the corresponding PDCCH monitoring period, the existence or nonexistence of the PDCCH monitoring period is determined for the set of control resource sets corresponding to the (n+1)-th priority, and if at least one exists, a set of control resource sets connected to a search space having the lowest subcarrier index among the corresponding control resource sets and the lowest index among a plurality of explicitly connected common and UE-specific search spaces may be determined as set of the reference control resource sets.

[Method 3 of determining Reference 1] to [Method 4 of determining Reference 1] to be described later are methods corresponding to [Table 56] to [Table 57], respectively and may be interpreted similarly to [Table 54] or [Table 55] corresponding to the above-mentioned [Method 1 of determining Reference 1] or [Method 2 of determining Reference 1]. Therefore, detailed descriptions of [Method 3 of determining Reference 1] to [Method 4 of determining Reference 1], which will be described later, are omitted and are replaced with [Table 56] to [Table 57].

[Method 3 of Determining Reference 1]

As another method, the UE may follow the order of [Table 56] below in order to determine the set of control resource sets conforming to reference 1.

TABLE 56

| Priority | Set of control resource set | Number of control resource sets within specific PDCCH monitoring period | Number of all control resource sets connected to the search space with explicit connectivity | |
|---|---|---|---|---|
| 1 | CN/N(CSS-C) | N | N | Using multiple search spaces with explicit connectivity |
| 2 | CN/N{USS-C} | N | N | |
| 3 | C(N − 1)/N{CSS-C} | N − 1 | N | |
| 4 | C(N − 1)/N{USS-C} | N − 1 | N | |
| ... | ... | ... | ... | |
| 2N − 1 | C1/N{CSS-C} | 1 | N | |
| 2N | C1/N{USS-C} | 1 | N | |
| 2N + 1 | C(N − 1)/(N − 1){CSS-C} | N − 1 | N − 1 | |
| 2N + 2 | C(N − 1)/(N − 1){USS-C} | N − 1 | N − 1 | |
| ... | ... | ... | ... | |
| N(N + 1) − 3 | C1/2{CSS-C} | 1 | 2 | |
| N(N + 1) − 2 | C1/2{USS-C} | 1 | 2 | |
| N(N + 1) − 1 | C1/1{CSS-C} | 1 | 1 | Using single search space |
| N(N + 1) | C1/1{USS-C} | 1 | 1 | Using single search space |

[Method 4 of Determining Reference 1]

As another method, the UE may follow the order of [Table 57] below to determine the set of control resource sets conforming to reference 1.

TABLE 57

| Priority | Set of control resource set | Number of control resource sets within specific PDCCH monitoring period | Number of all control resource sets connected to the search space with explicit connectivity | |
|---|---|---|---|---|
| 1 | CN/N(CSS-C) | N | N | Using multiple search spaces with explicit connectivity |
| 2 | C(N − 1)/N{CSS-C} | N − 1 | N | |
| ... | ... | ... | ... | |
| N | C1/N{CSS-C} | 1 | N | |
| N + 1 | CN/N{USS-C} | N | N | |
| N + 2 | C(N − 1)/N{USS-C} | N − 1 | N | |
| ... | ... | ... | ... | |
| 2N | C1/N{USS-C} | 1 | N | |
| ... | ... | ... | ... | |

TABLE 57-continued

| Priority | Set of control resource set | Number of control resource sets within specific PDCCH monitoring period | Number of all control resource sets connected to the search space with explicit connectivity | |
|---|---|---|---|---|
| N(N+1) − 1 | C1/1{CSS-C} | 1 | 1 | Using single search space |
| N(N+1) | C1/1{USS-C} | 1 | 1 | Using single search space |

The [Method 1 of determining Reference 1] to [Method 4 of determining Reference 1] are only some examples, and another determination method, which is not limited thereto, may be used for the reference 1. In addition, referring to the UE capability to support repeated PDCCH transmission for the common search space described above in the second embodiment, the UE and the base station may not support repeated PDCCH transmission for CSS. In this case, when considering the priority, the priority considering the repeated PDCCH transmission for CSS in Table 54 to Table 57 may be ignored. More specifically, the priorities 1 to N(N+1)/2-1 in Table 54 and Table 55, the odd-numbered priorities (e.g., 1, 3, 5, . . . , N(N+1)-3) excluding N(N+1)-1th priorities in Table 56, the priority including the set of control resource sets connected to CSS except for the N(N+1)-1th priority in Table 57 (e.g., 1 to N and 2N+1 to 3N, . . . _) may be ignored.

Following the [Method 1 of determining Reference 1] to [Method 4 of determining Reference 1], the following methods may be considered for reference 2 determination methods. Each method to be described below will be described on the premise that the set of reference control resource sets determined by the [Method 1 of determining Reference 1] to [Method 4 of determining Reference 1] has M (1≤M≤N) QCL-TypeD characteristics.

[Method 1-1 of Determining Reference 2]

The UE may have the same number and type of QCL-TypeD characteristics as the reference set of control resource sets determined by reference 1 within the corresponding PDCCH monitoring period, and may receive control resource sets connected to a common and UE-specific search space with explicit connectivity or control resource sets connected to one common and UE-specific search space without explicit connectivity using the corresponding QCL-TypeD characteristics.

[Method 1-2 of Determining Reference 2]

The UE may have the same number and type of QCL-TypeD characteristics as the reference set of control resource sets determined by reference 1 within the corresponding PDCCH monitoring period, and may receive control resource sets connected to a common search space with explicit connectivity or control resource sets connected to one common search space without explicit connectivity using corresponding QCL-TypeD characteristics.

[Method 1-3 of Determining Reference 2]

The UE may have the same number and type of QCL-TypeD characteristics as a set the reference control resource set determined by the reference 1 within the corresponding PDCCH monitoring period, and may receive the control resource sets connected to the UE-specific search space with explicit connectivity or the control resource sets connected to one UE-specific search space without explicit connectivity, using the corresponding QCL-TypeD characteristics.

[Method 1-4 of Determining Reference 2]

The UE may receive the control resource sets connected to the same number, the same type of QCL-TypeD characteristics, and the same type of search space as the specific control resource set determined by the reference 1 in the corresponding PDCCH monitoring period using the corresponding QCL-TypeD characteristics.

[Method 2-1 of Determining Reference 2]

The UE may receive the control resource sets connected to a common and UE-specific search space having explicit connectivity while having at least one same type of QCL-TypeD characteristic as the reference set of control resource sets determined by reference 1 within the corresponding PDCCH monitoring period or a control resource set connected to one common and UE-specific search space without explicit connectivity, using the corresponding QCL-TypeD characteristics.

[Method 2-2 of Determining Reference 2]

The UE may receive the control resource sets connected to a common and UE-specific search space having explicit connectivity while having at least one same type of QCL-TypeD characteristic as the set of the reference control resource set determined by reference 1 within the corresponding PDCCH monitoring period or a control resource set connected to one common search space without explicit connectivity, using the corresponding QCL-TypeD characteristics.

[Method 2-3 of Determining Reference 2]

The UE may receive the control resource sets connected to a common and UE-specific search space having explicit connectivity while having at least one same type of QCL-TypeD characteristic as the set of the reference control resource set determined by reference 1 within the corresponding PDCCH monitoring period or a control resource set connected to one UE-specific search space without explicit connectivity, using the corresponding QCL-TypeD characteristics.

[Method 2-4 of Determining Reference 2]

The UE may receive the control resource sets in which at least one QCL-TypeD characteristic of the same type and a search space of the same type are explicitly connected to the set of the reference control resource set determined by the reference 1 within the corresponding PDCCH monitoring period, and each search space is connected, or a control resource set connected to one search space of the same type without explicit connectivity, using the corresponding QCL-TypeD characteristics.

[Method 3-1 of Determining Reference 2]

The UE may receive control resource sets corresponding to the case in which all QCL-TypeD characteristics of each control resource set are a subset of all QCL-TypeD characteristics of the set of the reference control resource set determined by the reference 1, among the control resource sets connected to the common and UE-specific search space having explicit connectivity existing within the corresponding PDCCH monitoring period, or a control resource set connected to one common and UE-specific search space without explicit connectivity.

[Method 3-2 of Determining Reference 2]

The UE may receive control resource sets corresponding to the case in which all QCL-TypeD characteristics of each control resource set are a subset of all QCL-TypeD characteristics of the set of the reference control resource set determined by above reference 1, among the control resource sets connected to a common specific search space having explicit connectivity existing within the corresponding PDCCH monitoring period, or control resource sets connected to one common search space without explicit connectivity.

[Method 3-3 of Determining Reference 2]

The UE may receive control resource sets corresponding to the case in which all QCL-TypeD characteristics of each control resource set are a subset of all QCL-TypeD characteristics of the set of the reference control resource set determined by above reference 1, among the control resource sets connected to the UE-specific search space with explicit connectivity existing within the corresponding PDCCH monitoring period, or the control resource sets connected to one UE-specific search space without explicit connectivity.

[Method 3-4 of Determining Reference 2]

The UE may receive control resource sets connected to a search space of the same type as the search space to which the reference control resource set configured is connected in the case where all QCL-TypeD characteristics of each control resource set are a subset of all QCL-TypeD characteristics of the reference control resource set configured determined by above reference 1, among the control resource sets connected to a common and UE-specific search space having explicit connectivity existing within the corresponding PDCCH monitoring period, or control resource sets connected to one UE-specific search space without explicit connectivity.

When considering a method of determining the reference 3, following the [Method 1-1 of determining Reference 2] to [Method 3-4 of determining Reference 2], if the reference control resource set is selected in consideration of the [Method 1 of determining Reference 1], regarding the same method (method 1 of determining reference 1) for the method of determining reference 3, if the maximum number of different control resource sets that may be received is limited, the limited control resource set may be selected according to priority.

Figure 23A:
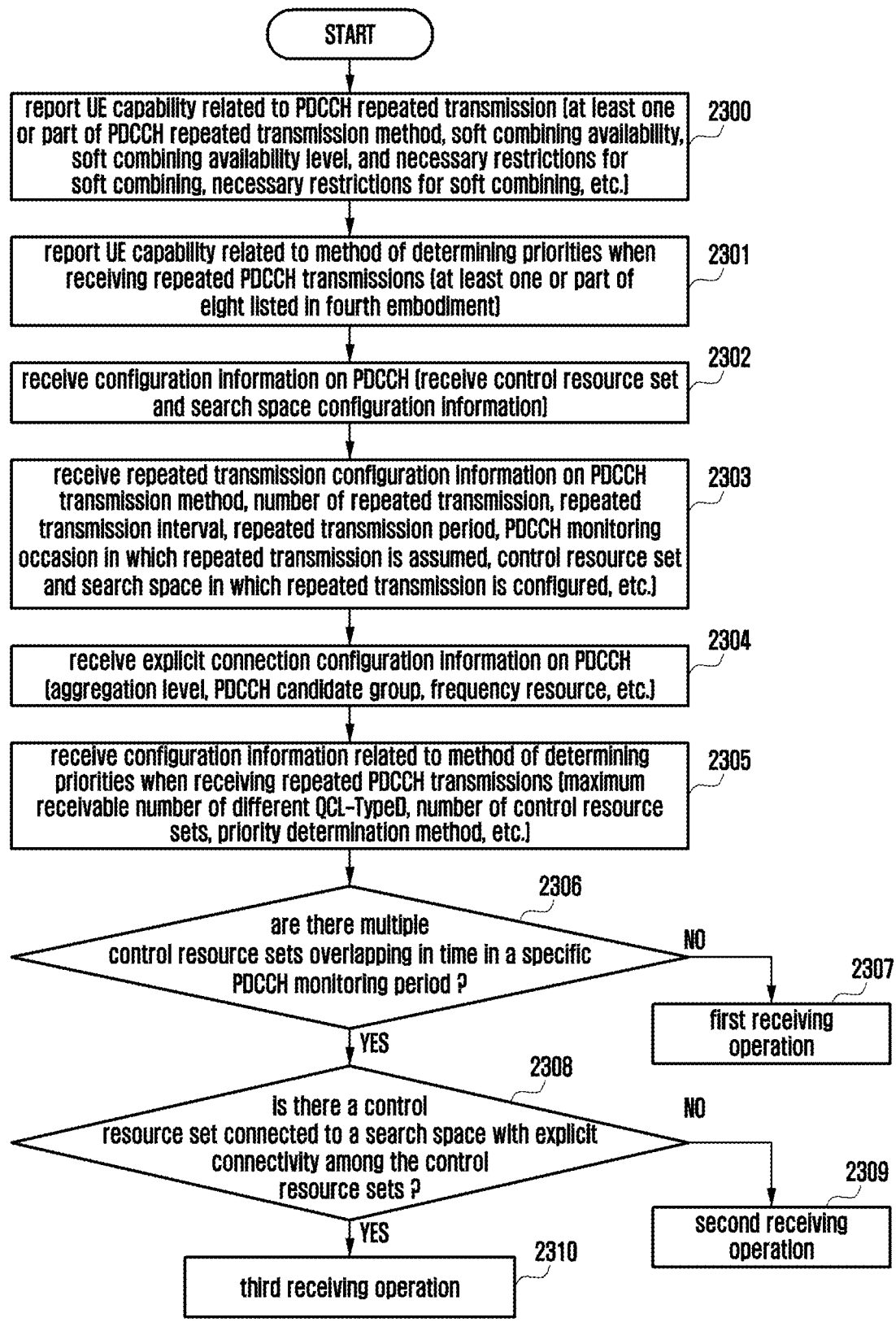
FIG. 23A is a diagram illustrating operations of a UE and a base station with respect to a method of determining priorities when receiving repeated PDCCH transmission according to another embodiment of the disclosure.
Figure 23B:
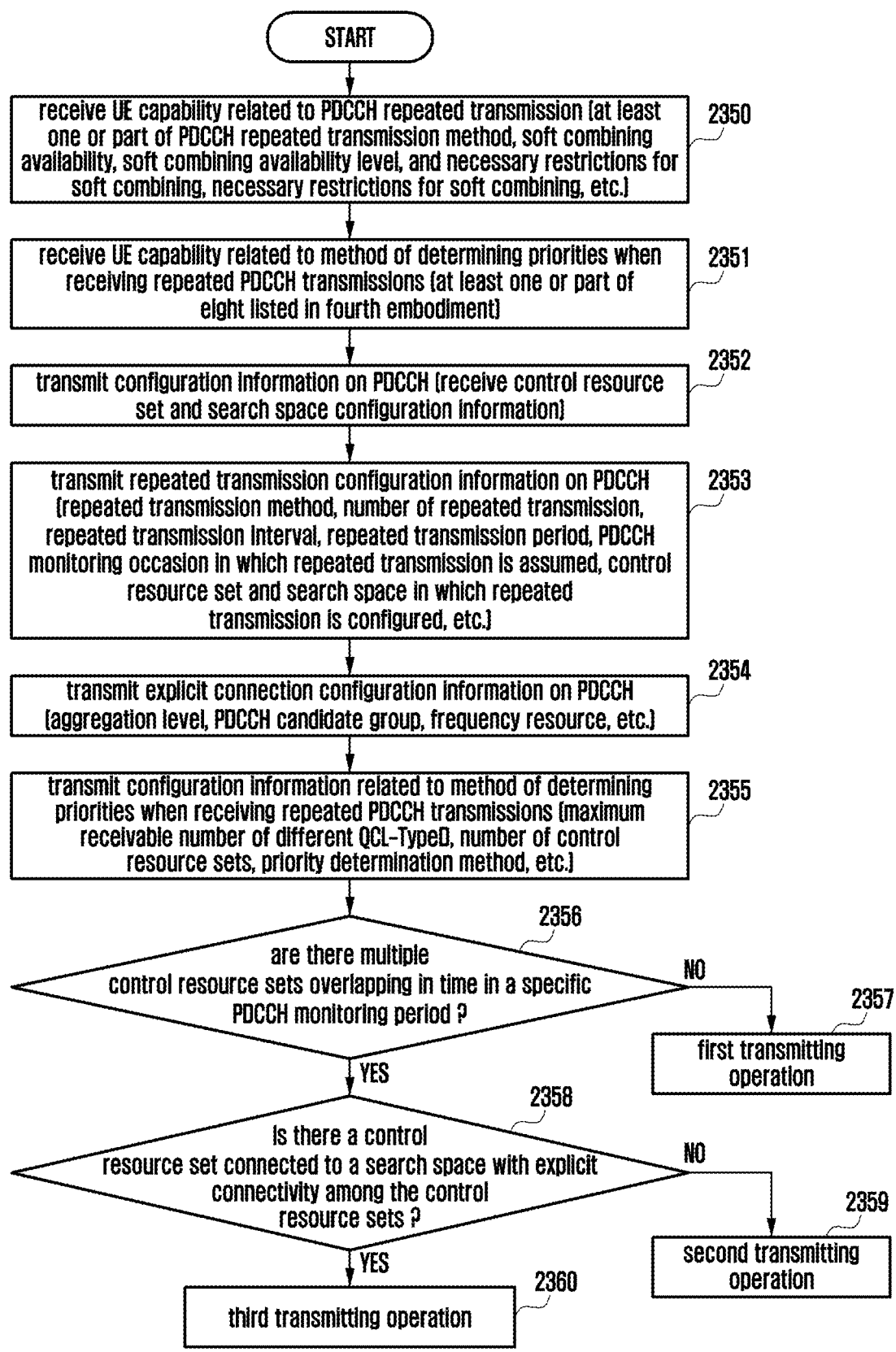
FIG. 23B is a diagram illustrating operations of a UE and a base station with respect to a method of determining priorities when receiving repeated PDCCH transmission according to another embodiment of the disclosure.

As described above, the UE may determine the priority when receiving the repeated PDCCH transmission through a combination of the above-described various methods applicable to Reference 1 to Reference 3, respectively. Applicable methods for each reference may be semi-statically configured by upper layer signaling from the base station, or may be dynamically indicated by L1 signaling, or may be configured and indicated by a combination of upper layer signaling and L1 signaling, or a fixed method determined by a standard may be used. As an example of combinations of the methods, [Method 1 of determining reference 1] may be applied to Reference 1 and 3, and [Method 1-1 of determining reference 2] may be applied to Reference 2. Referring to FIG. 23A and FIG. 23B below, an example will be described in more detail.

FIG. 23A and FIG. 23B are a diagram illustrating operations of a UE and a base station with respect to a method of determining priorities when receiving repeated PDCCH transmission according to another embodiment of the disclosure. The UE may report information related to repeated PDCCH transmission (e.g., at least one or part of PDCCH repeated transmission method, soft combining possible, soft combining possible level, and necessary restrictions for soft combining) to the base station as a UE capability 2300 and 2350.

In addition, the UE may report information related to a method of determining a priority upon reception of repeated PDCCH transmission (e.g., at least one or part of the UE capabilities listed in the fourth embodiment) to the base station as the UE capability 2301 and 2351. The base station may receive the same and transmit configuration information about the PDCCH (e.g., configuration information on the control resource set and the search space) to the UE 2302 and 2352, and the base station may additionally transmit configuration information regarding repeated PDCCH transmission (e.g., repeated transmission method, number of repeated transmissions, repeated transmission period, repeated transmission period, PDCCH monitoring period in which repeated transmission is assumed, control resource set and search space in which repeated transmission is set, etc.) to the UE 2303 and 2353.

In addition, the base station may additionally transmit explicit connection configuration related information (e.g., aggregation level, PDCCH candidate group, frequency resource, etc.) to the UE during repeated PDCCH transmission 2304 and 2354. In addition, the base station may additionally transmit configuration information related to the priority determination method (e.g., the maximum number of different QCL-TypeDs that may be received or the number of control resource sets, the priority determination method, etc.) when receiving repeated PDCCH transmission to the UE 2305 and 2355. Thereafter, based on the configuration information received from the base station, if there are no overlapping control resource sets in time in a specific PDCCH monitoring period 2306 and 2356, that is, if only a single control resource set exists, the UE may perform the first reception operation 2307 and 2357. The first reception operation may be a method of receiving a single control resource set existing within the corresponding PDCCH monitoring period.

If a plurality of control resource sets overlapping in time exist in a specific PDCCH monitoring period 2306 and 2356, and there is no control resource set connected to a search space having explicit connectivity among the control resource sets 2308 and 2358, the UE may perform a second reception operation 2309 and 2359. The second reception operation may be a method of determining the priority for the control resource set reception in consideration of only a single PDCCH transmission as the operation of the existing Rel-15/16. If a plurality of control resource sets overlapping in time exist in a specific PDCCH monitoring period 2306 and 2356, and at least one control resource set connected to a search space having explicit connectivity among the control resource sets exists (2308, 2358), the UE may perform a third reception operation 2310 and 2360.

The third reception operation is a method of receiving by combining each method for references 1 to 3 in the above-described 4-2 embodiment. As an example, as described above, the UE may determine the priority when receiving the repeated PDCCH transmission through a combination of the above-described various methods applicable to each of the references 1 to 3. Applicable methods for each reference may be semi-statically configured by upper layer signaling from the base station, or may be dynamically indicated by L1 signaling, or may be configured and indicated by a combination of upper layer signaling and L1 signaling, or a fixed method determined by a standard may be used. As an example of combinations of the methods, [Method 1 of determining Reference 1] may be applied to Reference 1 and Reference 3, and [Method 1-1 of determining Reference 2] may be applied to Reference 2.

Embodiment 4-3: Another Method for Determining Priorities when Receiving Repeated PDCCH Transmissions Using Control Resource Sets Respectively Connected to a Plurality of Explicitly Connected Search Spaces As an embodiment of the disclosure, a method for determining QCL-TypeD prioritization of a UE receiving single and repeated PDCCH transmission on a specific monitoring occasion will be described. In addition to the above-described [Method 1 of determining reference 1] to [Method 4 of determining reference 1], other methods for determining Reference 1 in Embodiment 4-2 may be additionally considered as follows.

[Method 5 of Determining Reference 1]

When a plurality of control resource sets transmitted from a single or a plurality of subcarriers on a specific monitoring occasion overlap in time, the UE may select a control resource set connected to the common search space of the lowest index in the subcarrier corresponding to the lowest index among the subcarriers including the common search space in the corresponding monitoring occasion. At this time, if all control resource sets overlapping in time within the corresponding monitoring occasion are not connected to the common search space but to the UE specific space, the UE may select a control resource set connected to the UE-specific search space of the lowest index from within a subcarrier corresponding to the lowest index among subcarriers including the UE-specific search space in the corresponding monitoring occasion. Here, the selected control resource set may be a reference control resource set conforming to reference 1. The above-described operation may be performed regardless of explicit connectivity between a plurality of common search spaces or explicit connectivity between a plurality of UE-specific search spaces. In addition to the control resource set derived as described above, in a specific situation, another control resource set serving as a second reference may be selected in order to receive a plurality of QCL-TypeD characteristics. At this time, the following detailed methods may be considered.

[Detailed method 5-1] This method may be used irrespective of whether a search space having explicit connectivity with other search spaces exists among the search spaces connected to the first derived control resource set. Except for the search spaces connected to the first derived control resource set, based on the remaining search spaces and the control resource sets connected to the search spaces, it is possible to derive the control resource set serving as the second standard by reapplying the above-described method of deriving the first control resource set.

[Detailed method 5-2] When there is no search space with explicit connection with other search spaces among the search spaces connected to the first derived control resource set, except for the search spaces connected to the first derived control resource set, based on the remaining search spaces and the control resource sets connected to the search spaces, it is possible to derive the control resource set serving as the second standard by reapplying the above-described method of deriving the first control resource set.

[Detailed method 5-3] When the search spaces connected to the first derived control resource set include both the common search space and the UE-specific search space, if there is at least one common search space having explicit connectivity with other search spaces, among the common search spaces connected to the first derived control resource set, the control resource set connected to the common search space having explicit connectivity with the common search space having the lowest index among those having explicit connectivity with other common search spaces may be derived as the control resource set serving as the second reference.

For example, when common search space 1, common search space 2, and UE-specific search space 1 exist as search spaces connected to the first derived control resource set, common search space 1 has explicit connectivity with common search space 3 and common search space 2 has explicit connectivity with common search space 4, as described above, among common search spaces 1 and 2, which have explicit connectivity with other common search spaces, the control resource set connected to common search space 1 having a low index and common search space 3 having explicit connectivity may be derived as the control resource serving as the second reference.

At this time, if the first derived control resource set and the second derived control resource set are the same, that is, when two reference control resource sets are derived, different QCL-TypeD characteristics are one, the UE may derive the control resource set connected to the common search space having the next lowest index and the common search space having explicit connectivity as the second reference control resource set. In this way, N different reference control resource sets may be derived, and if it is not possible to derive N different reference control resource sets by the corresponding method, the remaining reference control resource sets may be derived using the [Detailed Method 5-1].

[Detailed Method 5-4] When the search spaces connected to the first derived control resource set include both the common search space and the UE-specific search space, if there is no common search space having explicit connectivity with other search spaces and there is at least one UE-specific search space having explicit connectivity, among the UE-specific search spaces connected to the first derived control resource set, among those having explicit connectivity with other UE-specific search spaces, a control resource set connected to a UE-specific search space having the lowest index and a UE-specific search space having explicit connectivity may be derived as a second reference control resource set.

For example, when common search space 1, UE-specific search space 1, and UE-specific search space 2 exist as search spaces connected to the first derived control resource set, and UE-specific search space 1 has explicit connectivity with UE-specific search space 3 and UE-specific search space 2 has explicit connectivity with UE-specific search space 4, a control resource set connected to UE-specific search space 1 having a low index and UE-specific search space 3 having explicit connectivity may be derived as a second reference control resource set among the UE-specific search spaces 1 and 2 having explicit connectivity with other UE-specific search spaces as described above.

At this time, if the first derived control resource set and the second derived control resource set are the same, that is, when two reference control resource sets are derived, different QCL-TypeD characteristics are one, the UE may derive the control resource set connected to the UE-specific search space having the next lowest index and the UE-specific search space having explicit connectivity as the second reference control resource set. In this way, N different reference control resource sets may be derived, and if it is not possible to derive N different reference control resource sets by the corresponding method, the remaining reference control resource sets may be derived using the [Detailed Method 5-1].

The number of different QCL-TypeDs that may be derived through [Detailed Method 5-1] to [Detailed Method 5-4] in [Method 5 of determining Reference 1] described above may be N, N may be determined according to one of the following methods.

The value of N may be determined through upper layer signaling configuration. For example, if enableTwoDefault-TCI-State, which is upper layer signaling, is set, the value of N may be determined to be 2. As another example, the value of N may be determined through new upper layer signaling for repeated PDCCH transmission.

N may be considered as the maximum value among the number of search spaces having explicit connectivity set for all subcarriers in a specific band (For example, if two search spaces are explicitly connected on subcarrier 1 and three search spaces are explicitly connected on subcarrier 2, N may be 3), regardless of the overlapping control resource set on the corresponding monitoring occasion.

N may be determined according to the number of explicitly connected search spaces when some control resource sets among the overlapping control resource sets on the corresponding monitoring occasion are control resource sets respectively connected to search spaces explicitly connected to each other for PDCCH repeated transmission. If two search spaces are explicitly connected and control resource sets respectively connected to the two search spaces overlap in time on the corresponding monitoring occasion, N may be considered as 2. If all overlapping control resource sets are connected to a single search space without being explicitly connected to a connected search space, N may be considered as 1.

According to the N value determined by one of the above-described methods, if the reference control resource set is derived to be smaller than N through one of the above-mentioned [Method 1 of determining Reference 1] to [Method 5 of determining Reference 1], the UE may use one of the above-described [Method 1 of determining Reference 1] to [Method 5 of determining Reference 1] until N reference control resource sets are derived. In addition, if N reference control resource sets are derived through one of the above-mentioned [Method 1 of determining Reference 1] to [Method 5 of determining Reference 1], the process of [Method 1 of determining Reference 1] to [Method 5 of determining Reference 1] may be terminated at that point. As an example, when using [Method 5 of determining Reference 1] as a method for deriving a reference control resource set, if the value of N is 1, after selecting the first control resource set, [Detailed Method 5-1] to [Detailed Method 5-4], the process of selecting the second control resource set may not be performed by selecting one of the methods.

In addition, the UE may report the UE capability for the method to the base station, and the above-mentioned [Method 5 of determining Reference 1] is similar to the above-mentioned [Method 1 of determining Reference 1] to [Method 4 of determining Reference 1] may be considered as a method of determining reference 1 when performing the third reception operations 2310 and 2360 in FIG. 23A and FIG. 23B.

Figure 24:
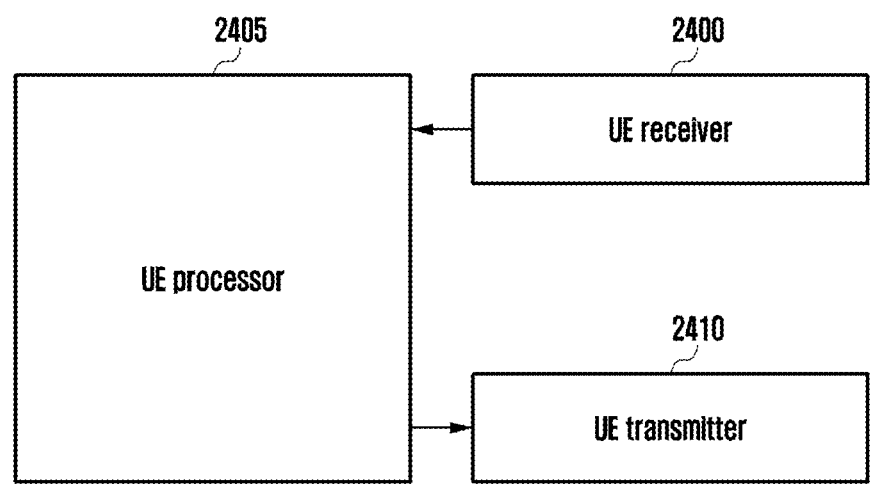
FIG. 24 is a diagram illustrating a structure of a UE in a wireless communication system according to an embodiment of the disclosure.

FIG. 24 is a diagram illustrating a structure of a UE in a wireless communication system according to an embodiment of the disclosure.

Referring to FIG. 24, the UE may include a transceiver that refer to a UE receiver unit 2400 and a UE transmitter 2410, a memory (not illustrated), and a UE processor 2405 (or a UE control unit or processor). According to the communication method of the UE described above, the transceiver 2400 and 2410, the memory, and the UE processor 2405 of the UE may operate. However, the components of the UE are not limited to the above-described examples. For example, the UE may include more or fewer components than the aforementioned components. In addition, the transceiver, the memory, and the processor may be implemented in the form of one chip.

The transceiver may transmit/receive a signal to/from the base station. Here, the signal may include control information and data. To this end, the transceiver may include an RF transmitter for up-converting and amplifying a frequency of a transmitted signal, and an RF receiver for low-noise amplifying and down-converting a received signal. However, this is only an exemplary embodiment of the transceiver, and components of the transceiver are not limited to the RF transmitter and the RF receiver.

In addition, the transceiver may receive a signal through a wireless channel and output the same to the processor, and transmit a signal output from the processor through the wireless channel.

The memory may store programs and data necessary for the operation of the UE. In addition, the memory may store control information or data included in a signal transmitted and received by the UE. The memory may be configured as a storage medium or a combination of storage media, such as ROM, RAM, hard disk, CD-ROM, and DVD. In addition, there may be a plurality of memories.

In addition, the processor may control a series of processes so that the UE may operate according to the above-described embodiment. For example, the processor may receive DCI composed of two layers and control the components of the UE to receive a plurality of PDSCHs at the same time. The number of processors may be plural, and the processor may perform a component control operation of the UE by executing a program stored in the memory.

Figure 25:
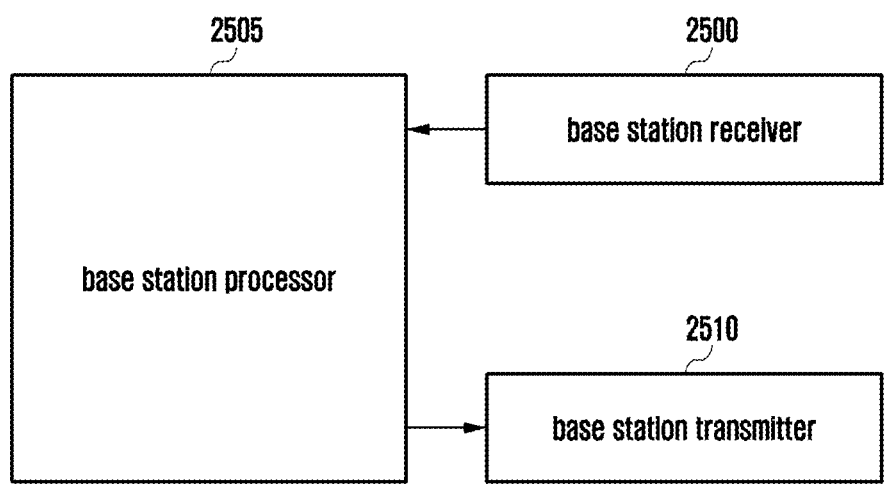
FIG. 25 is a diagram illustrating a structure of a base station in a wireless communication system according to an embodiment of the disclosure.

FIG. 25 is a diagram illustrating a structure of a base station in a wireless communication system according to an embodiment of the disclosure.

Referring to FIG. 25, the base station may include a transceiver that refer to a base station receiver 2500 and a base station transmitter 2510, a memory (not illustrated), and a base station processor 2505 (or a base station controller or processor). According to the above-described communication method of the base station, the transceiver 2500 and 2510, the memory, and the base station processor 2505 of the base station may operate. However, the components of the base station are not limited to the above-described example. For example, the base station may include more or fewer components than the above-described components. In addition, the transceiver, the memory, and the processor may be implemented in the form of a single chip.

The transceiver may transmit/receive a signal to/from the UE. Here, the signal may include control information and data. To this end, the transceiver may include an RF transmitter for up-converting and amplifying a frequency of a transmitted signal, and an RF receiver for low-noise amplifying and down-converting a received signal. However, this is only an embodiment of the transceiver, and components of the transceiver are not limited to the RF transmitter and the RF receiver.

In addition, the transceiver may receive a signal through the wireless channel and output the signal to the processor, and transmit the signal output from the processor through the wireless channel.

The memory may store programs and data necessary for the operation of the base station. In addition, the memory may store control information or data included in a signal transmitted and received by the base station. The memory may be configured as a storage medium or a combination of storage media, such as ROM, RAM, hard disk, CD-ROM, and DVD. In addition, there may be a plurality of memories.

The processor may control a series of processes so that the base station may operate according to the above-described embodiment of the disclosure. For example, the processor may control each component of the base station to configure two-layer DCIs including allocation information on a plurality of PDSCHs and transmit them. The number of processors may be plural, and the processor may execute a program stored in the memory to perform a component control operation of the base station.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, a part of one embodiment of the disclosure may be combined a part of any other embodiment to operate a base station and a terminal. As an example, a part of embodiment 1 and a part of embodiment 2 may be combined to operate a base station and a terminal. Further, although the above embodiments have been described by way of the FDD LTE system, other variants based on the technical idea of the embodiments may be implemented in other systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Various embodiments of the disclosure have been described above, but they are merely for the purpose of illustration, and embodiments of the disclosure are not limited to the embodiments set forth herein. Those skilled in the art will appreciate that other specific modifications and changes may be easily made thereto without changing the technical idea or essential features of the disclosure. The scope of the disclosure should be determined not by the above detailed description but by the appended claims, and all changes and modifications derived from the meaning and scope of the claims and equivalent concepts thereof shall be construed as falling within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
   receiving, via higher layer signaling, a first configuration associated with a number of quasi co-location (QCL) type D properties for physical downlink control channel (PDCCH) repetition;
   identifying to perform PDCCH monitoring for the PDCCH repetition on PDCCH candidates in overlapping PDCCH monitoring occasions in multiple control resource sets (CORESETs) configured with different QCL type D properties; and
   performing the PDCCH monitoring based on the first configuration,
   wherein the performing the PDCCH monitoring comprises:
   identifying whether second search spaces, except search spaces associated with CORESETs with a first QCL type D property, that are linked with at least one of search spaces associated with the CORESETs with the first QCL type D property by a second configuration associated with search space linking exist;
   in case that the second search spaces exist, performing the PDCCH monitoring in a first CORESET with the first QCL type D property and a second CORESET with a second QCL type D property among the multiple CORESETs, wherein the first CORESET corresponds to a search space with lowest index among first search spaces; and
   wherein the second CORESET corresponds to a search space with lowest index among the second search spaces, and
   in case that the second search spaces do not exist, performing the PDCCH monitoring only in the first CORESET with the first QCL type D property among the multiple CORESETS,
wherein the PDCCH monitoring in the first CORESET with the first QCL type D property is performed based on a first transmission configuration indication (TCI) state corresponding to the first QCL type D property, and
wherein the PDCCH monitoring in the second CORESET with the second QCL type D property is performed based on a second TCI state corresponding to the second QCL type D property.

2. The method of claim 1, further comprising:
transmitting capability information including information associated with a plurality of QCL type D properties being supported by the terminal to perform the PDCCH monitoring for the PDCCH repetition.

3. The method of claim 1, wherein in case that a plurality of cells for the terminal includes at least one cell including common search spaces (CSSs), the first search spaces and the second search spaces are included in a cell with lowest index among the at least one cell including the CSSs and each of the first search spaces and each of the second search spaces are a CSS, and
wherein in case that the plurality of cells does not include the at least one cell including the CSSs, the first search spaces and the second search spaces are included in a cell with lowest index among the plurality of cells and each of the first search spaces and each of the second search spaces are a user equipment specific search space (USS).

4. The method of claim 1, wherein the second search spaces correspond to remaining search spaces among the first search spaces except for the search spaces associated with the CORESETs with the first QCL type D property for the PDCCH repetition.

5. A terminal in a communication system, the terminal comprising:
a transceiver; and
a processor coupled to the transceiver, wherein the processor is configured to:
receive, via higher layer signaling, a first configuration associated with a number of quasi co-location (QCL) type D properties for physical downlink control channel (PDCCH) repetition;
identify to perform PDCCH monitoring for the PDCCH repetition on PDCCH candidates in overlapping PDCCH monitoring occasions in multiple control resource sets (CORESETs) configured with different QCL type D properties;
perform the PDCCH monitoring based on the configuration,
wherein, for performing the PDCCH monitoring, the processor is further configured to:
perform the PDCCH monitoring in a first CORESET with a first QCL type D property among the multiple CORESETs based on a first transmission configuration indication (TCI) state corresponding to the first QCL type D property, wherein the first CORESET corresponds to a search space with lowest index among first search spaces;
identify whether second search spaces, except search spaces associated with CORESETs with the first QCL type D property, that are linked with at least one of the search spaces associated with the CORESETs with the first QCL type D property by a second configuration associated with search space linking exist; and
in case that the second search spaces exist, perform the PDCCH monitoring in a second CORESET with a second QCL type D property among the multiple CORESETs based on a second TCI state corresponding to the second QCL type D property, wherein the second CORESET corresponds to a search space with lowest index among second search spaces, and
wherein in case that the second search spaces do not exist, the PDCCH monitoring in the second CORESET is not performed.

6. The terminal of claim 5, wherein the processor is further configured to:
transmit capability information including information associated with a plurality of QCL type D properties being supported by the terminal to perform the PDCCH monitoring for the PDCCH repetition.

7. The terminal of claim 5, wherein in case that a plurality of cells for the terminal includes at least one cell including common search spaces (CSSs), the first search spaces and the second search spaces are included in a cell with lowest index among the at least one cell including the CSSs and each of the first search spaces and each of the second search spaces are a CSS, and
wherein in case that the plurality of cells does not include the at least one cell including the CSSs, the first search spaces and the second search spaces are included in a cell with lowest index among the plurality of cells and each of the first search spaces and each of the second search spaces are a user equipment specific search space (USS).

8. The terminal of claim 5, wherein the second search spaces correspond to remaining search spaces among the first search spaces except for the search spaces associated with the CORESETs with the first QCL type D property for the PDCCH repetition.

9. A method performed by a base station in a communication system, the method comprising:
transmitting, via higher layer signaling, a first configuration associated with a number of quasi co-location (QCL) type D properties for physical downlink control channel (PDCCH) repetition;
identifying to perform PDCCH transmission for the PDCCH repetition on PDCCH candidates in overlapping PDCCH monitoring occasions in multiple control resource sets (CORESETs) configured with different QCL type D properties;
performing the PDCCH transmission associated with the configuration,
wherein the performing the PDCCH transmission comprises:
performing the PDCCH transmission in a first CORESET with a first QCL type D property among the multiple CORESETs based on a first transmission configuration indication (TCI) state corresponding to the first QCL type D property, wherein the first CORESET corresponds to a search space with lowest index among first search spaces;
identifying whether second search spaces, except search spaces associated with CORESETs with the first QCL type D property, that are linked with at least one of the search spaces associated with the CORESETs with the first QCL type D property by a second configuration associated with search space linking exist; and
in case that the second search spaces exist, performing the PDCCH transmission in a second CORESET with a second QCL type D property among the multiple CORESETs based on a second TCI state corresponding to the second QCL type D property, wherein the second CORESET corresponds to a search space with lowest index among second search spaces, and wherein in case that the second search spaces do not exist, the PDCCH transmission in the second CORESET is not performed.

10. The method of claim 9, further comprising:

receiving capability information including information associated with a plurality of QCL type D properties being supported by a terminal to perform the PDCCH monitoring for the PDCCH repetition.

11. The method of claim 9, wherein in case that a plurality of cells associated with the PDCCH transmission includes at least one cell including common search spaces (CSSs), the first search spaces and the second search spaces are included in a cell with lowest index among the at least one cell including the CSSs and each of the first search spaces and each of the second search spaces are a CSS, and wherein in case that the plurality of cells does not include the at least one cell including the CSSs, the first search spaces and the second search spaces are included in a cell with lowest index among the plurality of cells and each of the first search spaces and each of the second search spaces are a user equipment specific search space (USS).

12. The method of claim 9, wherein the second search spaces correspond to remaining search spaces among the first search spaces except for the search spaces associated with the CORESETs with the first QCL type D property for the PDCCH repetition.

13. A base station in a communication system, the base station comprising:

a transceiver; and a processor coupled to the transceiver, wherein the processor is configured to:

transmit, via higher layer signaling, a first configuration associated with a number of quasi co-location (QCL) type D properties for physical downlink control channel (PDCCH) repetition;

identify to perform PDCCH transmission for the PDCCH repetition on PDCCH candidates in overlapping PDCCH monitoring occasions in multiple control resource sets (CORESETs) configured with different QCL type D properties;

perform the PDCCH transmission associated with the configuration, wherein, for performing the PDCCH transmission, the processor is further configured to:

perform the PDCCH transmission in a first CORESET with a first QCL type D property among the multiple CORESETs based on a first transmission configuration indication (TCI) state corresponding to the first QCL type D property, wherein the first CORESET corresponds to a search space with lowest index among first search spaces;

identify whether second search spaces, except search spaces associated with CORESETs with the first QCL type D property, that are linked with at least one of the search spaces associated with the CORESETs with the first QCL type D property by a second configuration associated with search space linking exist; and in case that the second search spaces exist, perform the PDCCH transmission in a second CORESET with a second QCL type D property among the multiple CORESETs based on a second TCI state corresponding to the second QCL type D property, wherein the second CORESET corresponds to a search space with lowest index among second search spaces, and wherein in case that the second search spaces do not exist, the PDCCH transmission in the second CORESET is not performed.

14. The base station of claim 13, wherein the processor is further configured to:

receive capability information including information associated with a plurality of QCL type D properties being supported by a terminal to perform the PDCCH monitoring for the PDCCH repetition.

15. The base station of claim 13, wherein in case that a plurality of cells associated with the PDCCH transmission includes at least one cell including common search spaces (CSSs), the first search spaces and the second search spaces are included in a cell with lowest index among the at least one cell including the CSSs and each of the first search spaces and each of the second search spaces are a CSS, and wherein in case that the plurality of cells does not include the at least one cell including the CSSs, the first search spaces and the second search spaces are included in a cell with lowest index among the plurality of cells and each of the first search spaces and each of the second search spaces are a user equipment specific search space (USS).

16. The base station of claim 13, wherein the second search spaces correspond to remaining search spaces among the first search spaces except for the search spaces associated with the CORESETs with the first QCL type D property for the PDCCH repetition.

* * * * *